United States Patent
Sherrer

(10) Patent No.: US 8,801,359 B2
(45) Date of Patent: Aug. 12, 2014

(54) SYSTEM AND METHOD FOR EXTRACTING POWER FROM FLUID USING A TESLA-TYPE BLADELESS TURBINE

(75) Inventor: Gordon David Sherrer, Orleans (CA)

(73) Assignee: Gordon David Sherrer, Orleans (CA)

( * ) Notice: Subject to any disclaimer, the term of this patent is extended or adjusted under 35 U.S.C. 154(b) by 1041 days.

(21) Appl. No.: 12/598,952

(22) PCT Filed: May 5, 2008

(86) PCT No.: PCT/CA2008/000830
§ 371 (c)(1),
(2), (4) Date: Nov. 5, 2009

(87) PCT Pub. No.: WO2008/134868
PCT Pub. Date: Nov. 13, 2008

(65) Prior Publication Data
US 2010/0129193 A1    May 27, 2010

Related U.S. Application Data

(60) Provisional application No. 60/916,278, filed on May 5, 2007, provisional application No. 61/046,425, filed on Apr. 19, 2008.

(51) Int. Cl.
| | |
|---|---|
| F03D 3/00 | (2006.01) |
| F03D 3/04 | (2006.01) |
| F03B 3/18 | (2006.01) |
| F03B 17/06 | (2006.01) |
| F03D 11/02 | (2006.01) |

(52) U.S. Cl.
CPC ............... F03B 3/18 (2013.01); *Y02E 10/728* (2013.01); *F05B 2240/13* (2013.01); *F05B 2250/713* (2013.01); F03D 3/0436 (2013.01); F03D 3/0427 (2013.01); *F05B 2240/211* (2013.01); *F05B 2240/133* (2013.01); *F05B 2240/40* (2013.01); *Y02E 10/223* (2013.01); *F05B 2250/5011* (2013.01); *F05B 2240/9113* (2013.01); *Y02E 10/74* (2013.01); F03B 17/062 (2013.01); *Y02E 10/28* (2013.01); *F05B 2240/213* (2013.01); F03D 11/02 (2013.01); *F05B 2240/221* (2013.01); *F05B 2240/911* (2013.01)
USPC ................................ 415/1; 415/90

(58) Field of Classification Search
USPC .................. 415/1, 3.1, 4.2, 4.3, 76, 90; 416/4
See application file for complete search history.

(56) References Cited

U.S. PATENT DOCUMENTS

| | | | |
|---|---|---|---|
| 699,636 | A | 5/1902 | Thrupp |
| 1,061,142 | A | 5/1913 | Telsa |

(Continued)

FOREIGN PATENT DOCUMENTS

| | | |
|---|---|---|
| CA | 2306491 | 10/2001 |
| CA | 2330700 | 7/2002 |

(Continued)

OTHER PUBLICATIONS

Breitner, Mark C. and Pohlhausen, Karl, "Laminar Flow Between Two Parallel Rotating Disks", Aeronautical Research Laboratory, Applied Mathematics Research Branch, Wright-Patterson AFB, Mar. 1962.

(Continued)

*Primary Examiner* — Edward Look
*Assistant Examiner* — Christopher R Legendre
(74) *Attorney, Agent, or Firm* — Houri Khalilian; Law Offices of Khalilian Sira, LLC

(57) ABSTRACT

Smooth, preferably variable-sweep fluid collection device surfaces disposed into opposition with wind, river, surf, ocean or tidal currents generate enhanced velocity fluid flows at length driven into onboard work-extracting disc turbines at advantageous angles of attack. Keyed to shafts turning freely through optionally extendable volutes, disc turbines comprising a dense population of smooth, axially fixed or adjustably spaced discs conducting preferably laminar flow between adjacent elements develop significant torque through boundary layer adhesion and viscous shear-stress between fluid layers. Exhaust of disc turbine throughput into divergent channels drafting into external currents of initially higher than ambient velocity and lower pressure may reduce turbine discharge backpressure, rapidly clear system throughput, and allow normally disadvantageous drag to be utilized to develop greater work generation. Gainfully turning with, instead of at odds to natural or anthropogenic currents provided, disc turbines utilized as disclosed may provide unprecedented renewable energy from fluids in motion.

11 Claims, 19 Drawing Sheets

(56) References Cited

U.S. PATENT DOCUMENTS

| | | | |
|---|---|---|---|
| 1,061,206 A | | 5/1913 | Telsa |
| 1,209,359 A | | 12/1916 | Telsa |
| 4,166,596 A | * | 9/1979 | Mouton et al. .................. 244/30 |
| 4,207,026 A | * | 6/1980 | Kushto ............................ 416/84 |
| 4,228,753 A | | 10/1980 | Davis et al. |
| 4,232,992 A | | 11/1980 | Possell |
| 4,320,304 A | * | 3/1982 | Karlsson et al. ................ 290/55 |
| 4,335,994 A | | 6/1982 | Gurth |
| 4,402,647 A | | 9/1983 | Effenberger |
| 4,613,760 A | * | 9/1986 | Law .............................. 290/1 C |
| 5,009,569 A | * | 4/1991 | Hector et al. .................. 415/4.1 |
| 5,464,320 A | | 11/1995 | Finney |
| 5,669,758 A | * | 9/1997 | Williamson ....................... 416/4 |
| 6,135,708 A | | 10/2000 | Conrad et al. |
| 6,334,757 B1 | | 1/2002 | Iwano et al. |
| 6,692,232 B1 | * | 2/2004 | Letourneau ............... 416/198 R |
| 6,779,964 B2 | * | 8/2004 | Dial ................................. 415/1 |
| 6,856,036 B2 | | 2/2005 | Belinsky |
| 7,192,244 B2 | | 3/2007 | Grande, III et al. |
| 7,241,106 B2 | * | 7/2007 | Avina .............................. 415/90 |
| 7,278,825 B2 | | 10/2007 | Segota et al. |
| 7,279,803 B1 | | 10/2007 | Bosley |
| 7,335,000 B2 | * | 2/2008 | Ferguson .......................... 417/7 |
| 7,341,424 B2 | | 3/2008 | Dial |
| 7,427,173 B2 | * | 9/2008 | Chen .............................. 404/71 |
| 7,471,009 B2 | | 12/2008 | Davis et al. |
| 7,573,148 B2 | * | 8/2009 | Nica ............................... 290/55 |
| 7,650,749 B2 | | 1/2010 | Borgesen |
| 7,695,242 B2 | * | 4/2010 | Fuller ............................ 415/2.1 |
| 7,847,426 B1 | * | 12/2010 | Griffith et al. .................. 290/44 |
| 7,880,322 B2 | * | 2/2011 | Cumings et al. ................ 290/54 |
| 8,148,838 B2 | * | 4/2012 | Ferguson ......................... 290/44 |
| 8,317,460 B1 | * | 11/2012 | Retherford ...................... 415/90 |
| 8,393,850 B2 | * | 3/2013 | Werle et al. ....................... 415/7 |
| 2002/0182054 A1 | * | 12/2002 | Entrican, Jr. .................... 415/90 |
| 2005/0019183 A1 | * | 1/2005 | Williams et al. ........... 417/423.1 |
| 2006/0021614 A1 | | 2/2006 | Wermeling et al. |
| 2010/0129193 A1 | * | 5/2010 | Sherrer ............................ 415/1 |

FOREIGN PATENT DOCUMENTS

| | | |
|---|---|---|
| CA | 2349443 A1 * | 12/2002 |
| CA | 2498635 | 8/2006 |
| CA | 2607103 | 11/2006 |
| GB | 79043 | 5/1922 |
| GB | 1563337 | 3/1980 |
| WO | WO0146564 A1 | 6/2001 |

OTHER PUBLICATIONS

E. Muljadi, C.P. Butterfield, Yih-Huei Wan, "Axial Flux, Modular, Permanent-Magnet Generator with a Toroidal Winding for Wind Turbine Applications", National Wind Technology Center, National Renewable Energy Laboratory, U.S. Department of Energy, contract No. DE-AC36-83CH10093, task No. WE803020, Jul. 1998.

Hasinger et al., "Investigations of a Shear-Force Pump", Journal of Engineering for Power, Trans, ASME, Series A. vol. 85, pp. 201-206, Jul. 1963.

Hayes, J.A., "Tesla's Engine A New Dimension for Powerr", Complied by Jeffery Hayes, Tesla Engine Builders Associate, Milwaukee, WI 1994.

Hayes, Jeffery, A., Tesla Engine Builders Associate, Membership Manual, Milwaukee, WI Copyright 1993, 94, 97, 99, 2000, NT1rev5:Case Studies: p. 40, White, Russ, and Germain, Alex, "Disc Pump Saves $57,000/yr in High Viscosity Waste Service", 2000.

Johansson Thomas B., et al., "Renewable Energy: Sources for Fuel and Electricity" Island Press, Revised Printing, p. 130, 1993.

Adams, R. and Rice, Warren, "Experimental Investigation of the Flow Between Corotating Disks", Journal of Applied Mechanics, Sep. 1970.

Matsch, Lee, and Rice, Warren, "Potential Flow Between Two Parallel Circular Disks With Partial Admission", Journal of Applied Mechanics, Mar. 1967.

Pater, L.L., Crowther, E., and Rice, Warren, "Flow Regime Definition for Flow Between Corotating Disks", Journal of Fluids Engineering, Mar. 1974.

Rice, Warren, "An Analytical and Experimental Investigation of Multiple-Disk Turbines", Journal of Engineering for Power, Jan. 1965.

Rice, Warren, "An Analytical and Experimental Investigation of Multiple-Disk Pumps and Compressors", Journal of Engineering for Power, Jul. 1963.

Rice, Warren, "Tesla Turbomachinery", Conference Proceedings of the IV International Tesla Symposium, 22-25, Serbian Academy of Sciences and Arts, Belgrade, Yugoslavia, Sep. 1991.

Tahill, William, "Theoretical Analysis of a Disk Turbine (1)", Tesla Engine Builders Association: TEBA News Issue # 15, 1998.

Tahill, William, "Theoretical Analysis of a Disk Turbine (2)", Tesla Engine Builders Association: TEBA News Issue #16, 1999.

Valentin, Ingo, "More About Hybrid Drives", Tesla Engine Builders Association: TEBA News, Winter 1995-1996.

Valentin, Ingo, "Valentin Technology Champions the HydroStatic Drive", Tesla Engine Builders Association: TEBA News Issue #7, Spring 1996.

* cited by examiner

SYSTEM AND METHOD FOR EXTRACTING POWER FROM FLUID USING A TESLA-TYPE BLADELESS TURBINE

FIELD OF THE INVENTION

This invention relates to the field of machines extracting and converting energy from fluid currents in motion, and in particular, it relates to a method and systems for efficiently converting the kinetic energy of preferably large cross-sectional areas of wind, river, surf, ocean and tidal flows into clean, zero emission, electric, hydraulic, mechanical or alternate work outputs utilizing ecologically preferable machines offering great power per weight in superficially motionless and substantially quiet packages.

BACKGROUND

In prior art machines which harvest the power of fluids in motion it is common practice to employ a rotor upon which are affixed, milled or moulded variously formed blades, buckets, paddles, vanes or other such appendages so pitched thereupon that when subjected to a fluid current, continuous molecular impingements, foiling and eddying interactions between the fluid-mass supplied and the commonly pitched appendages results in rotation of the rotor to which they are attached. It is appreciable, however, that while appendages responsible for developing rotation may be designed to render minimized flow obstruction and may advantageously induce airfoil (or hydrofoil) speed beneficiation, a sizeable component of the working fluid's kinetic energy is nevertheless rendered unavailable for work conversion by such machines due to losses owing to: the shock of fluid impingement upon appendages exposed to the moving fluid streams, and the resultant re direction and eddying of fluid molecules resulting from the process of driving certain prior art rotors at 90° to the applied fluid currents for at least part of their cycle; the 'swirl' effect caused by fluid discharging tangentially and in some cases radially from bladed or annular rotors due to surface adhesion and centrifugal forces acting over the rotating blade profile contributing to the development of wasteful downstream vortices; all components working to produce a disadvantageous backpressure effect tending to resist the forward momentum of subsequent fluid flow though the same cross-section. Attempts to reduce these effects have been made in some prior art such as by varying appendage pitch or yaw relationships with respect to some reference plane at key positions. with varying success, however, to compensate for the disadvantageous backpressure like effect, underutilization of swept areas is practiced by design, as evidenced by fluid-energy in a given cross-sectional area being allowed to pass through the area scribed out by the prior art appendages which occupy a limited percentage of the swept area 10 minimize the so-called Betz effect, defining the limiting efficiency of machines extracting energy from fluid currents in motion.

Run-of-river (ROR) hydro-electricity production is a less preferable form of energy extraction associated with river in-stream energy conversion (RISEC) which incurs varied ecological impacts depending upon specific method" employed. Unfortunately and typically, this involves the diversion of significant water resources into pen-stocks bound for points of generation some distance away, which invites ecological concern due to its considerable effect upon the habitat of aquatic life, a consequence that true RISEC applications may avoid.

While prior art in the emerging field of tidal in-stream energy conversion (TISEC) harvests clean energy from seawater in motion, these typically bladed devices present danger of injury to aquatic life which may be driven under powerful tidal or oceanic currents unto impact with rotating blades disposing moving obstacles in the path of indigenous aquatic creatures. Whereas skirt augmenters (5) may be employed to develop venturi-like pressure reduction behind bladed rotors housed within the skirts to increase rotor speeds and extractable power output with the generation of greater flow-rates there-through, these devices may concurrently increase the risk of more serious injury to aquatic life through the speed increases sought, especially at the blade extremities.

Thrupp type turbines (6) wherein working fluid shears across the surfaces of discs, both entering and exiting disc packs at substantially opposite points on disc peripheries, may be said to operate primarily in friction mode. Whereas this type of disc turbine has been erroneously been mistaken as representative of Tesla type disc turbines, it has been analyzed (21) and was calculated to operate comparatively at only 42% of the effectiveness of Tesla type turbines (22).

TISEC prior art provided by Belinsky (8) proposes utilization of funnel collectors with larger ends facing on-coming ocean currents and directing smaller concentrated flows accumulated by the funnels toward Darricus type turbines. Whereas collectors in the method provide added energy to turbines for conversion, these types of turbines suffer losses similar to those already described in respect to bladed turbines, and no means is provided for discharging into lower than ambient pressure fluid streams to increase the efficiency of the method.

The advantages disclosed by Finney (9) for use in various fluids including air and water further providing dramatic velocity and power increases in working mediums at length applied to axial turbines located adjacent the throat of serially staged venturis of sequentially larger cross-sections are significant, however, are also subject to energy losses described through their utilization of bladed turbines.

While Bosley (11) offers inherently minimized electrical generation losses leading to less heat loading of waters surrounding TISEC devices, even with the optionally proposed flow-enhancing shroud, the annular rotor comprising a plurality of paddles introduces bladed art deficiencies already discussed, and no impeller improvements are suggested to improve rotor speeds for greater conversion gains.

Borgesen (12) provides complete swept area utilizations in TISEC apparatus utilizing regularly spaced underwater sails gainfully driving transmission lines with the direction of the applied tidal force which further drive electrical power generation means. However, the drag coefficient utilized while limiting to cavitation permits significant energy escape in the fluid reintroduced to the ambient tidal flow resulting in lateral displacement thereof in a common direction potentially changing the sedimentation patterns at depth further affecting marine life habitats.

While Dial (13) provides overhung, fixedly spaced disc turbines having at least one adjustable inlet to vary the angle at which fluid contacts the discs, vary the rotational speed of the impeller, and further vary the volume of fluid flowing through the impeller assembly, means are not discussed for the utilization of natural fluid currents other than those induced to fall through a penstock, a device which the presently disclosed invention seeks to eliminate.

The wind-turbine of Stanton (14) suggests form-induced air acceleration with a funnel shaped concentrator and axial bladed turbine to harvest energy from the added pressure differential obtained via discharge of energized turbine throughput into a lower pressure region in the lee of the proposed collector, however, Stanton's method is also subject to the disadvantages described regarding bladed turbine losses, and similarly does not expound upon an advantageous method to further reduce downstream discharge back-pressures. Also, this method neither suggests nor enables service in non-compressible fluid environments as the 5% outlet to inlet cross-section disclosed would tend to stagnate the bulk of the fluid mass in water applications.

Whereas Couture (15) provides multiple sail collectors to concentrate combined wind feeds to supply a turbine for power generation means, the method disclosed requires that fluids provided by sail collectors undergo two energy consuming changes in direction prior to transfer through a lengthy conduit to work generation means, further reducing the work potential realized in the method through pipe friction losses within the conduit.

Bladed horizontal axis wind turbines and arrays thereof, generally thought to comprise modern-day wind-farms typically provide increased power benefit through installation in high wind areas, however, these areas may be coincident with fly-zones and/or nesting grounds of eagles, falcons and other endangered bird species put at risk of injurious collision with the moving rotors of such machines. Technologically assuming great proportion in part to overcome anticipated, previously described losses observed, bladed prior art spinning faster in high ground areas put birds of flight at increased risk of consequence. Further, the aesthetics of visual and sonic impacts in residential and other areas currently limit the extent to which wind energy harvest as it is known today is utilized.

Airborne prior art (16) comprising buoyant, inflatable rotors secured to ground stations via tethering may attain lofty station at altitude providing access to wind resources unsurpassed in the prior art. While offering large fluid collection surface areas and low ambient work generation fluid cut-in speeds, and rotors utilizing the Magnus effect for positional stability, they may otherwise adversely present obstacles for aviators, the power extraction capacity offered therein are nevertheless lower than bladed wind turbines.

Vertical-axis wind turbine art disclosed by Nica (17) employ Tesla disc turbine runners fitted with curved blades affixed about disc perimeters and helical ribs on disc surfaces, all centrally mounted for rotation within an array of stationary, tangentially arranged, outer fluid guiding members. While affording speed beneficiation of approaching wind via the convergent-divergent external guiding means disclosed, the disposition of internal disc-separating helical surface appendages provided may otherwise limit the efficiency of the disc turbine internally employed, since to provide best effect, working fluid in disc turbines should be free to travel in natural streamlines of least resistance (1) to maintain laminar flow between co-rotating discs. Whereas this may require that working fluid complete possibly many revolutions between disc surfaces for optimal effect, this requirement is largely prevented in the method by the inter-disc ribs forcing working fluid to follow multiple pre-designated trajectories each potentially introducing turbulence between discs and efficiency losses accordingly.

In general, issues such as low frequency noise from rotating blades slicing through gaseous and liquid fluids, cavitation of liquid fluids into gaseous fluid inclusions disrupting laminar flows across work generation surfaces further affecting both noise levels and power outputs alike in underwater turbines, and the general lack of machines able to engage greater fluid cross sections in work generation and or conversion currently limits the timely maximization of energy returns from machines of the prior art. Therefore there is a need for new method and systems for extracting power from moving fluids which may overcome more than one of these deficiencies in the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system and method for extracting power from fluids in motion. In accordance with an aspect of the present invention, there is provided a fluid powered work generating system comprising: one or more disc turbines each having an inlet and an outlet, said one or more disc turbines configured to advantageously interact with motive fluids for work generation by providing inter-disc spacing between adjacent disc elements advantageously respecting fluid kinetic viscosity and rotor angular velocity; a fluid collection device configured to increase the velocity of fluid currents passing through swept regions, the fluid collection device in fluidic communication with the inlet, the fluid collection device configured to capture a substantial portion of the fluid prior to providing the portion of the fluid at one or more inlets; and a fluid extraction device in fluidic communication with the outlet, the fluid extraction device configured to deliver a second portion of fluid, said second portion of fluid being delivered at an advantageous initial pressure and velocity and acting upon one or more outlets through viscous drag, thereby enhancing extraction of the portion of the fluid from the outlet.

In accordance with another embodiment of the present invention, there is provided a method for generating power from fluids in motion, said method comprising the steps of: intersecting a cross-section of moving fluid with smooth, inclined and or cambered, rectangular or other prismatic or revolved open or closed-form fluid collection device surfaces developing thick sheet-like, or venturi-like fluid flow thereover or there-through of enhanced velocity compared to the ambient fluid velocity; and capturing a portion of the enhanced velocity near surface fluid flow conducted thereacross said fluid collection device surface; and directing said provided portion of the fluid at an advantageous angle of attack toward partial admission, or directing multiple or thicker flow cross sections of enhanced velocity fluids toward full admission about the periphery one or more disc turbines, while maintaining parallel relationship between the direction of fluid approach and the planes defined by the surfaces of the discs of the one or more disc turbines; and providing advantageous disc turbine design features, including: disc diameters suited to operation in available fluid current velocities; advantageous inter-disc spacing not less than the optimal disc spacing related to kinetic fluid viscosity and rotor angular velocity; disc shape and texture concerning to laminar flow characteristics; and equipping disc turbine discharges with close-fitting outlet connections diverging with distance therefrom; and providing a fluid extraction device configured to deliver a second portion of fluid into fluidic communication with the outlet flow of one or more disc turbines, said second portion of fluid being delivered at an advantageous pressure and velocity and in leeward facing alignment with holes conducting disc turbine outlet flow such that the one or more discharge outlets of the one or more disc turbines are acted upon by significant viscous drag and entrainment capacity, thereby enhancing extraction of the portion of the fluid from the outlets; wherein said disc turbine or disc turbines interact with the fluid thereby generating power.

In accordance with another embodiment of the presently disclosed invention, there is provided a means with which to effect variable cross-sectional area fluid intersection by the fluid collection device, as well as control thereof, to •enhance the energy made available for extraction by disc turbines of the method from given 'swept areas' of ambient fluid currents, whereby the fluid collection device may include an automatic means for achieving the desired fluid cross-section intersect and resultant enhanced fluid velocity control effects at run-time, through the employment of: one or more actuators such as piston actuators attached to opposite hulls of preferably mirror image halves of a given device embodiment; further provided a preferably analog control signal or pressurized control fluid in response to; fluid speed information received from a dynamic pressure indicating device such as a pitot tube positioned in the flow-stream which may be readily provided to; a programmable logic controller (PLC) or other independent feedback-loop controller with PID loop control capability able to respond quickly in rapidly fluctuating conditions, to compare and calculate a new position-respecting control signal, further; received by positioning-capable actuators, or intermediary transducing elements further conveying said control signal or control fluid to actuators to cause the required extension or retraction in response to controller-issued commands as required, which may for instance, cause extension upon decreasing dynamic pressure inputs, and or retraction upon increasing dynamic pressure inputs so as to maintain controlled height positioning, disposed cross-sectional fluid intersection, and achieve a steady or enhanced fluid velocity and structural loading condition under changing ambient fluid conditions. Notably, controllers with adaptive gain and or fuzzy logic may prove advantageous in such applications where learned tendencies in fluid current patterns may be repeatable to a degree.

In accordance with another embodiment of the presently disclosed invention, there may be provided optional angularly positioned and extendable aperture-lip and control means therefor in the aft section of the inclined fluid collection device, which due to the nature of being angularly modulated as previously described, may thereby alter the resultant trajectory of fluids passing there-over at different velocity in combination with the continuing pressure of the ambient fluid current itself, such that the re-directed fluids may no longer be directed optimally for best work extraction efficiency. Accordingly, since it is advantageous that the most rapid and therefore highest energy fluid stream be directed toward the periphery of volute-contained disc turbines effectively, control means may be provided to induce the greatest energy fluids passing through the produced vena contracta cross-section to an advantageous trajectory toward work extracting disc turbines of the method under substantially all fluid collection device angles of attack, and resulting altered fluid trajectories caused in connection with the variable inclination fluid collection device, in order to provide increased power in work extraction fluid streams relative to ambient or otherwise-provided fluid streams of a base velocity. Utilization of angularly modulated volute-lips may also aid in remote-clearing of accumulated debris from the volute and disc turbine periphery, by cycling the angle of attack at which of fluids enter the housing under significant dynamic pressure.

In accordance with another embodiment of the presently disclosed invention optionally adjustable and positioned fluid collecting canopies which may be provided and joined together with a connection means further actuated via positioning means well known in the art to different positions further causing the fluid collecting canopies to adjust to various angles of attack with respect to the approach of fluid currents forced to pass over the fluid collection device such that a greater portion of enhanced velocity mass-flow may be induced to enter into preferably vertically formed volutes of the method to increase energy conversion by the disc turbines of the method contained there-within said volutes, which in embodiments not employing variable area fluid collection or variable position aperture-lip features, may significantly assist with working fluid collection especially when utilized during periods of lower flow velocity frequently observed in ambient fluid service.

In accordance with yet another embodiment of the presently disclosed invention, there is provided optimized efficiency and resultant energy extraction capability from disc turbines through advantages afforded in conjunction with real-time adjustment of inter disc spacing which may be new in the art of disc turbines, and in which: a control fluid of lesser dynamic viscosity is regulated to reach a calculated load pressure and fills a cavity between substantially thicker rigidly aligning end-discs and adjacent more-centrally disposed adjustably positioned spacing discs, or pressure plates; said pressure plates riding upon smooth through-bolts and engaging same with precision bored holes about +0.0015" larger in diameter than through-bolt outside diameter or any other close-fitting serviceable tolerance, and separated from next centrally located adjustably spaced active disc(s) by precision corrosion-resistant springs and spacing elements, with spacing elements riding upon said through-bolts, and springs riding upon spacing elements; with sets comprising two springs and one spacing element present between all centrally located active turbine discs at each through-bolt location throughout the (disc turbine) runner, and also between those discs and the spacing discs; the spacing elements having three diameters of concern, namely: an inner diameter closely matching through-bolt outside diameter; a central outside diameter engaging the inside cylindrical surfaces of larger diameter holes milled into the discs of larger diameter than the through-bolt diameter; and one other outside diameter dimension at either end of the spacing element, which is slightly smaller than the spring inside diameter, yet larger than the through-bolt hole to allow shuttling of the spacing element within the thickness of the disc while engaging same substantially rigidly as mentioned about the cylindrical surfaces; with springs under maximum required compression permitting a minimum inter-disc spacing, and springs under a moderate compression permitting a maximum inter-disc spacing; spacing elements only engaging discs perpendicular to direction of shuttling motion; springs engaging discs and spacing elements longitudinally; springs preventing bottoming of spacing elements while under maximum compression; through-bolts remain fixed in thick end discs; spacing elements engagement sized to allow full adjustable disc spacing span while largest outside diameter thereof is limited to travel within the thickness of the discs to maintain laminar flow; such that upon changing control pressures applied at length by a controller in response to feedback signals representing working fluid temperature and angular rotation of the disc turbine or turbines, shuttling of the pressure plates is effected; causing either more or less compression of interposing corrosion-resistant springs exerting largely uniform forces longitudinally upon inner-hole disc surfaces and the larger flat surfaces at the end of the spacing elements adjacent the outer diameter thereof; said spring compression resulting in largely uniform inter-disc spacing of adjacent disc elements via pressure regulation automated at run-time; said pressure regulation onboard or remotely provided; said method applicable also to centrally located spacing elements about the shaft, except for the addition of a shaft guard which may extend and retract as required, but which has no bearing upon laminar characteristic said lower viscosity control fluid further having the added advantage of preventing fluidic drag on the outside surfaces of the end discs, which in liquid fluid applications may represent significant drag concurrent with means for providing optimized disc spacing for optimal which may help to provide increased performance under a wide range of fluid conditions; said method applicable to disc turbine, disc compressor, and disc pumping applications.

In accordance with yet another embodiment of the presently disclosed invention, there are provided advantages specifically respecting and which may only be enabled by disc turbines, namely: the provision of compact prime-movers offering great working surface areas; speeds of operation and energy conversion not limited by cavitation in liquid fluid operation; a plurality of channels wherein highly efficient energy conversion occurs; the capability to isolate upstream pre-accelerated fluids from dynamically lowered downstream fluid extraction device pressures, except by way of fluidic passage through efficient work-extraction channels supplied by the disc turbine prime mover, through which fluids aided by the enhanced velocity endowed by the fluid collection device may be driven while these fluids are effectively drawn through viscous fluidic drag applied by external higher-than-ambient velocity fluid currents release over and across the fluid extraction device through which the turbine exhaust flow is further drawn in conjunction with close-fitting turbine discharge ducts, said close-fitting discharge ducts being mounted in close-coupled communication with self-adjusting fluid extraction device openings to allow maximal entrainment of the turbine discharge by the viscous fluidic drag being applied there-across, and upon which a siphon is thereby effected. Said siphon developed may further enhance the efficiency of the turbine work extraction process(s) since it assists the rapid clearing of turbine throughput, helping to minimize the Betz effect upon this system. Also, energy normally wasted in disadvantageous drag upon prior art is in this system rather applied as an advantageous siphon, or negative backpressure, may aid the turbine work extraction process. Overall, the divergence of the fluid extraction device in conjunction with the siphon placed upon the fluid extraction device openings, and by extension the turbine exhaust, results in pressure recovery tending to prevent cavitation across the fluid extraction device while it re-fills the volume behind the invention embodiment with the working fluid having passed through the turbine to generate work, effectively causing the energy of the cross-section of fluid not directly entering the inlet of the disc turbine to be applied as suction to the turbine exhaust which helps to draw the fluid through the invention embodiments and in the process increase the efficiency of work extraction.

In accordance with yet another embodiment of the invention, then is provided a method wherein synergistic arrangement of elements may be configured such that a powerful partly forced and partly free vortex flow system may be developed through the employment of advantageously formed volutes forcing fluids to follow a spiral trajectory unto convergence with on-board disc turbines.

In accordance with an aspect of the invention, there is provided a method largely concealing and therefore protecting the rotating work-extraction elements of the system from perilous impacts and large structural loading of often fragile blade-tips common in the prior art. In particular, the design referred to may allow the one or more on-board disc turbines to be largely concealed within a volute, and housed in this fashion may thereby receive working fluid through rectangular apertures in the fluid collection device at length tangentially directing working fluid to the periphery of the cylindrical profile disc-pack, or runner, while being recessed inward from the surface of the fluid collection device in which they are housed. Rotating in the direction of the oncoming fluid currents, while being removed there-from in this fashion, enhanced velocity fluid currents following the smooth Coanda profile of the fluid collection device may be provided thereto with a an acceptable degree of turbulence while substantially eliminating the possibility of direct impact with such underwater hazards as submerged debris, logs, negatively-buoyant icebergs, and other such perils.

In accordance with still another embodiment of the invention, energized fluid streams of greater than ambient velocity may be provided without incurring greater risk to either avian or aquatic life. Through the employment of disc turbine prime movers, various design options are afforded which may include the use of different turbine housings, including those of volute form, as previously indicated. Necessarily longitudinally open in form parallel to their axes of rotation to permit significant volumetric throughput there-into volutes essentially forming the housing of the contained disc turbines, the volute-housings may direct energized fluid streams unto either proximate or abstracted tangential convergence with disc turbine runners. Where concerning, volutes may preferably direct working into near-circular or vertical approach trajectories toward tangential convergence, while remaining removed there-from. In this fashion, the working fluid being comprised of molecular sized particles may be readily admitted into the small inter-disc spaces of the disc turbine runner to generate work, while fish or foul being small enough to enter the volutes by contrast cannot enter into disc-runners, being of far greater dimension, and with the further provision of volutes demarcated with flexible and or cushioned lip features, and volute features which terminate radially distant the disc turbine runners, safe passage into as well as egress from the volute system may be afforded, especially with the further incorporation of volutes of longer dimension than those of the disc turbines contained there-within, ensuring an ecologically responsible fluid energy extraction process.

In accordance with another embodiment of the invention, the prior art run-of-river ecological implications of stream diversion may be largely averted by the presently disclosed invention which offers true in-stream RISEC embodiments not requiring the removal of any water resources from local ecosystems. Deployable in singular or arrayed embodiments of minimal head requirement, moored, tethered or otherwise anchored embodiments of the presently disclosed invention may be raised or lowered to serviceable energy extraction horizons by adjustable means such as winches, and may further be pitched at any desired angle of rotation, vertical through horizontal, so long as the fluid collection device is oriented in the up-stream direction. Without need of water resource diversion, this method may also provide an ecologically benign alternative to hydroelectric damming operations responsible for large-scale methane off-gassing of great concern due to its effect on global warming.

In accordance with yet another embodiment of the invention, the presently disclosed invention offers new in the art opportunities to utilize advantageously modified fluid collection and extraction device features of RISEC embodiments to aid in the prevention of riverbank erosion concurrently with the generation of power, or may alternately offer other work conversion opportunities. By positioning an array of vertical axis invention embodiments in a rushing river, for example, with fluid collection and extraction devices thereof oriented so as to direct the dynamic pressure of the on-rushing currents in a desired direction of river course which may beneficially be away from eroding river banks, the flow-redirection effected may help avert further river-bank erosion while concurrently generating clean power with a system modified to provide co-axially rotating auxiliary disc-runners of the compression or pumping design (2) on the same shaft as the RISEC invention embodiments instead of or alongside electrical generation means of the same embodiment. Co-rotating, yet isolated from underwater turbines of the method through the provision of a mechanical seal or magnetic coupling, via hose or pipeline connection of the auxiliary disc runner axial intake(s) to sources of fluid such as flooded basements, flooded properties, or even flooded estuarial regions, constant pumping action may readily he provided by a river powered RISEC device in the absence of auxiliary power or fuel.

In accordance with yet another embodiment of the invention, another RISEC power opportunity may afford benefit from reduced electricity costs through the use of river power, wherein the known advantages of the Tesla disc device as a vacuum pump of exceptional capability (18) may be utilized to provide clean pumping action in yet another fashion. This application, valid up to about 33 ft of water head depending upon various factors, may be utilized to fill reservoirs or transfer fluids between tanks by equipping RISEC invention embodiments with isolated and air-tight multi-staged air-compression disc runners of preferably larger diameter than the water turbines driving the co-axial couple beneath the water. Alternately this application may be provided electricity harvested from the RISEC embodiment further utilized to drive a similar, but smaller disc runner at speed. In this mode, valve-interruptible connection between the intake of an energized disc vacuum pump and the top side of a vacuum-pressure capable transfer tank of suitable capacity may provide ready evacuation of the limited air within the and cause external filling thereof via atmospheric pressure on the surface of an open-to-air transfer fluid source such as an in-facility tank, or another source of fluid such as from a desired source tank from which fluid may thereby be substantially vacuumed into by the disc device. Subsequent isolation, via valves provided, of the source and vacuum lines may then effected and the tank-filled fluids may thereby gravity feed to the desired destination. Notably, the torque conversion aspects of such an operation would allow discs of greater dimension than the RISEC turbine-mode discs employed below water, and with sufficiently fast river water velocity, multiple stage pumping action may be readily made available without intermediate speed increase of the vacuum loop.

In accordance with still another embodiment of the invention, there is provided a method which by contrast to some of the prior art does not swirl or substantially eddy the ambient medium upon release thereby avoiding wasteful downstream vortices. Wakes produced by preferred embodiments of the presently disclosed invention by contrast may be largely laminar in nature, which may be ecologically preferable in many environments, for example, which may further avoid changing sedimentation patterns in marine environments over time.

In accordance with another embodiment of the invention, there are provided lighter than air, as well as lighter than atmosphere tethered turbine applications which may significantly increase the rate of energy extraction afforded by the current art in this field (16) which is currently limited to being half as efficient as bladed art wind turbines, in terms of effective energy utilization from cross sections of fluid intercepted. In foreseeable integrations of the presently disclosed method with the current art in this field, new hybrid applications may provide very efficient combinations of technologies possibly exceeding bladed art efficiencies. Advantageously, current airborne art in this field already provides many of the required elements for successful operation and implementation of the presently disclosed method. Lighter than air as well as lighter than intended atmosphere of service discs and structures are thereby contemplated by this invention, whether these may be made internal to existing art designs, or may take alternate, wholly new embodiments of disc turbines proposed herein to offer universal atmospherically borne disc turbine power generation.

In accordance with another embodiment of the invention, there are provided means to couple the invention with various forms of work generation equipment which although not the focus of the invention, may nevertheless take many forms, such as variable-speed or speed-compensated: electrical generation means such as permanent magnet generators of various design typically providing 3 phase power outputs via rectification and inversion means commonly known in the art, or which may alternately be provided through mass-production of alternate electrical generators offering low cost, scalable permanent magnet generation means (27) may be economically made in large quantity to reduce foreign dependence of timely generator supply. Traditional electromagnetic generation means well known in the art may also be provided with appropriate speed conversion means where required. Documentation of disc devices (1, 2, 3, 18, 19, 20, 23, 24, 25, 28, 29, 30, 31, 32, 33), indicates that these offer exceptional torque conversion capabilities which may also be further utilized by the presently disclosed invention to offer deferrable work generation capability through this torque conversion capacity. In this mode suitable size-ratios of discs on shafts which may be remote from each other, to the extent that frictional losses incurred within the pipe or tube used to transfer fluids is preferably negligible, may produce complimentary torque transmitters and receivers as required, with one or more consumers using pressure energy from the fluid to generate work (turbine), and one or more producers adding pressurize energy potential to the fluid mass contained therewithin said conduit (pumps, compressors). In either case, documented to be smaller than prior art working fluid requirements of disc devices combined with their useful capacity for simple multi-staging may generate complimenting service advantages in conjunction with embodiments of the presently disclosed invention. For example, a single or multi-stage hydraulic compression runner may be utilized to pressurize, for example, a hydraulic (or pneumatic, if desired) pressure accumulator, and at some later time, demand for energy may actuate a valve supplying pressure to a regulator providing a regular feed of working fluid to a hydraulic motor (which may also comprise a further set of discs appropriately spaced, and or staged, of suitable dimensions enclosed in a housing, and) attached to a generator shaft to produce the required power on demand. In this case appropriate supply and return fluid lines would need to be provided, however these may be considerably less expensive than the cost of a comparable run of electrical cable required for a similar power transfer through electrical lines requiring further expensive safety grounding.

In accordance with yet another embodiment of the invention, there are provided in application of disc turbine prime mover and other disc device means as utilized herein new opportunities to decrease pollution levels and greenhouse gas loads playing out a currently unknown outcome on the changing atmosphere and Earth-wide ecosystems. For example, properly staged disc turbines utilizing shaft-torque developed by natural fluid currents discussed may be concurrently applied via co-rotating axially staged disc-compression means in-taking captured industrial and other carbon emissions supplied from ducts transferring same to compression plants, and via direct centrifugal acceleration thereof in combination with appropriately formed dynamic-to-static pressure recovery volute means, may convert atmospheric pressure $CO_2$ emissions bound for deposition into carbon dioxide sequestration vaults into a greatly pre-compressed product with substantially no negative environmental impact as may otherwise be imposed by burning fossil-fuels either directly or indirectly to provide the power required for the same compression gains. The compressed $CO_2$ product may then be provided to further compression and cooling means to liquefy the pre-compressed product, thereby minimizing the load and cost associated with maintaining carbon sequestration means into the future.

Alternate uses of the derived shaft power may include utilization of other c-co-rotating disc compression means in single or multi-stage configurations to provide hydraulic or pneumatic compression of preferably ecologically benign working fluids which may be further applied, for example, to reservoirs for storage and capacity as well as to source remotely located pressure regulation means providing constant pressure feed-streams to further remotely located disc turbine means for purposes of deferred work generation of various types already disclosed.

Whereas self-alignment of invention embodiments into opposition with ambient fluid currents and or simple manual adjustments may be offered by device embodiments and or between devices in arrays to minimize onboard power consumption and complexity while still enabling desirously large power outputs in operation thereof, alternate automatic control of many adjustable features of the presently disclosed invention may otherwise be provide for optimized operation over a wider range of run-time conditions of operation. In particular, some or all of: pitch modulation in horizontally oriented embodiments; yaw modulation in vertically oriented embodiments to better accept and convert differently approaching fluid fronts; horizontal and or vertical offsetting useful in arrayed device realizations; variable cross-sectional area 'swept region' of fluid collection to provide Bernoulli velocity increase in conjunction with variable cross-sections of ambient fluid interception; aperture-lip angle of attack and or optional extension thereof; optional volute extension and or angle of attack with respect to the vector of approaching fluid currents; extension and angular control over optional sail-type collectors to capture added enhanced velocity fluid capacity; optional variable disc spacing to provide largely optimal separation between discs; and optional variable discharge and or induction aperture cross-sectional area or form modulation may individually or all be advantageously provided in conjunction with variously located onboard feedback sensors and positioning processes provided by further actuation (s) in conjunction with electronic, hydraulic, mechanical or pneumatic means, PID control algorithm(s) and programmable logic control (PLC) means with which to achieve desired real-time control effects positioning of related variables to further provide advantageous operation under a wide range of operating conditions.

In PLC and SCADA controlled applications, a great wealth of operational information may be displayed and algorithmically controlled with a minimum of human intervention in normal operation, while allowing manual cycling adjustments whenever information provided indicates the need for same, such as such as: real-time speed measurement indicating turbine rotation at 40% of average across the array, meanwhile pressure differential across the turbine is the same as all others—may trigger operation intervention to alter the trajectory of the inlet flow such that a substantially reverse flow may be applied to the turbine periphery and or fluids passed into the volutes, so as to effect flushing of extraneous material or sediment build-up in volutes, which may potentially block to a degree the channels of disc runners, or remain in contact therewith. Further, with the benefit of data-logging and analyses thereof to in conjunction with maintenance and/or performance testing under different fluid speed conditions may provide readily extractable information on best parameter settings across the array for optimal power extraction or torque control, etc. Further information on fluid current speed, enhanced fluid velocity speeds, angular velocity, generator output, hydraulic pressure, angular pitches, yaws, rotations, inclinations, spacing, offsets, or attitudes with respect to other features or proximities to other devices, may all be logged to database and later cross-compared to extract operational characteristics if desired. Further automation or even manual adjustment of configurable aspects of arrayed-device realizations further providing intra-element pitch-modulation (in longitudinally horizontal embodiments), or yaw-modulation (in longitudinally vertical embodiments) in combination with vertical and horizontal-offsetting may enable leeward shroud wake profiles to provide 'energy conversion assist' to adjacently arrayed device elements and or to prior art located in a higher fluid velocity flow region beneficially created by embodiments of the presently disclosed invention.

For example, optimization of spacing and orientation in multiple device arrays may be effected such that, for example, a first array device in a sequence of substantially vertically spaced, yet substantially overlying horizontal longitudinal-axis devices may generate enhanced flow there-between itself and its adjacently vertically overlain members due as described by Bernoulli (see Equation 7), to the reduced flow channel between the devices added intra-element fluid acceleration provided by intra-device proximities leading to intra-array vena-contractae and flow enhancements. With first array element(s) being pitch and offset positioned such that the divergent Coanda profile of first array elements delivers said enhanced flows substantially in a fluid sheet either directly toward the volute(s) of second array device elements, or otherwise in a direction that assists fluid entry into the volute of second array device elements to a higher entry velocity, or alternately directs enhanced flow proximate and parallel to second array leeward device-shrouds such that the enhanced flow there-over helps to generate additional siphoning and entrainment action on the turbine discharges of second array device-elements to effect a greater pressure-differential there-across second array devices to enhance work output realized there-from.

Those skilled in the art of fluid dynamics will recognize myriad combinations of upstream and downstream fluid collection and fluid extraction forms possible, in which advantageous combinations of pitch, yaw, horizontal and or vertical offsetting may further be applied to enhance work recovery through the application of this method and its arrayed forms without departing from the spirit of the presently disclosed invention. These readily surmised combinations being too numerous to reflect upon herein and therefore depart significantly from the scope of this technology introduction have necessarily been omitted, however may beneficially be the focus of future investigation.

The arraying of up-tide and down-tide, and or up-wind and down-wind sequential elements may provide benefit through horizontal and or vertical offsetting to allow wake-stream flows providing energies not completely used in siphoning exhaust from upstream elements via drag to be directed toward or away from (form-design dependent) successive array elements in order to augment energy input as previously discussed, or may minimize losses by providing or minimizing flow separation effects at advantageous pressure recovery points on airfoils and hydrofoils of the method, thus utilizing moving boundary layers to advantage, while maintaining optimal longitudinal spacing such that optimized re-entrainment of fluids to ambient current velocity (post energy extraction) may also be naturally effected en-route to successive element(s).

Spacing of intra-array elements therefore is a key element in the method to best utilize each element's wake-energy to further benefit in forming intra-array-element vena-contracta regions further directed into, along, or beside successive array element slot inlets to force or assist to greater level, the mass-flow through the on-board disc turbines. In this manner, wake energy confined to a limited sea horizon may minimize energy loss and ecologic disturbance potential (re: downstream vortices creation typical in the prior art), and meanwhile, the laminar wake profile offered by the presently disclosed method provides engineering opportunities to further ensure that what fluid energies do not go directly into turbines, provides suction on the same turbine's discharge, and through arrayed extension of the same principles in combination with the laminar wake may further allow fluid energy extraction which more fully utilizes greater cross-sections of fluid energies than the prior art. Properly configured this method may by extension amplify kinetic energy 'passed' to successive array elements and may further result in a self-beneficiating, controllable, ambient fluid induced cascade akin to the waterfalls, or rapids naturally induced by local obstacles in known fluid streams.

In accordance with another embodiment of the invention, there may be provided herein a means for municipalities faced with enormous overhead costs associated with expensive and expensive to maintain equipment to substantially reduce these costs through implementation of the Tesla type disc devices in conjunction with the method of the presently disclosed invention, whereby clean electrical power generation and other forms of work may be provided in new applications made possible through their combination. Systems comprising elements of largely simple parts capable of being manufactured locally without need for overseas parts sourcing may further add new manufacturing and construction jobs to local economies, may reduce foreign dependence while minimizing extended financial and carbon-impact costs of long-distance shipping and business relationships. Specifically, for a modest investment entailing a fraction of the cost of one municipal-service sewage pump, for example, may outfit would-be technology users with a CNC-guided plasma cutter capable of producing the majority of the required parts and still be able to afford materials required to demonstrate the potential for further scalar savings.

BRIEF DESCRIPTION OF THE FIGURES

In drawings illustrating embodiments of the invention, wherein like figures represent like components.

Figure 1:
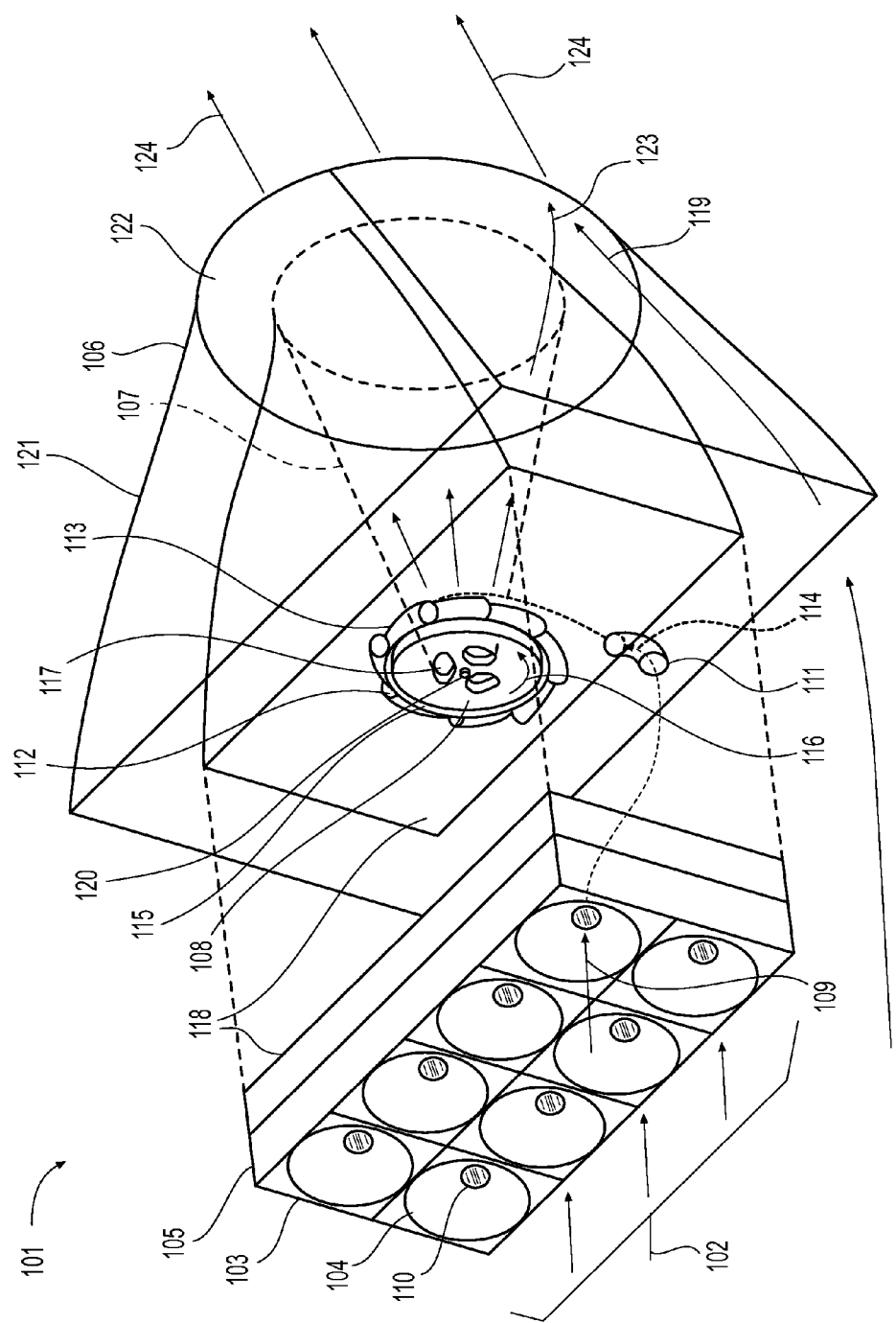
FIG. 1 is a side elevation view of a stationary embodiment of the invention with the prime mover plane of orientation at 90° to the: fluid flow.

Whereas FIGS. 1 through 11 obviously address potential applications in the atmospheric, or gaseous fluid, environment and may in some embodiments reflect greater fluid collection device and or volute feature sizes and convergence of form due in part to: the smaller direct loads implicated by lighter density gaseous fluid mediums on structures; and the favourably lighter weight attributable to the boundary layer of fluid adhering thereto the surfaces of invention embodiments; and the changing thickness of said boundary layers and the variation in weight attributable thereto said boundary layers under differing flow conditions; applications intended for service in gaseous fluid mediums must nevertheless adequately address indirect forces such as fluid drag upon those boundary layers, and also the effect of aerodynamic lift upon surfaces and structures, in order to safely express new embodiments for energy harvest from fluids in motion. Accordingly, designs such as that FIG. 10 in which mirror image halves having identical form over their fluid collection and fluid extraction device surfaces are provided to counter-act and potentially cancel lift effects altogether upon the support structures whereupon considerable lifting moments may otherwise be developed by strong ambient fluid currents, even while on a per-side basis the lift effect may be great to achieve the desirous energy extraction goals of the method of the invention. Meanwhile, the negative implication of fluidic drag, normally a disadvantageous in work machines, is rather turned instead into positive energy potential in the method, since herein the negative drag energy is caused by the method to act to drag fluid away from the turbine discharges, thereby increasing to a degree the energy extraction capability of the disc turbines employed.

Subsequently presented FIGS. 12 through 16 are contemplated for energy extraction in liquid fluids found in rivers, ocean currents and tides of slower, however, greater density and energy density. While these latter expressions of the invention require equal observance of the aforementioned forces, these same forces implicate much greater stresses upon structures in the water environments especially due to waters greater density and the effect this has on the weight of underwater device surfaces' effective boundary layer, and also of the effective drag forces implicated thereupon, in light of its much greater dynamic viscosity characteristic. Drag forces and hydraulic loads, while not the focus of the presently disclosed invention, are nevertheless recognized and contemplated to represent paramount design challenges for this technology in liquid fluids application, which is in part represented by the substantially mirrored-structures design character maintained throughout the embodiments intended for water application. With further respect to drag forces, however, better efficiency from the presently disclosed invention is contemplated than beyond that of the known prior art, since the described siphon effect disclosed in conjunction with the tangential velocity increase afforded through the employment of vortices, and other advantageous features of the invention may result in greatly increased benefit therefrom the siphon, which due specifically to the greater dynamic viscosity in water may act to increase the energy extraction efficiency provided by the fluid extraction device of the method. Better extraction still of fluids in conjunction with additional features of the extraction device may be provided, such as through the use of jets of upstream enhanced velocity fluids directed aft through slots passing adjacent to, or advantageously through the turbine discharge outlet and also extending through the extraction device as a whole to ensure maximum utilization of the energy possessed of the fluid is utilized in encouraging working fluid through the work extracting turbines, through the fluid extraction device, and preferably even leeward from the device to the engage down-current fluids to aid in the extended entrainment of discharged fluids. By contrast, however, drag actively inhibits achieving better efficiencies in prior art, especially in water and other liquid fluid applications, as evidenced by drag coefficients limiting their performance below cavitation levels which the presently disclosed invention may largely operate independently of in successfully implemented designs.

Figure 10:
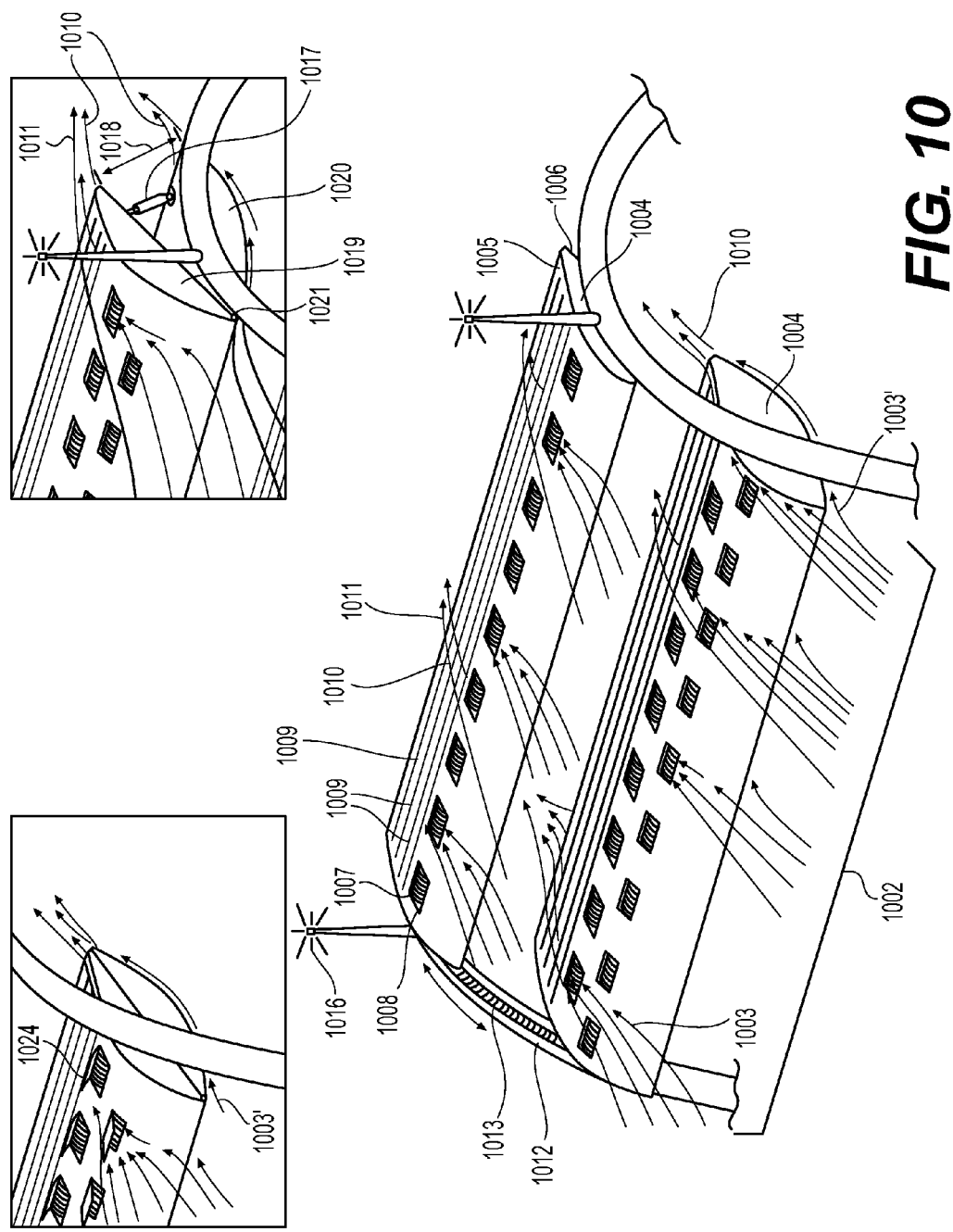
FIG. 10 is a side elevation view of a large cross-sectional area, zero-lift producing multi-element horizontal-axis wind energy harvesting application integrating rapid siphoning/induction of turbine discharge which may utilize adjustable or intelligent controls to modulate element elevation, pitch, intra-element separation and provide variable fluid cross-sectional area energy harvest in wind and equally in river and ocean applications.
Figure 12:
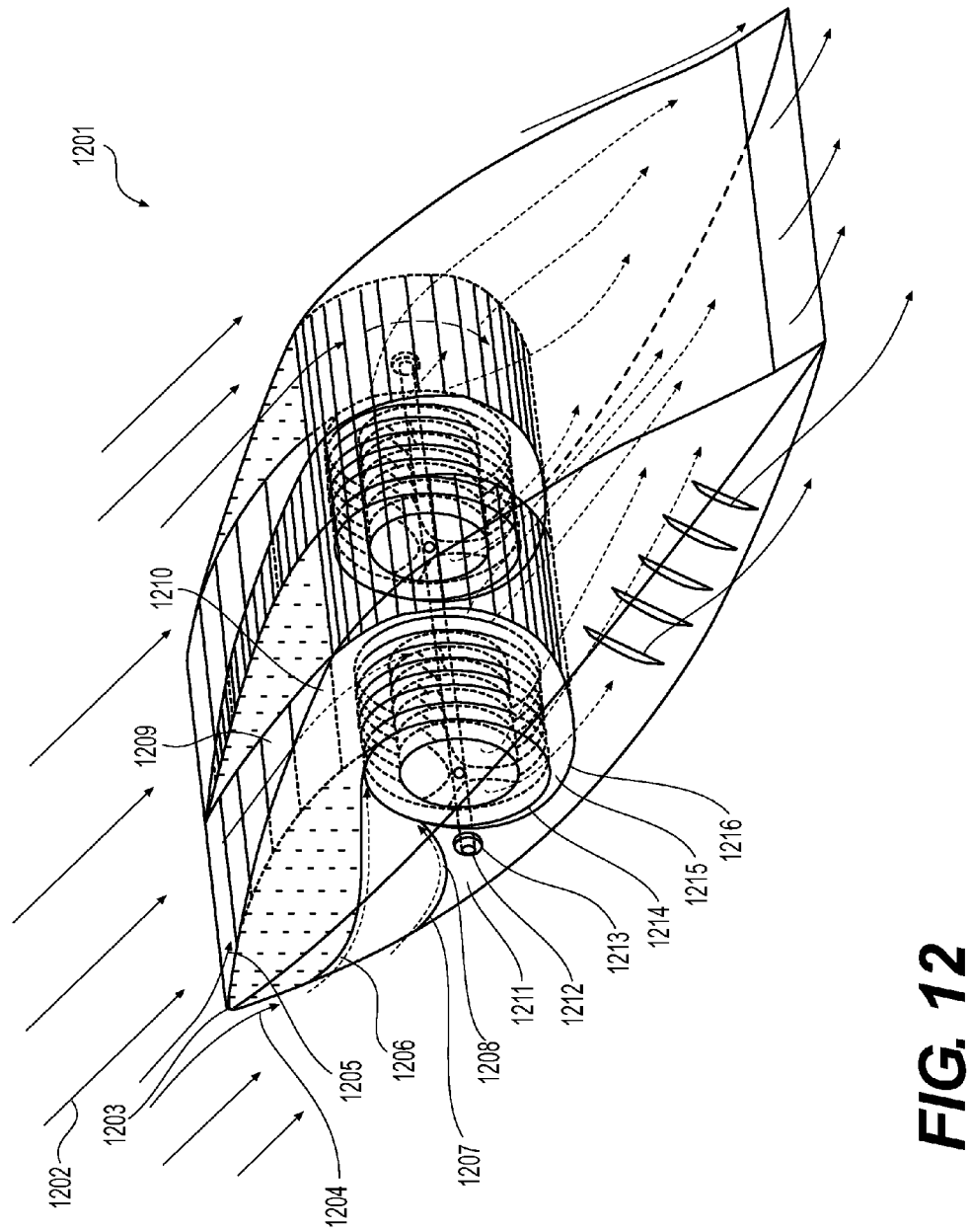
FIG. 12 is a side elevation view of the invention applied to RISEC, providing a tethered ecologically benign alternative to harmful run of river practices and damming operations.
Figure 13:
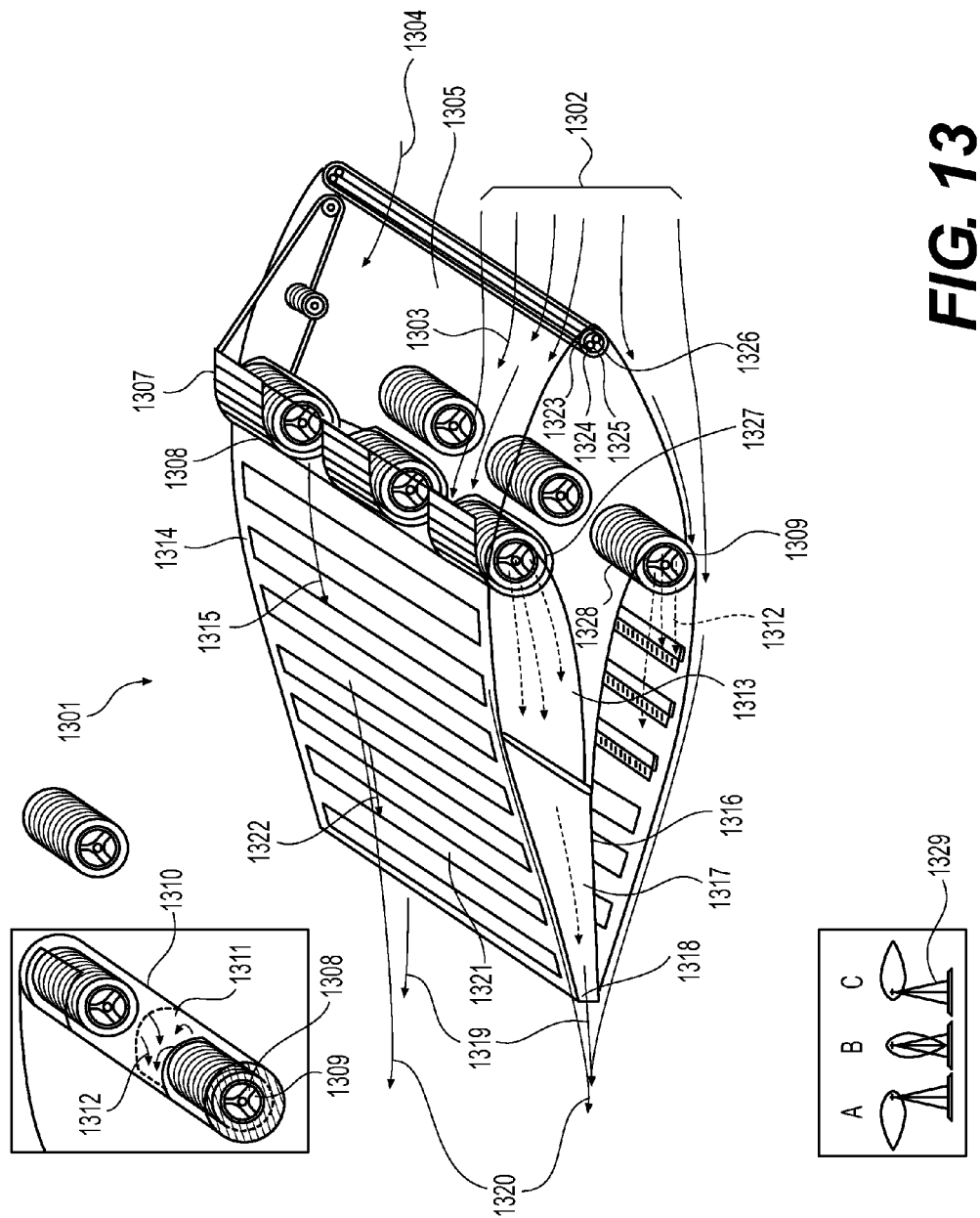
FIG. 13 is a side elevation view of the invention in the form of a tethered TISEC conceptualization providing zero-hydrodynamic lift characteristic, large cross-sectional area energy harvest, and offering bi-directional tidal flow capability.
Figure 14:
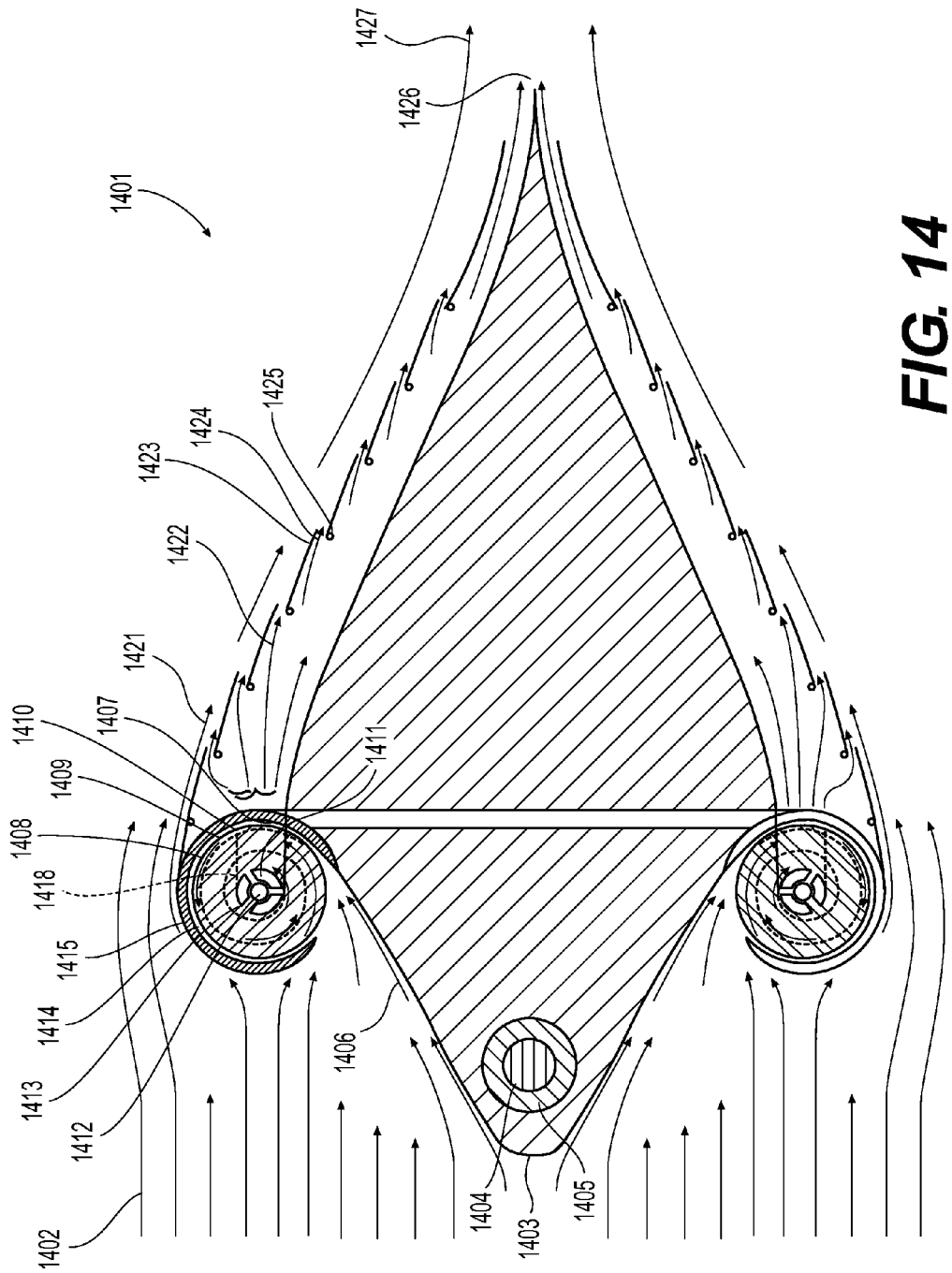
FIG. 14 is a cross sectional view of a further tethered or otherwise rigidly supported invention embodiment also providing zero-lift, large cross-sectional area energy harvest and bi-directional tidal operation while realizing a different direction of disc turbine rotation via feed streams application in opposite context.
Figure 15:
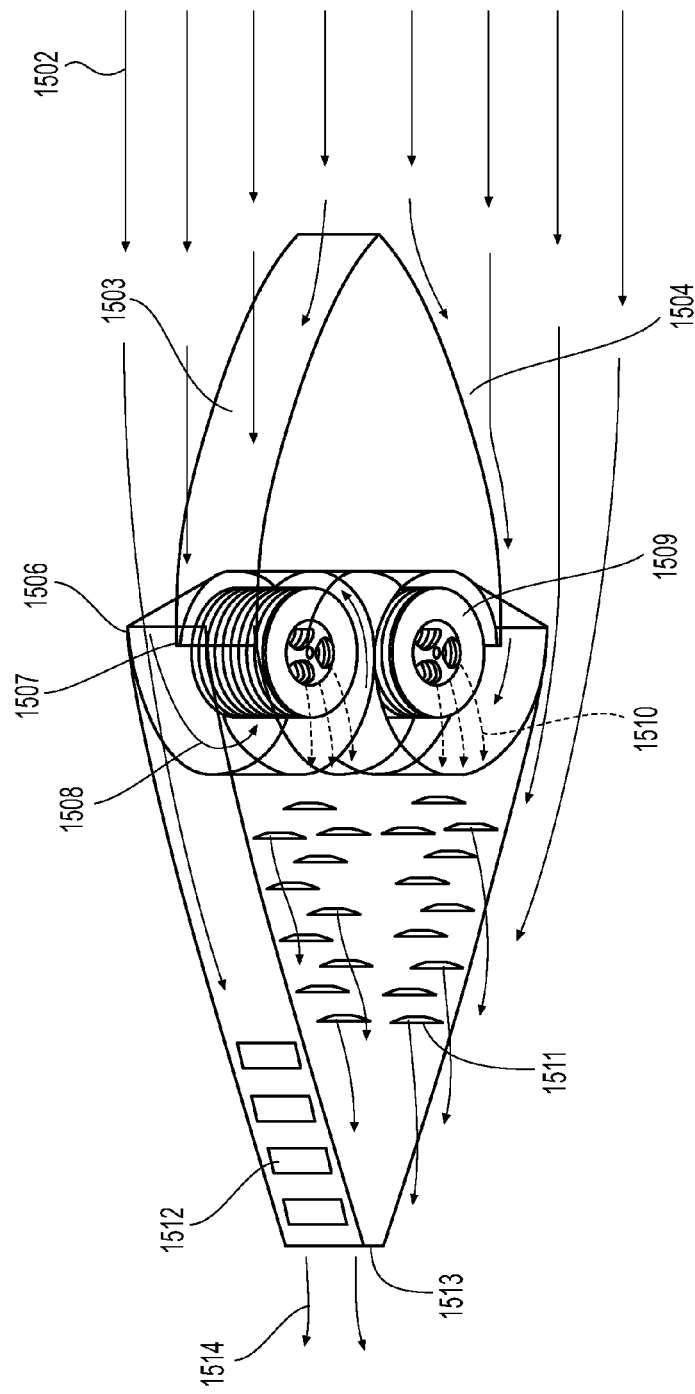
FIG. 15 is a side elevation view of a slim-profile, large volute invention embodiment utilizing side and rear draft techniques to rapidly clear system throughput.
Figure 16:
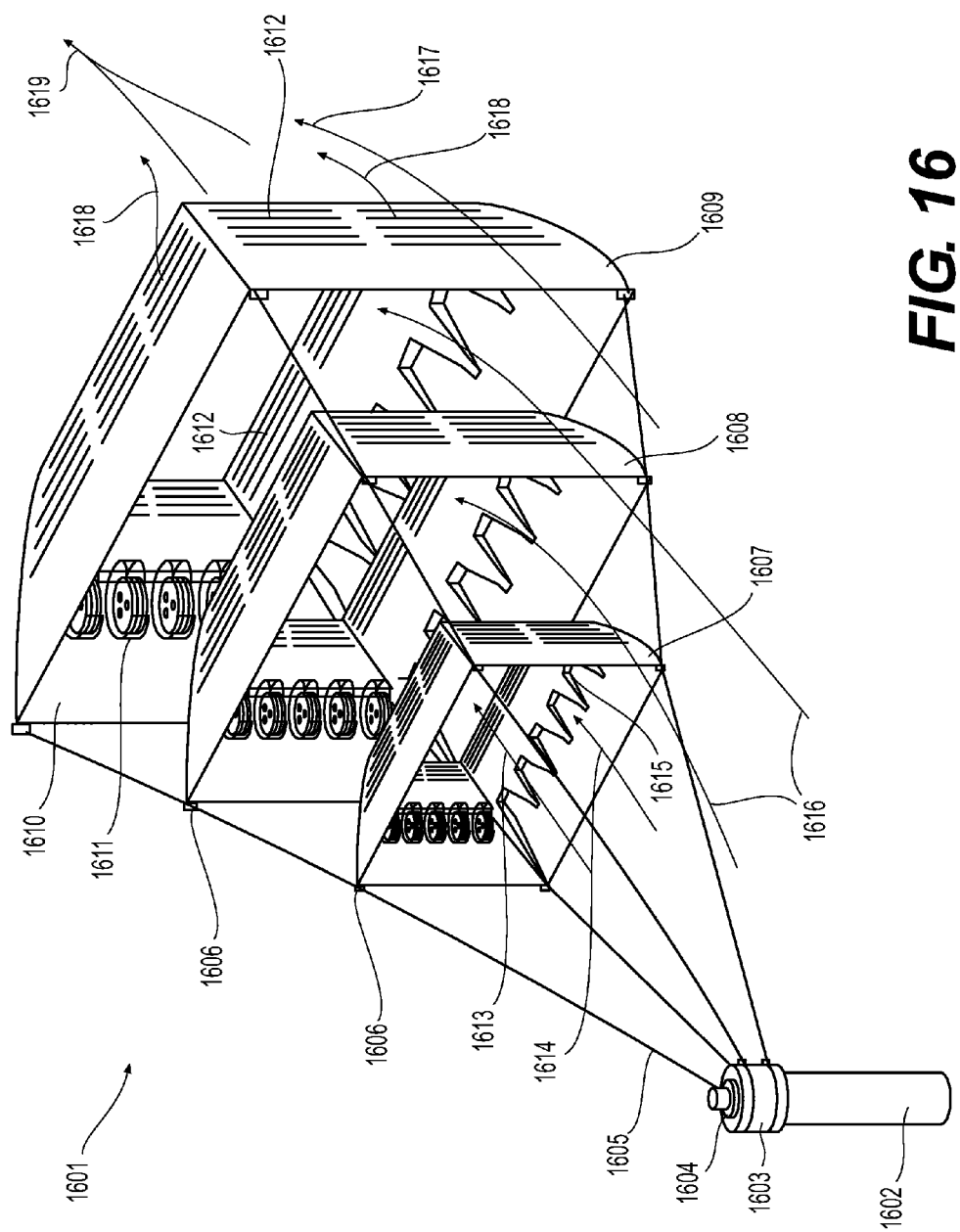
FIG. 16 is a side elevation view of an anchored and tethered in-line TISEC 'window' embodiment array of the invention which may induce added power capacity in down-current units under various ambient fluid conditions via intra-array element proximity control and venturi exhaust induction geometries.

Notably, the invention embodiment design of FIG. 10 may also be suitable to RISEC, TISEC, as well as previously unconsidered applications such as waterfall service, wherein variations of FIGS. 12, 13, and 15, as well as decreased height cross-section versions of FIG. 14, and possibly more rectangularly-elongate forms of FIG. 16, may also be suited for this application. Waterfall energy may be provided by the presently disclosed invention through the employment of appropriately contoured fluid collection device forms comprising those either shown or inferred herein to redirect the bulk of falling water into the turbine volute inlets or even advantageously there-around the devices of the method which may thereby convert waterfall energy in stages, or steps, equating to a modest overall resultant slope akin to a fast moving stream, rather than an insurmountable and un-utilized energy drop. Further, water fall energy of this design may not even present undue aesthetic displeasure, since devices under various light conditions may be hidden within or may possibly accentuate the visual experience of the falling water, since dependent upon appropriate materials selection such as aluminum or stainless steel depending upon the mean albedo and coloration of the falling medium, different effects may be produced which may be fascinating such as sunshine reflections to produce a sparkling array. A tether and support system therefore comprising great tensile strength cables in a serviceable array form is contemplated in this application to anchor, support, locate and restrain embodiments of more limited cross-sectional sweep further limiting structural stresses while prolonging tether life, the tethered units may be regularly offset laterally from each other in a transverse cascading array. In this fashion, the gravitational potential energy replenished between arrayed devices may be tapped allowing a new energy wealth, while producing limited, to no, through interesting visual impacts. Although in these environments application of the invention may necessarily entail consideration to greater material strengths and anchoring capacities amongst other considerations, waterfall energy harvest of a new kind may otherwise provide large power returns.

DETAILED DESCRIPTION OF THE INVENTION

Definitions

The term "fluid" is used to define any substance that deforms under an applied shear stress regardless of the magnitude of the shear stress. In general, any material that flows is a fluid, and includes any liquid or gas. Fluids may be characterized by properties such as the ability to flow and a lower resistance to deformation. A fluid may comprise therein solid or semi solid material, distributed homogeneously or heterogeneously, as, for example, in suspensions, colloids, or solutions. Examples of a fluid include are, oxygen, or other gas as would be readily understood by a worker skilled in the art. Further examples of a fluid include water, oil, or other liquid as would be readily understood by a skilled worker.

The term "gaseous fluid" is used to define a gaseous substance, for example air, oxygen, or other gas as would be readily understood by a worker skilled in the art. A gaseous fluid may comprise therein suspended solid or semi solid material.

The term "liquid fluid" is used to define a liquid substance, for example water, oil, or other liquid as would be readily understood by a worker skilled in the att. A liquid fluid may comprise therein suspended solid or semi solid material.

The term "heterogeneous fluid" is used to refer to a substance composed of both liquid fluid and gaseous fluid components for example sea surf comprising both liquid water and gaseous air components. A heterogeneous fluid may comprise therein suspended solid or semi solid material.

The terms "FRI", "LEED", "RISEC", "TISEC", "ROR", are used to define a Fluid Receiving Inlet, Leadership in Energy and Environmental Design, River In-Stream Energy Conversion, Tidal In-Stream Energy Conversion, and Run of River, respectively.

The term "venturi" is used herein to generally define a system comprising at least two complimenting entities providing a converging channel there-between said entities wherein an effect similar to the Venturi effect is produced whereby the fluid passing through said channel reaches enhanced speed while concurrently developing a significantly reduced pressure. Said channel may comprise paired entities which may be substantially solid, or may alternately comprise a combination of entities which may include at least one substantially solid surface in combination with at least one fluidic interface to define the opposite sides of said channel, so long as a similar effect is generated in said channel.

The term "Betz effect" is used to generally define the efficiency, or alternatively the optimal efficiency, of an energy extraction device used in conjunction with fluids in motion in which the maximum possible efficiency is 59%.

The term "runner" or "disc runner" generally refers to the rotor, comprising the axially separated discs, spacing elements, attachment means and accessories which embody the primary rotating element in disc turbines, disc compressors and disc pumps.

As used herein, the term "about" refers to a +/−10% variation from the nominal value. It is to be understood that such a variation is always included in a given value provided herein, whether or not it is specifically referred to.

As used herein, the term EVFES means enhanced velocity fluid extraction stream.

As used herein, for brevity with regard to control loop descriptions, the term "control signal" shall refer to a directly usable signal which has already undergone a necessary transformation into the energy form required to perform the final element actuation, whether said transformation is expressed or not, and whether or not said transformation is implied to be required or not . . . so that a final control element may be directly assumed to be capable of acting on the signal provided as if it had an on-board transducer for all possible energy transformations, for example, electrical to pneumatic pressure, or current to voltage, or low voltage to hydraulic pressure.

Unless defined otherwise, all technical and scientific terms used herein have the same meaning as commonly understood by one of ordinary skill in the art to which this invention belongs.

The present invention provides a fluid powered work generating system for generating work and/or energy from fluids in motion. The system comprises one or more disc turbines for interacting with a fluid for the generation of work, the one or more disc turbines each having both inlet and outlet features. In general, axially spaced discs of the one or more turbines may be configured to be capable of transferring shear force from a fluid in motion into a rotational force directed about the axis of rotation of the one or more disc turbines. The system also provides a fluid collection device in fluid communication with the inlet feature of the one or more disc turbines and may be configured to collect a fluid in motion and to modify the characteristics of the fluid prior to its introduction into the inlet feature of one or more turbines. The system also provides a fluid extraction device in fluid communication with the outlet feature of the one or more disc turbines which may be configured to provide a second portion of fluid having certain characteristics which assist in modifying the characteristics of the portion of fluid leaving the outlet in order to enhance extraction from the disc turbine outlet thereby increasing the efficiency of the generation of work by the system.

In accordance with one embodiment of the present invention, the system comprises one or more disc turbines configured to interact with a gaseous fluid current for the generation of work, the one or more disc turbines having both inlet and outlet features. In accordance with one embodiment, the system also provides a fluid collection device that is in fluid communication with the inlet feature of the one or more disc turbines and is configured to collect a gaseous fluid in motion and accelerate at least a portion of the gaseous fluid collected prior to its introduction into the inlet feature of the one or more turbines. A fluid extraction device in fluid communication with the outlet feature of the one or more disc turbines is also provided, which is configured to provide a second portion of fluid having certain characteristics which assist in modifying the characteristics of the portion of gaseous fluid leaving the outlet feature of the one or more disc turbines in order to enhance extraction from the one or more disc turbine outlets thereby increasing the efficiency of the generation of work by the system.

In accordance with another embodiment of the present invention, the system comprises one or more disc turbines configured to interact with a liquid fluid current for the generation of work, the one or more disc turbines having both inlet and outlet features. In accordance with one embodiment, the system also provides a fluid collection device that is in fluid communication with the inlet feature of the one or more disc turbines and is configured to collect a liquid fluid in motion and accelerate a portion of the liquid fluid prior to its introduction into the inlet feature of the one or more turbines. A fluid extraction device in fluid communication with the outlet feature of the one or more disc turbines is also provided, which is configured to provide a second portion of fluid having certain characteristics which assist in modifying the characteristics of the portion of liquid fluid leaving the outlet in order to enhance extraction from the disc turbine outlet feature of the one or more disc turbines thereby increasing the efficiency of the generation of work by the system.

Disc Turbine

In one embodiment of the instant invention, each of the one or more disc turbines comprise two or more axially spaced discs, at least one of which having one or more openings near its center. The discs are configured to receive fluid from the fluid collection device such that the mass-flow of fluid provided enters substantially parallel to as well as tangentially into the spaces, or channels, between co-rotating discs of the disc turbine runner, wherein a combination of inwardly acting radial pressure gradient forces and outwardly acting centrifugal forces exerted on the fluid due to the rotation of the disc runner cause fluids to follow a spiral path toward the one or more central openings in communication with the lower pressure provided by the fluid extraction device. Fluids spiraling toward the central openings through advantageously spaced discs develop viscous shear-stress there-between fluid layers which may further communicate shear-force to the two or more discs through the boundary layer of working fluid fixedly attached via adhesion to the surfaces of the two or more discs, which further cause the disc turbine to rotate about a common axis of the discs. Optimally spaced, a maximum amount of shear-force may be communicated to the discs, which may result in greater torque and rotation there-from. Central openings collectively defining disc turbine discharge outlets permit fluid flow through from the one or more disc turbines into the fluid extraction device. The rotation of the one or more disc turbines is related to the shear force communicated by the fluid to the surfaces of the one or more discs.

In one embodiment of the instant invention, each of the one or more disc turbines is comprised of two substantially thicker rigid aligning end-discs, two adjustably positioned spacing discs, and one or more adjustably spaced discs, all commonly keyed and secured to a shaft freely turning in substantially smooth bearings, at least one of each type of disc having one or more discharge openings near its center. The positioned and spaced discs of the one or more disc turbines are configured to receive a portion of the accelerated fluids from the fluid collection device by way of an inlet feature integral to or formed by the fluid collection device further communicating collected fluids as working fluid either directly or indirectly toward tangential convergence with the periphery of the one or more disc turbines, whereupon working fluid may enter into the channels between the positioned and spaced discs. Working fluid en route to discharge openings in communication with the fluid extraction device follows a spiral path resulting from a combination of inwardly acting radial pressure gradient and outwardly acting centrifugal force exerted by rotation of the disc turbine. In contact with substantially the full surface of every spaced disc and one positioning disc, viscous shear-stress between fluid layers may advantageously communicate shear-force to the discs through the boundary layer of working fluid fixedly attached via adhesion to the surfaces of the discs, further causing the discs to rotate about a common axis of the discs. Optimally spaced for streamlined laminar flow via adjustable positioning means, a maximum amount of shear-force may be communicated to the discs, which may result in a greater torque, rotation and power conversion there-from the one or more disc turbines. Central openings collectively defining the disc turbine discharge outlet permit working fluid flow into the fluid extraction device.

The rotation of the discs is related to the shear force communicated by the fluid to the surfaces of the one or more discs. The shear force capable of being exerted by and through the fluid to the surface of the discs, as well as its rate of application, is in part related to various characteristics of the fluid, including, for example, dynamic viscosity, flow rate, density, rheology profile, and pressure. The shear force and its rate of application is also related to the characteristics and number of discs associated with a given turbine, as well as their physical dimensions and distances there-between. In some embodiments of the instant invention, any of the one or more turbines may have a unique number of discs thereon separated by any appropriate distance. Discs formed of different types of materials, as well as discs having different surface characteristics are contemplated herein for use in any of the two or more discs. Different dimensions of the discs, including outer and inner diameters and thickness, as well as differences in shape, and location of the openings in any of the two or more discs may also be contemplated These and other characteristics of any of the two or more discs in each of the one or more turbines may be adjusted in order to optimize energy extraction from any particular fluid, which may, for example, have higher or lower viscosity or flow rate.

Disc turbines, pumps, and compressors largely disclosed by Dr. Nikola Tesla (1, 2) in the earlier part of the twentieth century and researched in depth (18-23) are known to be effective fluid energy transmitters and receivers utilizing boundary layer adhesion and viscous shear stress to develop torque between axially spaced smooth disc surfaces having either tangential inlet and axial outlet holes in turbines, or axial inlet and tangential outlets in driven machines. Diverse disc geometries have been proposed which may lead to better efficiencies from disc turbines (4) possibly offering better laminar fluid flow characteristic between adjacent disc elements which is a key requirement for their operation, and although alternate methods and uses exist for the utilization of disc turbines (6, 7, 17), the Tesla type disc devices as originally disclosed are primarily suggested for use in the presently disclosed invention to provide cheaply manufactured torque conversion capability already proven and documented (19, 20) in many usages including air and hydraulically powered turbines, liquids pumping, hydraulic and pneumatic compression and vacuum applications. Surprisingly, however, there exists a substantial lack of large-scale applications employing these devices today, and given the potential capacity of the presently disclosed invention to utilize disc devices to satisfy great global demand for clean energy either alongside, or independently of traditional bladed devices of known performance, disc turbines, pumps and compressors as proposed herein may offer myriad new applications and opportunities for harvesting clean power returns from naturally occurring and anthropogenic fluid currents.

Inter-disc spacing is a critical factor affecting successful power development in disc turbines. For best results, the discs of turbine rotors employed should be spaced a minimum axial distance apart related to the particular working fluid's kinetic viscosity. As originally disclosed (1) optimal disc spacing for such machines increases with kinetic fluid viscosity, and decreases with rotor angular velocity. Since temperature has an effect upon the working fluid's kinetic viscosity, this should be taken into consideration especially where operational temperatures in ambient mediums will vary over a great range, either seasonally, or locally. Also, rotor angular velocity will be further dependent upon both the working fluids average velocity throughout the spiral path to turbine discharge, as well as to rotor diameter, and also to disc periphery and surface smoothness and form, since these latter characteristics also play a role in determining the extent to which laminar flow (desirous in disc turbine, compressor and pumping applications) is realized between adjacent co-rotating discs.

$$d = \pi \times sqrt(V/\omega) \qquad \text{Equation 2}$$

Where:
  d=optimal disc spacing
  V=kinetic viscosity of the fluid
  ω=angular velocity of the rotor Equation 2 (19, 22), above, shows the relationship for the optimal channel width (disc gap, or inter-disc spacing) in disc turbines, which increases with working fluid kinetic viscosity and decreases with rotor angular velocity. For example, over a 0° C. to 20° C. ambient temperature range, the kinetic viscosity of air increases about 14%, while that of water decreases about 78%, and seawater also decreases by about 74%. Based on Equation 2, a 20° C. temperature rise in a water temperature application relating to a 78% reduction in kinetic viscosity may result in a 46.9% reduction, or about a halving of the appropriate disc spacing at 0° C. Pertinently re-stated, if a single-channel disc turbine designed for maximum throughput in water at 0° C. (where ideal disc spacing is twice that at 20° C.) is actually run in an application at 20° C. (where conversely, the ideal disc spacing is ½ as great as at the colder temperature), the same feed-stream would still pass through the turbine, however, the nature of the flow may be radically different than the optimal laminar flow profile, which may lead to significant efficiency loss. Optimal disc turbine design therefore requires contemplation of the proposed installation location's daily, seasonal and site-specifically variant ambient temperatures for best efficiency in ambient fluid current as well as any intended applications Dial (13) has claimed the application of fixedly spaced disc turbines, however in contemplation of Equation 2, above, in connection with the example given below, it may be known that temperature variation upon ideal disc turbine spacing may be a significant factor in disc turbine configuration. In particular temperature directly affects the kinetic viscosity of the working fluid which further has a bearing upon ideal disc spacing as per the relation defined in Equation 2. This combined with the only hydropower claim having been directed toward a particular application in which its variable inlet forms part of a penstock, which penstock device the presently disclosed invention seeks to abandon for ecologic reasons, it may be concluded that ecologically benign ambient fluid current applications were not contemplated mode of application in that invention.

While availed of inter-disc energy conversion efficiencies possibly exceeding 95% (25) in systems of advantageously spaced, streamlined laminar flow, embodiments of the presently disclosed method may also minimize key energy losses normally associated with the utilization of disc turbines. For example, in compressible fluid systems employing disc turbines, losses normally due to incompletely expanded working fluids prior to turbine admission may be minimized through attention to surface contour angle of attack at which divergent aperture-lips (if employed) release working fluid toward disc turbine peripheries. As previously discussed, manual positioning or automatic•modulation means may be introduced to provide advantageous combinations of active cross-sectional 'swept' areas of fluid collection, compression and or acceleration, aperture-lip extension and or angular modulation, and added working fluid throughout which may be enabled by optionally extendable volutes, to provide optimized function which may be tunable-at-runtime, or during static commissioning.

Losses typically observed at disc turbine outlets owing to the directional changes required of fluids transitioning from radial (spiral) inflow between discs, to axial outflow in the disc runner discharges typically resulting in fluid backpressure which must be overcome in order to accommodate further (efficient) fluid discharge from disc turbines may be largely obviated by the presently disclosed method through the advantageous siphon placed on turbine exhaust streams by the externally inducting fluid flows of lower than ambient pressure which dynamically remove turbine throughput further providing space for continued discharge and also helping to minimize the Betz effect.

While the setting of high durometer rating o-rings into disc perimeters may provide shock absorption to cushion and re-direct fish or foul in the event of impact with disc runners, it should be noted that the high disc density typical of disc turbine application, while allowing energetic fluids accelerating toward them to enter readily between the miniscule spaces to generate work, substantially present cylinders of revolution tending more to bump birds or fishes while substantially maintaining their momentum, as opposed to the prior art into which creatures are more likely to be smashed, chopped, skinned or de-feathered by propeller type actions of the particular methods employed.

As the vortexing EVFES flow stream passes through preferably optimally spaced inter-disc channels of onboard disc turbine(s) provided, boundary layer adhesion and shear stress development between fluid layers results in a net torque application to disc surfaces. Tightly affixed to each other and also to and through inter-disc spacing means by through-bolts, rivets or other fastening means at serviceable intervals designed to provide a rigid body capable of high speed operation while remaining permissive to fluid throughput, shear stress and torque developed by the multiple disc rotor is commonly transmitted to the shaft to which discs are commonly keyed. Depending upon disc radii, angular rotor velocity developed by the EVFES on passage through inter-disc channels, and the degree to which optimal disc spacing is reflected in runner designs preferably providing variable inter-disc channel spacing, torque and power may be developed proportionally. It should be noted that inter-disc spaces of somewhat wider than optimal dimension may still be utilized successfully, however diminished efficiency of operation due to comparatively lessened shear-stress application to disc surfaces per unit of mass-flow (throughput) volume will result, and at some distance of separation, the preferably laminar flow between co-rotating discs will degrade into turbulent flow to the detriment of the torque produced by disc turbines. While disc turbines are known to have power generating cut-ins that may be up to 40% or more of their rated speed, design of suitably large turbines having lower speed ratings generally exceeded by the ambient fluid speeds in applications for which they are designed may yield significant power conversion efficiencies in conjunction with the advantageous and adjustable features of the presently disclosed invention to enable new capacity for clean energy conversion potential even under moderate speed fluid conditions.

Tahill (22) in modeling the flow dynamics of a disc turbine as a free vortex with a sink in the middle, derives disc turbine torque as follows:

Equation 3: Circulation Velocity of vortex, $$v_\theta = \Gamma/2\pi r$$

Where: $\Gamma$ is the circulation flow, and r is the radial distance from the center of the vortex at which the velocity is being considered Equation 4: Shear Stress between two parallel discs, (in cylindrical coordinates):

$$\tau = \frac{3 \cdot \mu \cdot \Gamma}{2\pi r h}$$

Where: $\mu$ is the dynamic fluid viscosity, $\Gamma$ is the vortex circulation, r is the radial distance from the vortex center at which the velocity is being considered, and h is half the distance between two adjacent discs Equation 5: Total Torque acting on one side of one disc, $$T_{side} = \frac{3\mu \cdot \Gamma \cdot (r_2^2 - r_1^2)}{2 \cdot h}$$

Where: $r_2$ is the outer disc radius, and $r_1$ is the axial exhaust hole radius but: $\Gamma = v_\theta \cdot 2\pi \cdot r$ (from Equation 3, above)
Therefore: Total Torque acting on one side of one disc is:

$$T_{side} = \frac{3\mu \cdot v_\theta \cdot \pi \cdot r(r_2^2 - r_1^2)}{h}$$

Equation 6: Total torque per disc is 2× (Eq. 5) or:

$$T_{Disk} = \frac{2(3\mu \cdot v_\theta \cdot \pi \cdot r(r_2^2 - r_1^2))}{h}$$

(Both sides of disc)

Note that in typical disc turbine application the outside surfaces of typically thicker end discs are not exposed to the direct application of working fluid at high velocity, and therefore these surfaces do not add torque to the power output of the device. Moreover, in the majority of prior art usages of disc turbines in water and other high dynamic viscosity fluids, these same surfaces contribute negatively applied viscous drag to the turbine, actually decreasing its performance, since these surfaces of the turbine are typically located within a static casing within which intermediary working fluid is spun at speed and though rotating, typically docs not exit through this channel, resulting in frictional heat losses developed through the same shear process, however, disadvantageously applied. Accordingly, an object of the presently disclosed invention to provide adjustable disc spacing means concurrently satisfies this alternated object as later described herein, by substituting and sealing another fluid within this region which has significantly less dynamic viscosity, and therefore also may largely reduce the effect of drag imposed on the outside of turbine end-discs thereby minimizing the negatively applied parasitic loading normally experienced in this region.

Disc Turbine for a Gaseous Fluid

Applications of the presently disclosed invention to gaseous fluid energy extraction are clearly not limited to the harvest of energy from gaseous fluids on our home planet, Earth. As evidenced by a sampling of planetary wind-speeds, for example, extreme velocity fluid currents abound, and notably Neptune in the outer reaches of our solar system is found to have atmospheric winds reaching 2,000 km/hr or more. Gaseous fluids are also present throughout the extents of the known universe as evidenced by the stars themselves, in the solar winds issuing there-from, in nebulae, and from inferred scientific data relating to planetary systems being discovered at great distance. Since the presently disclosed method is adaptable, as evidenced by the accompanying figures, and may therefore find use in extracting power from fluids in motion wherever they may be found, accordingly the presently disclosed invention contemplates application throughout the universe as well.

For example, modes of usage contemplated herein may provide useful service generating power from fluid currents during planetary exploration missions to Mars, Venus or any of the gas giants or fluid-bearing moons where significant current velocities abound and may also source or supplement long term power needs for colonization of certain of those worlds. Though extreme temperatures and or pressures may necessarily govern the materials of construction for such environments, such as high temperature compatible ceramics, cryogenically compatible materials, or other materials, the method for energy conversion and or extraction may still be largely applicable similar fashion.

While gaseous fluids such as air may have low dynamic viscosity, density and accordant power density characteristics, typically available wind currents available nevertheless offer serviceable average working fluid velocity which is available globally, and due to its low density, lighter construction discs and disc runners may be provided due to the lower anticipated shear-stresses and torques implicated on discs in operation. While lightweight aluminum or plastics as thin as 0.001" may therefore be employed in smaller diameter runners to maximize the available working surfaces in disc runners, and depending upon the design diameter of discs required, and anticipated maximum angular velocities and pressures of operation, thicker discs may be contemplated for greater mechanical strength, including those in excess of 1" in thickness. To reduce parasitic drag upon the circumference of discs themselves, it is contemplated that knife edges would be best employed to get the fluid into the work extraction channels efficiently, however, this presenting obvious application and service issues of concern, discs otherwise acceptably tapered at their circumference should suffice in this regard.

Lighter-than-air (or other ambient atmosphere) applications are contemplated for atmosphere to ground, as well as intra-atmospheric layer shear power generation (such as may be provided by two buoyant similarly formed invention embodiments from, fabrication of smooth, flexible, disc-shells comprising two disc-turbine disc-forms with an inner inflatable cavity or bladder capable of holding their form and transmitting torque are also contemplated. Injection moulding processes may be contemplated to provide low cost manufacture of specialized-contour discs suggested by Effenberger (4) to provide better laminar flow, shear-stress and torque development than traditional flat discs by tending to maintain the flow area constant between adjacent disc surfaces offering advantageous Reynolds number flows at all radial distances with respect to efficiency. Flat or contoured discs may be readily mass produced in this fashion to minimize the cost of fabrication, and if desired, the turbine discs may additionally be flared and or indexed through a small angle from one disc to the next to provide substantially helical, axial discharge channels which under rotation may help overall device efficiency by tending to provide a degree of axial momentum to discharged fluids which may be thereby induced directly toward external induction channels. Whereas indexed discs may aid in discharge efficiency, it rather adds complexity to disc runner design and mounting fixtures, and indexing beyond 90° of angular displacement is not contemplated by the presently disclosed invention to avoid choking the discharge. As further disclosed later herein, variable disc spacing means may be built into all runners to allow optimization of disc turbine channel widths at run-time to allow automated operation or manual adjustment of this critical parameter affecting performance during running operation. Whether invention embodiments utilize flat or contoured disks, and whether they may further utilize the advanced design concepts mentioned herein, in adequately spaced runners, shear stress, torque and rotation and power may be generated nevertheless.

Disc Turbine for a Liquid Fluid

In disc turbine applications where the working fluid is water or another liquid fluid of significant density, it may be stated that a free exhaust path becomes increasingly concerning to device efficiency since fluid discharged from the inter-disc spaces do so with zero initial axial velocity. Their inertia requires effort to displace them from the axial exhaust region, and results in backpressure upon the turbine leading to less efficient operation. It may therefore be advantageous in applications involving slower velocity liquid fluid currents that disc turbine designs take advantage of enhanced modifications in order to increase performance. For example, for improved efficiency, the portion of discs surrounding axial outlets (in turbines) of discs may be flared, or inclined, in the direction of axial outlets to provide a degree of axial velocity component to the discharging fluids.

Whereas the focus of the instant invention is on terrestrial fluid currents wherein the commonest fields of use invention In invention integration in different fluid mediums, that water's mass density and consequential power density being more than eight hundred times greater than air at comparable fluid velocities according to the Power Equation, Equation 1, provides extremely large power potentials in RISEC, TISEC and ocean current energy applications. Through the enhancing aspects of the presently disclosed invention, water may avail potentially dramatic power potential in disc turbine applications due to its comparatively great dynamic viscosity, which over the temperature range of 0° C. to 20° C., varies from 104 times greater to 55 times greater dynamic viscosity (in freshwater, as compared to air), and varies from 110 times greater to 59 times greater dynamic viscosity (in seawater, as compared to air). While typical speeds of water currents are much slower than wind currents, the advantageous comparative viscosity property may enable much larger power returns from readily available water currents offering conducive velocities for energy conversion or extraction in true in-stream fashion.

One of the most significant advantages offered by the presently disclosed invention is provided through its employment of disc turbines, which are widely recognized to offer cavitation-free performance. This is extremely significant, since the operable performance of the prior art, in liquid fluid applications, is largely limited by cavitation which imposes maximum device-specific drag coefficients on energy extraction, beyond which performance typically degrades due to vapour generation and the extended effect which this has upon the laminar flow profile of respective methods which is further key to successful torque development. For comparison, whereas the drag coefficient of disc turbines may be extremely high, the next most favourable prior art liquid fluid extraction method referenced herein may provide a limited upper drag coefficient of 0.45.

Fluid Collection Device

In general, the fluid collection device is configured to collect fluid from an ambient fluid flow. The fluid collection device may comprise a single opening portion that collects fluid and directs it to the one or more turbines, or alternatively, it may comprise a plurality of openings directing fluid to one or more turbines, or a combination thereof. The fluid collection device may be configured to alter dynamic fluid pressure, fluid flow rate, and, where possible, advantageously increase be velocity of the fluid, prior to being directed towards the one or more turbines. The fluid collection device may also comprise a plurality of fluid collection elements. Each of the elements may be involved in altering fluid characteristics. The elements may also be configured to inhibit the passage of any solid or semi-solid material found in the fluid, such as debris, while not inhibiting the flow of the fluid. The fluid collection device may also comprise a means for blocking entry of solids and may include a mesh, filter, wire, or other such separation means where said separation means does not substantially diminish the fluid velocity provided by the fluid collection device. The fluid collection device may also comprise a fluid bypass conduit or means of passage directly to the fluid extraction device, such as a shroud, for fluid collected thereby to pass directly to the fluid extraction device without coming into contact or fluid communication with the turbine.

Whereas the object of the fluid collection device is to provide enhanced velocity fluid extraction streams, or EVFES, to supply on-system work extracting disc turbines with working fluid, it is generally also the outer body, or 'visible look' of given device embodiments. It is very convenient, therefore, for the presently disclosed invention's eventual large scale and timely integration that it does not resemble certain of the prior art experiencing reduced integration due to aesthetics reasons. By contrast, the presently disclosed invention may be cached where it is used, and may take on any of myriad different 'looks', for example a greenhouse, barn, a house, a building a wind-break, a corrugated metal shelter such as found at maintenance depots. It is equally convenient that these structures already exist, may already be paid for, and that the custodians of these places would benefit from clean power generation they and their neighbours might not 'see'. Integrations of the presently disclosed invention may be foreseen in or adjacent to countless of the commonest structures around, which, with some minor surficial re-design amounting to some holes and some additions which may be anchored and tethered such that the structural implications of their integration are negligible, and may even reduce structural loads and fluidic drag load application, which may be beneficial in both heating and cooling seasons to reduce energy costs and carbon footprints alike. Integration of the presently disclosed method may help as part of the solution to turning existing structures and new structures into net-zero constructions further providing opportunities for more back-to-basics living, with fluid collection and fluid extraction devices also combining to offer solar thermal power capacity, radiant heating, solar-driven cooling systems; applications abound for integrations of the present invention, and disc devices, further including water-into-steam thermal power generation and solar chimney turbines operating from excess heat load build-up within fluid collection and extraction devices, in which location is always available for equipment which is flat, thin, and powerful, which in essence describes Tesla disc devices which could be mounted here, or there. Very simple integrations and realizations of disc turbines are invention embodiments have also been contemplated but which have not been included herein in figures, including sheltered gardens for growing produce locally.

$$\text{Power} = \text{Density} \times \text{Area} \times (\text{Velocity})^3 \qquad \text{Equation 1}$$

The kinetic energy relation (see Equation 1) tells us that as the velocity of given cross sections of fluids increases, that the kinetic energy possessed by such fluids increases exponentially to the third power, so accordingly the method of the presently disclosed invention incorporates speed increase to achieve greater energy return. Fluid collection devices of the method perform the function of intercepting the available (ambient) fluid currents passing through a given swept region at a given velocity, and of the fluid collection device, are constrained by adjacent masses of ambient fluids, and as such may be forced to negotiate the fluid collection device, which being capable of controllable modulation, may thereby desirously effect the intersection of greater or lesser ambient fluid cross-sections as required to achieve a desired effect which may include enhanced work extraction, and being analogous in form to airfoils or hydrofoils disposing a variable cross-sectional area fluid conduit in the path of a fluid in motion, the flow there-across said surfaces may be governed as described by Bernoulli (Equation 7, below).

$$P_A + \tfrac{1}{2} v_A^2 \rho = P_B + \tfrac{1}{2} v_B^2 \rho \qquad \text{Equation 7}$$

Where
P=Fluid Pressure
v=Fluid Velocity
ρ=Fluid Density

The Bernoulli equation is commonly known to apply to airflows over a wing, as shown in the simplified form of the equation, above, representing the no-height change condition applicable in applications of the current invention in air (gaseous fluids), especially in light of the lower ambient fluid speeds and limited density effect implicated over the typical heights of serviceable operation contemplated, and since the compressibility of air may be discounted below 220 MPH, the relationship provided applies across the region of ambient fluid applications for the presently disclosed invention. Concurrent with the velocity increase over a cambered airfoil such as an airplane wing, analogously, this relation applies to the very similar form of devices of the presently disclosed invention wherein airfoil and or hydrofoil surfaces provided by the fluid collection device, at length provide variable fluid acceleration effects useful in enhancing and or regulating the velocity and therefore energy content in working fluid streams further provided to on board work.

Examples of form-induced fluid acceleration are commonly known, for example, when precipitation-laden air is substantially horizontally driven by strong winds in visibly streamline-representative layers toward peaked rooftops, whereupon the windward fluidic cross-section (representing a vertical height component of many feet) is clearly accelerated through a height of some few inches at the peak; said dramatic fluid acceleration effect being analogous to a produced vena-contracta region at the apex of the rooftop. Other commonly known examples are provided by the cambers of airplane wing airfoils, and also by wind turbine blade airfoils developing wind speeds that may be 4 to 8 times greater than the ambient wind speeds over their cambered forwardly-leading surfaces (26).

In similar fashion to these common examples, accelerated working fluids may be advantageously provided in the presently disclosed method to volute-contained disc turbines at 4 to 8 (or greater) times the local ambient fluid velocities via first fluid currents approaching and sticking to boundary layers of large, smooth, Coanda profile surfaces of forward shroud profiles disposed into ambient fluid currents. Thereafter traversing adjacent shrouds under heightened dynamic fluid pressure while pushed and squeezed onward by successions of commonly bearing fluid fronts adding energy to thickening horizons of fluids accelerated over sloping shroud surfaces, resultant fluidic kinetic energy super-positions leading to augmented shroud-induced enhanced energy flows at length presenting significantly energized fluid mass flows (working fluid) to diverging fixed or advantageously positioned aperture-lips at the entrance to volute-enshrouded disc turbines of the method.

Another object of the fluid collection device is to utilize the energy contained in given cross sections of fluids in motion more fully than provided for in the prior art. Accordingly, the presently disclosed invention provides fluid collection devices capable of various adjustments with which to achieve optimization of performance under varying operating conditions. Either fixed shrouds of conducive contour or alternately shrouds providing means to adjust the extent of their 'swept' region may be employed in the method, the latter offering variable cross-sectional area fluid collection, which is new in the art, via rigidly supported pitch or yaw modulations (dependent upon whether the embodiment takes the form of a horizontal axis or vertical axis fluid conversion device) thereby causing greater or lesser degree of cross-sectional deflection, acceleration of the approaching fluid-masses into onboard work extraction means. With proper bearings and housings to suit respective applications, the presently disclosed invention may function equally well in horizontal or vertical orientations, which is an advantageous feature further enabling its integration in many foreseeable modes of service. Advantageously driven to appropriate angles of attack in rapid response to changing critical parameters, fluid collection devices made responsive to signals from temperature further relating to kinetic viscosity, ambient fluid speed and produced high velocity fluid streams as well as other concerning inputs may provide intelligent control algorithms in conjunction with PLC and PID loop control measures, and with integration of advantageous fluid dynamic features such as strategically placed pressure drops (10) to facilitate augmentative fluid acceleration without stagnating, separating, or stalling favourably higher than ambient velocity thickened fluid-sheets, considerably enhanced fluid sheets for extraction may be effectively developed for use as prime mover working fluid.

Whereas Finney (9) provides serially-staged venturis for a higher power product through a third stage, and investigates drag and its implications upon super-venturi power source efficiency loss, and further points out that drag, similar on surfaces increases with the cube of the velocity, that remarkable work does not otherwise contemplate a way to utilize drag to advantage as the presently disclosed invention seeks to do. And although there will be some forward surface drag imposed upon the presently contemplated invention embodiments, the invention in due regard to same contemplates the minimization of surfaces of construction (to provide lower implicated hydraulic loads, restraint required, and cost and to some degree environmental minimized impacts and footprints associated therewith). Notably, a cubing in the drag effect put to advantageous use in greatly increased suction, or siphoning, action upon disc turbine outlets as proposed herein, may be anticipated to result in a significantly improved disc turbine performance. Further, since this drag and siphon further implicate a lower turbine discharge back-pressure, and by extension, a reduced pressure at the vortex line caused by design to be co-located along an axis parallel to and or concentric with the axis of the disc turbines themselves, a faster rot at ion of the vortex flow should also be anticipated according to Equation 3, wherein the free vortex tangential velocity is observed to increase with decreasing distance from the vortex line. Altogether, it is conceivable that the employment of the forced, then free, vortexing system proposed may represent a significant opportunity for investigation and further contemplation in various mediums, but most immediately, in the naturally provided, clean energy providing, closest to home and freely available to all.

Depending upon the design of the particular embodiment, post working fluid sheet development, singular or preferably multiple longitudinally spaced, rectangular nozzles comprising fixed or variably positioned and or rotated, substantially fluid collection device demarcating aperture-lips preferably diverging at an angle to be discovered in various arrangements, but largely 5° to 8° from the vector of approaching fluid currents are generally specified, and corroborated by Finney (9) and also by traditional deLaval nozzle design, to generate enhanced velocity fluid extraction streams of greater velocity for admission to onboard work extraction means. However, due to the varying nature of the angle of attack of the automated fluid collection device feature with respect to the approach of oncoming fluid currents, fixed aperture lips while performing adequately demarcating both the working fluid inlet aperture as well as the termination surface of the full admission volute may be foreseen to require automation or mechanical linkage to the variable sweep fluid collection mechanism so that the spatial relationship between the inclination of the fluid collection device, he aperture-lip, and the most advantageous is maintained. This to mean that to effectively guide fluids may thereby present enhanced velocity fluid extraction streams (EVFES) to disc turbines either directly, or may alternately guide EVFES into volutes of invention embodiments.

In normal operation, release of EVFES at suitable fixed or tunable angles of attack may be effected, for example, by providing positioning means with which to modulate the inclination of shroud-terminating aperture-lips and or the extension thereof so that the perimeters of disc runners are engaged by the EVFES Jaws either more or less directly. Although direct tangential engagement of working fluid with disc runner peripheries is traditionally provided in disc turbine application, and may aid performance, aperture-released EVFES in the presently disclosed invention may rather be preferably directed such that the energized mass-flow entering internal volutes does not directly impinge disc turbine:, but is rather forced to follow a substantially spiral volute path which may further take advantage of the golden ratio (1.618 . . . ) defining vortical energy flow patterns.

Volutes based upon the vortical constant may aid in the development of a combination forced and free flowing vortex system there-within said volutes. Produced vortices in this fashion are forced, in that appropriately formed volutes beginning at larger radius and ending at smaller radius bring EVFES with great fluid velocity unto abstracted adjacency with disc turbines, and eventual tangential convergence with substantially volute-concealed disc turbine runners. Since for best siphoning effect in this regard the fluid drag applied to the turbine discharges should be a maximum (to concurrently reduce the pressure at the vortex line toward which the tangential free vortex flow is drawn as its velocity increases), the greatest velocity remnant fluid passing over, around, and under, device embodiments should be applied to drag-ports of the method in order to realize the greatest 'naturally provided' tangential velocity increase as the flow approaches, enters, spirals through between discs, and finally exits the free vortex through the disc turbine outlet, assisted greatly by the fluid drag considered a nuisance in the prior art. Successfully balanced combinations of forced and free vortexing action, fluidic drag and disc spacing, made modifiable in the method may thereby advantageously utilize the greatest velocity flows to generate the siphon, fluid entrainment, and free flow through machines of the presently disclosed invention due to the siphon most effectively developed and acting upon and through disc turbine discharges as provided by drag, to aid in drawing working fluid through the channels with as high a maintained velocity as possible to further develop greater shear-stress, torque, angular velocity and resultant power and energy capacity through the energy used to spin up and draw out a vortex of potentially formidable energy capacity.

En route to the vortexing volutes, aperture-lip release of the EVFES into the large, spiral, volutes of the presently disclosed invention offers full admission of working fluid initially into the full admission volute, wherein its initial tangential velocity may be considered as the enhanced EVFES fluid stream generated by the fluid collection device, which as discussed, may be 3 or more times greater than the ambient fluid medium upon entering the volute maintained forced vortex flow system, described by Equation 8, below:

Equation 8 Forced (rotational) Vortex

Tangential Velocity $v_\theta = \omega \cdot r$

Where $\omega$=angular velocity

And r=radial distance from the center of the vortex

Whereas the angular velocity of the flow may be calculated at radii closer and closer to the disc turbine perimeter, in the forced vortex example, and there is no accordant velocity gain since the rotation is as a solid body of rotation, and in this mode a Thrupp type turbine acting solely in shear would be an effective energy converter, the application of drag creates a new application altogether, in which the Tesla turbine is readily shown superior therefor.

of a free vortex, induce disc turbine rotation to greater velocity due to the very nature of free vortex flows which the Tesla turbine utilized at the heart of volute contained potentially regulates disc turbine operation to a degree by allowing the system to self-govern working fluid admission through the capacity offered by the vortex flow circulation, which of itself may offer better streamlining of flow (working fluid), also advantageous in disc turbine application. While first higher-than ambient-velocity radially-outer forced vortex flow provided by the EVFES entering the vortexing-volute moves beyond the fluid interface (commencing at the radially inner termination of the volute, which may also be advantageously the lip of the aperture, for example) second radially-inner, substantially freer, and possibly slower vortex flow closer to and adjacent the disc runner (provided by the same EVFES brought through substantially 360° of volute-forced rotation, now physically nearer the siphon pressure) may be advantageously inducted to a higher velocity prior to turbine admission via boundary layer interaction at and through the viscous interface between outer and inner vortex flows, and in this fashion, disadvantageous drag introduced by volute walls en approach to turbine admission may be substantially minimized.

The method's unique characteristic of providing negative pressure, or siphon, on disc turbine axial outlets as previously discussed allows strategic and synergistic location of said siphoning turbine outlets to be coincident with the eye of the volute-produced forced vortex to potentially dramatically enhance the vortexing action through the predisposed tendency of the dynamically forced EVFES vortex fluids to be synergistically driven, while they are concurrently drawn, toward and through the dynamically lowered siphon pressure at the center of disc turbines doubly serving as central exhaust points for both the disc turbine and also for the vortex.

It is instructive to note that the forward shrouds required of the method may be readily provided by many pre-existing fluid re-directing structures such as buildings, homes, and industrial and commercial constructions extending far beyond the scope of applications suggested in the accompanying figures, and without departing from the spirit of the presently disclosed invention. This largely universal adaptability may lead to diminished technological integration costs which in turn may avail more timely development of urgently needed global sustainable energy gains from renewable sources, may minimize energy loads required in carbon sequestration efforts, and may also avail LEED energy sustainability gains to lessen carbon footprints associated with substantially all structures loaded by significant currents of wind, tide, river, ocean or surf. Hitherto unrealized energy conversions from anthropogenic fluid flows may also be provided which may simply not be possible with the prior art due to both aesthetic reasons largely limiting their ultimate benefit, as well as due to their inability to completely isolate upstream from downstream fluid streams and make gainful energy conversions from the pressure differences realized, as the presently disclosed method may do very well.

In completely new integrations of the method, shroud contours may be preferentially selected to provide functional airfoils or hydrofoils for use which may advantageously include regulation means (10) to assist the formation and maintenance of boundary layers and fluid attachment critical to working fluid sheet development in the invention. Conducive shroud surfaces serviceably working with the kinetic viscosity of the ambient working medium to maintain lower Reynolds Number flows while concurrently developing heightened working fluid velocity increase in both air and water ambient fluid applications may take advantage of flow conservation principles, for example, through ideal placement of volutes and their contained turbines at strategic maximum flow (velocity) positions to further allow greater energy conversion from fluids in motion.

Large and preferably variable cross-sectional area forward shrouds forcing fluid fronts to unavoidably traverse invention embodiments may thereby provide gainfully concentrated fluid energy streams, as evidenced in nature, for application to disc-turbines specified by the invention. Whereas advantageous boundary layer adhesion and attachment of the approaching fluid streams to Coanda profiles of substantially smooth shroud surfaces comprising planar surfaces sloping at up to 45° may occur, concave, convex, or combinations of these surface forms may also be employed to enable better upstream working fluid acceleration effects, and so long as ambient fluid flow applied to the shroud surfaces selected do not result in disruption of the laminar boundary layers formed over the shroud, diverse geometries may be successfully employed in the method.

Accelerated working fluid conducted thereby into the optionally vortexing, shroud-terminating volutes by way of fixed or positioned optionally extendable aperture-lips, then, may release energized working fluids at advantageous angles of attack toward eventual tangential entry into the spaces between co-rotating discs of work extracting disc turbines contained there-within.

Gaseous Fluid Collection Device

Although in air applications, larger fluid collection devices, or shrouds, may be employed due to the lesser anticipated structural loading by the comparatively much lower fluid density, and shrouds may also slope to steeper inclinations with respect to the velocity vector of approaching currents therefor, shroud design must nevertheless address aerodynamic lift as it concerns structural integrity. Preferred invention embodiments shall either provide structures strong enough to countervail developed lift effects or otherwise provide inherent lift cancellation in their design concurrently. The anticipated manner of achieving this concurrently affords a doubling in power realized by such machines via mirroring of the essential elements of the invention into opposite sides of the same device. Also, by providing embodiments employing alternate orientations of turbine axes within appropriately oriented volutes in conjunction with surfaces effectively guiding working fluid sheets into same under further appropriate trajectories, cancellation of gyroscopic moments on structures may also be achieved leading to enhanced stability.

Although compressible fluids such as air forced by successive and adjacent fluid fronts to traverse forward shrouds angularly inclined to the vector of their approach may undergo a substantially limited degree of localized compression there-over in more extreme winds, aerodynamicists generally consider that below airspeeds of 220 miles per hour, compressibility effects (in air) may be dismissed. Accordingly, since the scope of the more immediate application of invention embodiments is anticipated to be in terrestrial environments with fluid flows well under this velocity, for purposes of simplification, the compressible nature of air as pertains to internal or external shroud flows shall be dismissed herein. Disc turbines provide most efficient operation with working fluid at maximum velocity prior to turbine admission, so although in extreme winds benefit may be had from the incorporation of a divergent deLaval type nozzle (aperture-lip) of rectangular cross-section placed in the vena-contracta region immediately before working fluid admission to disc turbines of the method, in general this device is not required other than for various directional effects especially if utilizing variable swept areas fluid collection, or for clearing debris remotely, as discussed. Placement of turbines directly at vena contracta shroud points should suffice in normal through most extreme ranges of operation anticipated to take advantage of the benefit offered by velocity increases.

Liquid Fluid Collection Device

In water applications, by contrast, wherein acceleration of the working fluid predominates the advantageous effect developed by and over inclined forward shroud surfaces of the method in accordance with flow conservation, there is no requirement for divergence of shroud surfaces beyond vena contracta surfaces which are flat with respect to the approach vector of on-coming fluid currents since the working fluid is already at its maximum velocity in the produced vena contracta region. Therefore volutes placed directly in vena contracta regions may successfully conduct largely incompressible fluids such as water at beneficial speeds in the method either with or in the absence of further means enabling greater working fluid divergence such as aperture-lip means previously described. Re-stated, shroud surfaces terminating in fluid release either parallel or slightly diverging surfaces (ie: in a leeward to shroud direction) upon volute entry may be utilized for non-compressible fluid application. Consideration may also be given to employing shrouds leading working fluids into direct tangential disc-runner impingement and entry into inter-disc spaces, in which case further working fluid divergence is provided by design through the circumferential arc of disc runners energizing disc turbine shafts without the requirement for aperture-lip divergence, modulation means therefore, or even the use of volutes at all, other than housing fixtures required to isolate disc turbine inlets from their discharge paths, providing reduced costs associated with implementation of the method.

In water applications, factors including visual aesthetics in populated or conservation areas in conjunction with depth of water, proximity to flow obstructions or naturally occurring rises in river bed relief or sea bathymetry or other reasons may dictate that applications of the presently disclosed method may best be realized through horizontal as opposed to vertical axis embodiments or arrays thereof. Conveniently, the presently disclosed method offers efficient work extraction in horizontal, vertical, or any desired orientation so long as rectangular slot inlets may direct working fluid effectively toward work extraction turbines.

Fluid Extraction Device

In general, the fluid extraction device modifies the characteristics of the fluid arriving from the outlet of the turbine in order to increase or assist in the extraction of the fluid from the turbine and work generation system. In some embodiments of the instant invention, the fluid extraction device may directly introduce a second portion of fluid from the ambient fluid whose characteristics, by virtue of the shape of the system, are modified to in order to enhance extraction of fluid from the outlet of the turbine. In yet other embodiments of the instant invention, fluid collected at the input device may pass directly into or be in fluid communication with the extraction device, without contacting or being in fluid communication with the one or more turbines, wherein the characteristics of the bypassed fluid are modified, by virtue of the shape of the path of the second portion of fluid, in order to enhance the extraction of fluid from the outlets of the one or more disc turbines. In general, the modification of the characteristics of the fluid leaving the outlet of the disc turbine in the extraction device is achieved through the use of a second portion of fluid whose characteristics are modified in whole or in part by the shape or configuration of the collection device, extraction device, turbine, or turbine outlet, or combination thereof. The second portion of fluid enhances the extraction of fluid from the turbine outlet, thereby leaving more energy from the ambient fluid available to be transferred to the system.

Undisturbed boundary layer adhesion over leeward Coanda profiles of shroud surfaces provided may also better enable induction (siphoning action) through leeward facing device exhaust ports via maintaining higher velocity flow streams adjacent turbine discharge throughput flow-streams for enhanced entrainment. In contrast to the advantages offered by flow regulation via strategically located pressure drops on forward shrouds (10) provided in conjunction with contoured solid surfaces in the pressure drop locations, slotted induction openings may rather perform a similar function over the leeward shrouds which maintains fluid attachment of the external flow concurrently with producing the best siphoning action. Whether the smooth leeward shrouds provide longitudinal, lateral, dimpled or other raised or inset relief patterns in the leeward shrouds for induction purposes may depend largely on the locations and surface contours upon which they are located, and flapping, slotted, stepped, or other forms of openings therein may advantageously provide good siphoning and induction characteristics. Whether or not openings are further modulated to alter their shape and or size automatically via PLC and PID loop control to seek maximum differential pressure across turbines of the method, induction openings provided should nevertheless allow smooth transitions from internal to external surface-conducted flows for optimally facilitated flow entrainment.

As discussed added efficiency may be provided by siphoning action advantageously lowering the pressure on turbine discharge streams. Significant enough external fluid flows developing drag proportionally to the cube of the flow velocity may readily create the energy requirement to move the contents turbine outlet flow, and it is anticipated that this capacity may be significant.

As discussed, when significant drag energy is applied by the fluid extraction device, to the turbine outlets, the region about the vortex line becomes a sink, and at which point, as already discussed, in an effort to maintain its angular momentum, particles beginning at the higher-than-ambient velocity displaying might display different flows. Firstly, if the fluid extraction device or turbine is completely plugged, or closed off by valves in the extraction path, for examples, there would be only rotational flow. Secondly, if the fluid extraction device was only partially letting turbine working fluid through, but not applying significant drag energy, the flow velocity would speed up toward as well as through the turbine to usefully functioning level. however when full siphon would drag the vortex line to very low pressure, the fluid particles of the vortex approaching the turbine attempting to conserve their angular momentum would avail the system of greatly beneficiated tangential velocities, since the radius from the vortex line would approach zero, and as per the equation, would tend to make the angular velocity very high (tending toward infinity), which may result in much higher average velocity being maintained through the disc turbine channels to provide further enhanced efficiencies from an already efficient extraction process. As well, the significance of the vortex flow system may be better grasped when it is understood that vortices represent naturally persistent phenomena which contain a great deal of energy in their rotation, and a way to tap into this persistent may lead to even greater enhanced energy extraction through the capacity provided by the vorticity and its momentum.

The disc turbine with optimally spaced discs as previously mentioned, will match its runner velocity with that of the fluid velocity at the periphery. Evidently, since the turbine volute receives working fluid at a significantly greater than ambient velocity, and its tangential velocity increases to even greater velocity upon approach toward and through the discs of the disc turbine to the imaginary vortex line never reached due to excessive drag removing working fluid of the vortex at that location, and in combination with the advantages of adjustable disc spacing to actively tailor the disc separation to the optimal separation for a desired power, or torque, significant energy capacity from the vortex is implicated.

of the a low enough pressure in the inducting fluid stream may also allow in-stream device embodiments of the method to utilize head pressure provided by of turbine discharges with respect to isolated induction pressures into which they are entrained. Strategically ducting disc turbine discharges to induction ports which are lower in elevation (bathymetry) may allow the hydrostatic head pressure produced by the discharged working fluids to provide a degree of hydraulic ram effect acting positively in the direction of the downward discharge and help to naturally clear the turbine throughput into the external induction flow-streams of enhanced velocity and dynamically lowered pressure. To enable this benefit, discharge chutes preferably downwardly opening may be provided to conduct working fluid through descending yet flooded, watertight egress pathways directly to induction ports that are lower in elevation. The gravitational acceleration may be considered to aid in the removal of turbine working fluid from the discharge since the depth-induced pressure rise at the lower elevation of discharge is diminished by the enhanced velocity flow passing around the outside of the shroud lowering the pressure in that region, and by extension increasing the efficiency of the overall energy conversion.

For successful operation of such machines, it may be stated that the sum of discharge cross-sectional areas (ie: internal to external induction outlets) should be equal to or greater than internal fluid passage cross sectional areas, which in turn should be greater than the sum of disc turbine outlet cross-sectional areas. The sum of disc turbine outlet cross-sectional areas should further total (as a minimum) the sum of the turbine inlet cross-sectional areas which may be considered the product of inter-disc spacing, number of inter-disc spaces, and the rectangular slot opening height dimension which feeds turbine working fluid (which may be a complete disc circumference in full admission turbine designs). In full admission embodiments the turbine discharge outlet area requirement may become•great, and so invention embodiments providing disc turbine runners with dual exhausts will therefore be advantageous, as will the provision of designs integrating a plurality of disc turbine runners arranged in multiple rows, and offset in longitudinal and also in transverse relation, in order to enable largely complete utilization of energies concentrated adjacent the forward shroud surfaces The invention will now be described with reference to specific examples. It will be understood that the following examples are intended to describe embodiments of the invention and are not intended to limit the invention in any way.

Referring now to FIG. 1, a embodiment of the invention 101 disposed at opposition with ambient fluid currents 102 allows passage of said fluid currents through fluid collection device 103 comprising a plurality of funnel-shaped fluid receiving inlets (FRI) 104 secured in forward frame 105, and also permits fluid flow through fluid extraction device 106 converging with a diverging leeward fluid outlet 107 of disc runner 108. Fluid currents 109 entering first larger diameter open ends of FRI 104 and converging to reduced cross-section ends 110. Fluid conduits 111 connect the ends 110 of FRI 104 to respective involute fluid inlets 112 of turbine fee ring 113, to thereby direct fluid flows 114 into tangential convergence with said disc runner 108. Successive inlets 112 develop a swirl of the working fluid within the housing 115 in the direction indicated by the arrow 116. Working fluid spirally migrated to axial discharge ports 117 offering egress from the disc turbine flow system.

FIG. 1 shows an exploded view. The aft section of frame 105 is attached to a turbine support element 118 that permits fluids passing through FRI 104 and frame 105 to join the fluid extraction device flow-stream 119. Disc runner 108 keyed to shaft 120 receives working fluid streams 114 by way of feed ring 113 The disc runner 108 is contained within the housing 115 and is rotatably mounted therein.

The extraction device 106 surfaces 121 are designed such that the flow 119 issuing from the venturi section 122 thereof intersects the diverging turbine exhaust flow 123, resulting in a combined fluid flow 124 being reintroduced into the ambient medium downstream of the device.

Figure 2B:
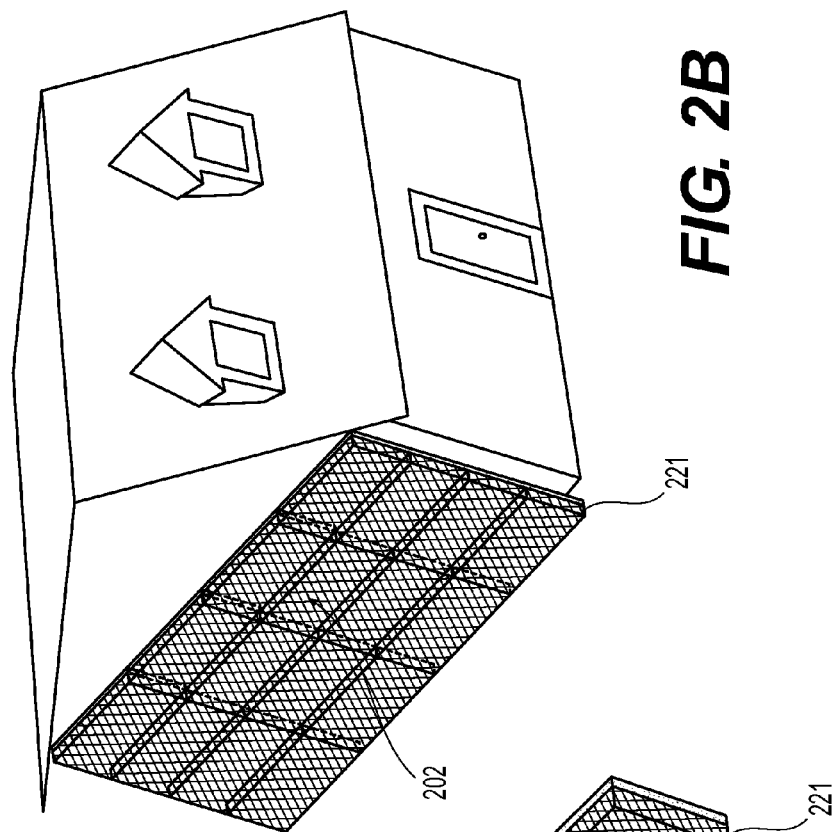
FIG. 2 provides side elevation views of possible implementations of a 'Wind-Wall' approach extrapolating on the stationary embodiment from FIG. 1 to multiplex fluid receiving inlets from large cross-sectional areas of wind into common turbine feed-stream(s).
Figure 2A:
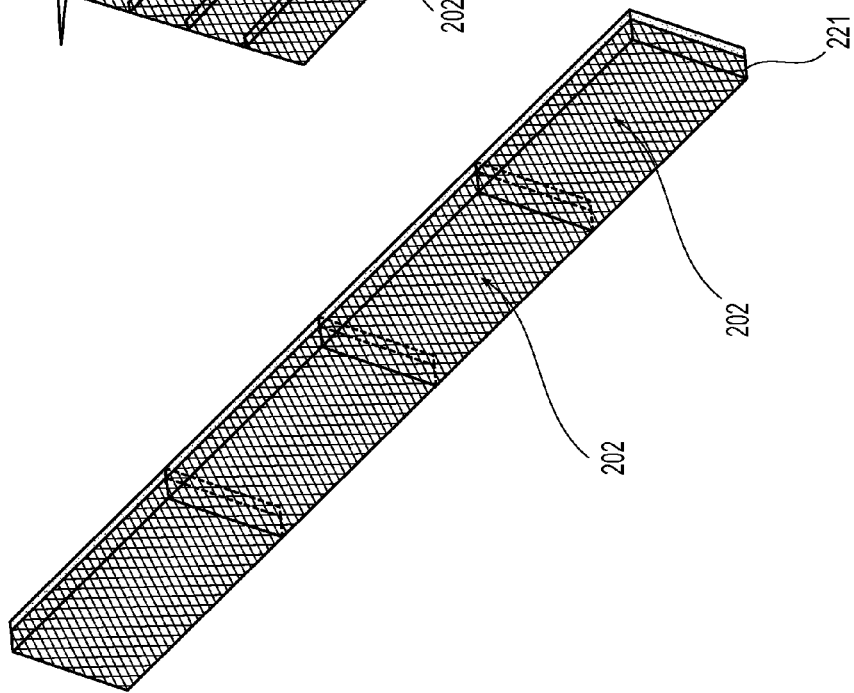

Referring to FIG. 2, wind-walls comprising arrays of fluid collection devices (FCD) 221 disposed in the path of oncoming winds 202 convert a portion of the intercepted ambient speed fluid currents into higher than ambient speed fluid streams.

Figure 3:
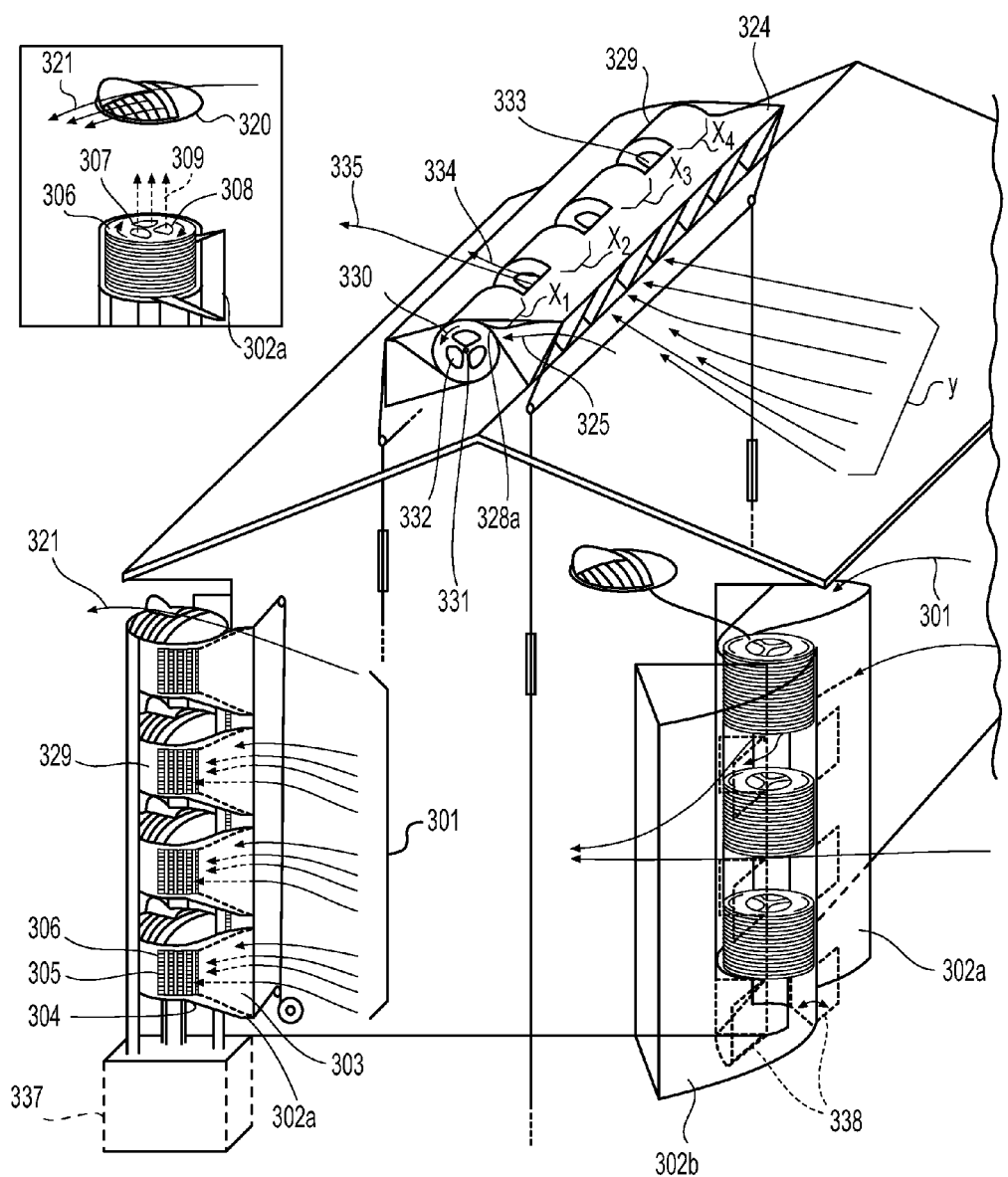
FIG. 3 is a side elevation view depicting alternate embodiments of the invention designed to permit harvesting of wind-power associated with wind currents circulating around building structures.

Referring to FIG. 3, vertical 'wind-column' and horizontal 'wind-row' embodiments are shown.

As shown in the lower left part of the figure, approaching wind 301 enters a convergent fluid-collection device 302a channeling flow-stream 303, into section 304. Upon entering into spaces 305 of disc turbine 306 and spiraling toward central exhaust holes 308 thereof (shown in top left inset), the fluid stream causes the shaft 307 of the disc turbine 306 to be dragged along to enable the production of work. Discharge stream 309 exhausts into fluid extraction device (FED) 320. Currents 321 passing over the FED 320 induces exit of turbine discharge 309. The turbine housing 329 is supported by support structure 337.

As shown in the lower right in the figure, a system of swiveling doors or flaps 338 permit blow-through of a portion of ambient fluid, collected by fluid collection devices (FCD) 302a (or 302b, for alternate wind direction).

Shown near the top of the building structure of FIG. 3 is a horizontal 'wind-row' embodiment. Ambient wind 23 moves over the inclined roof surface area, and the resulting EVFES is directed into a convergent shroud 324. A portion of the EVFES enters as indicated by arrows 325 into a divergent section 328a of shroud 324. Upon entering into turbine casing 329, the EVFES is applied tangentially to the runner therein and passes into the spaces between the discs of the turbine 330 generating rotation of shaft 331 in the direction indicated on the front disc of disc-turbine 330. Air exhausting from disc turbine 330 through axial holes 332 into fluid extraction device regions 333 may be cleared as at 334 into flow-stream 335. Fluid extraction device induction end-caps 339 may be employed to keep debris out of turbine runners.

Figure 4:
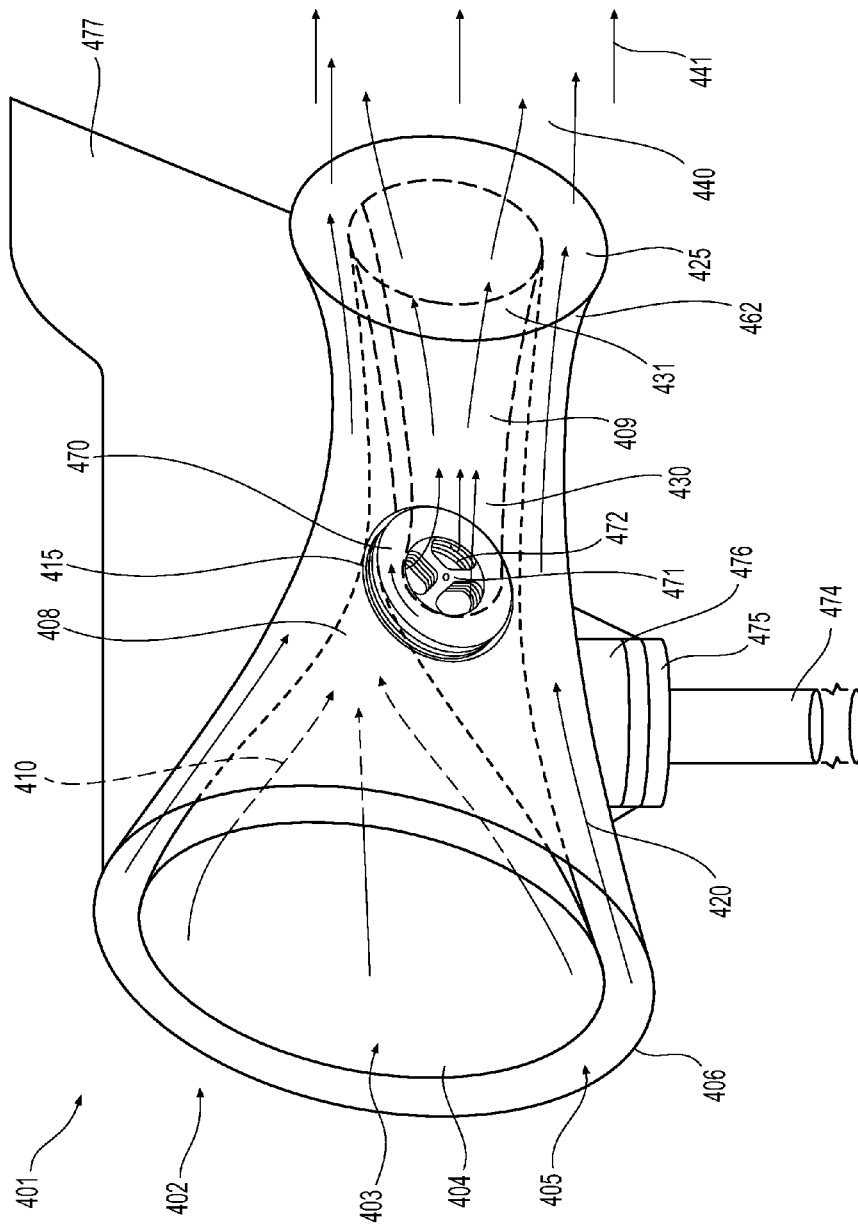
FIG. 4 is a side elevation view detailing a self-aligning substantially conical collector wind turbine application embodiment of the invention.

Referring now to FIG. 4, a self-guiding embodiment of the invention 401 is disposed in the path of wind moving to the right as indicated by arrow 402. Depending upon its position on approach, wind passing toward the invention embodiment may follow path 403 entering into a substantially convergent section of a singular large FRI 404 forming the intake of the turbine section of the embodiment, or alternately, the wind may follow path 405 thereby entering into the external shroud 406 flow.

Turning to a description of central flow path 403, the air mass driven forward by the momentum of the ambient fluid currents 402 (in this case wind) is driven to follow the path indicated by arrows into and through a convergent section 408 wherein the fluid mass may experience slight compression in strong winds, however at lower speed will act generally in accordance with Bernoulli's equation. Subsequently entering a substantially divergent section 409 consistent with the design of a rectangular cross-section deLaval type expansion nozzle of 4 to 8 degrees of divergence, the expanded air mass achieves a velocity in excess of the ambient wind velocity, and approaches the runner of disc-turbine 470 tangentially. Turbine discs, either stoically or dynamically spaced may advantageously be provided at an optimal distance of separation, which for a given working fluid may be approximated by Equation 2(23).

The fluid mass 410 passes into and through a convergent section 408, and enters converging section 415 transition into an involute fluid inlet, and thereafter approaches the runner of disc turbine 470 tangentially. Entering tangentially into the spaces between the discs of the disc turbine 470 mounted on shaft 471, said fluid mass 410 passes from disc periphery to axial exhaust ports 472 and results in rotation of the disc turbine 470 in the direction shown in the front disc thereof.

Entering into the spaces between the discs of the turbine-runner 470 substantially spiral flow-system(s) arise in which the higher-than-ambient speed inwardly trending working fluid develops shear-stresses and torque over the exposed disc surfaces, in passing from disc periphery to axial exhaust ports 472. Those skilled in fluid dynamics applications will recognize that a molecular layer of working fluid adheres to the exposed disc surface(s) providing a fixed, zero-speed boundary layer. Successive layers of working fluid (considered normal to the disc surface) are respectively freer to move, and at some distance 'above' disc surfaces, freely travels through the spaces between discs at full fluid molecules, therefore links the fluid mass passing at full velocity between the discs, through gradationally different speed working fluid layers, to the zero speed boundary layer adhering to the disc surfaces, further resulting in the disc-turbine runner 470 mounted on shaft 471 being dragged along in the direction of the applied higher-than-ambient velocity fluid stream, as indicated by the arrow on the front disc of disc-turbine 470.

Applying the formulae provided in Equations 3 through 6, then, we may solve the theoretical torque and power provided by a disc turbine such as that shown in FIG. 4 with the aid of Equation 5 given the following information: turbine comprises 101 discs of 1 m radius having exhaust port radii of 0.1 m; discs are separated by 0.25 mm spaces; with working fluid (air) at 15° C. provides a working fluid dynamic viscosity=$1.79 \times 10^{-5}$ Ns/m², and ambient wind speed of 10 m/s may be converted by the fluid collection device into a turbine feed stream of 30 m/s generating an average feed velocity across disc surfaces of 15 m/s.

$$T_{Disc} = \frac{2(3\mu \cdot v_\theta \cdot \pi \cdot r(r_2^2 - r_1^2))}{h} \quad \text{Equation 6}$$

$$T_{Disc} = \frac{2(3 \cdot 1.79 \times 10^{-5} \text{ Ns/m}^2 \cdot 15 \text{ m/s} \cdot 3.1415 \cdot 1 \text{ m}((1 \text{ m})^2 - (0.1 \text{ m})^2))}{0.125 \times 10^{-3} \text{ m}}$$

$T_{Disc}$=40.08 N·m $T_{Total/Turbine\ Runner}$=100·$T_{Disc}$ $T_{Total/Turbine\ Runner}$=100·(40.08 N·m)

$T_{Total/Turbine\ Runner}$=4008 N·m, or 2958.2 ft·lbs $$\text{Power}_{Turbine} = \frac{\text{Torque} \cdot \text{speed}}{5252} \quad \text{Equation 9}$$

It should be noted that optimized inter-disc spacing allows disc turbines to reach peripheral speed equal to that of the supplied working fluid. At 15 m/s fluid velocity, therefore, a 1 m radius disc turbine may achieve a rotational velocity:

$$\text{speed} = \frac{\text{Speed}_{fluid}}{C_{runner}} \quad \text{Equation 10}$$

$$\text{speed} = \frac{15 \text{ m/s}}{(2 \cdot \pi \cdot 1 \text{ m})/\text{rev}}$$

speed=2.39 rev/s, or 143 Rev/s

Substituting derived RPM into the power calculation of Equation 9, then:

$$\text{Power}_{Turbine} = \frac{2958.2 \text{ ft} \cdot \text{lbs} \cdot (143) \text{rev/min}}{5252}$$

Power$_{Turbine}$=80.5 HP or 60.1 kW

It is instructive to note that the 101 disc runner specified may occupy an axial length of less than 1 foot . . . (99×0.07" thickness discs+2×1" thickness end discs+100×0.01" inter-disc spacing)=(6.93"+2"+1.5")=9.93" inches.

Returning now to the discussion, maintained fluidic throughput through the disc turbine results in shaft 471 of disc-turbine runner 470 developing significant torque and power even in low wind speeds. Having given up a high percentage of its available kinetic energy in imparting momentum to the discs of the disc-turbine 470, working fluid exits to either side of the disc turbine 470 through axial exhaust openings 472. Following the path indicated by arrows 430 through a substantially divergent exhaust channel 409, the air exits via the internally divergent channel terminating at 431.

Meanwhile, wind entering into first convergent section of external shroud 406 and following the path indicated by arrows 420, upon reaching the divergent section 462 of shroud 406 is directed away from the axis of discharge by diverging profile and upon doing so generates a high velocity discharge stream 425 acting to entrain the internal turbine exhaust stream at 440, placing the discharge air 430 from the divergent section of the disc-turbine exhaust channel 409 substantially within divergent section 462, thereby beneficiating the differential pressure across the disc-turbine systems embodiment 401, the speed of its shaft 471 rotation, and the resultant electrical work output realized from its co-rotating alternator. As shown, post-entrainment of the turbine exhaust stream into the high velocity diverging low-pressure fluid extraction device shroud flow, the total air-stream 441 resumes traveling with the local wind-mass at a speed substantially the same as the native wind, thereby achieving operation substantially without stagnation of the air-stream at and up-wind of the FRI 404.

As shown a strong mast 474 supporting the stationary component of a motion 475 capably supports the weight the embodiment. An upper rotatably mounted component 476 of the motion 475 (inclusive of internally mounted and freely turning bearing means) is rigidly affixed to the lower half 475 and is fully capable of supporting the total structure weight and transverse loads applied to same in strong wind conditions of operation. The self-aligning embodiment of the invention 401 is provided with at least one longitudinally projecting guide vane 477 mounted thereupon a sufficient area, that for any change of wind direction, the invention tracks the wind thereby maintaining its FRI in diametric opposition to the approaching winds. The illustrated embodiment of the invention achieves a maximum of upstream-of-turbine freely obtained air compression, as well as an optimized pressure differential across the turbine provided through the maximization of the induction provided by the separate shroud-flow downstream of the disc-turbine divergent discharge.

Figure 5:
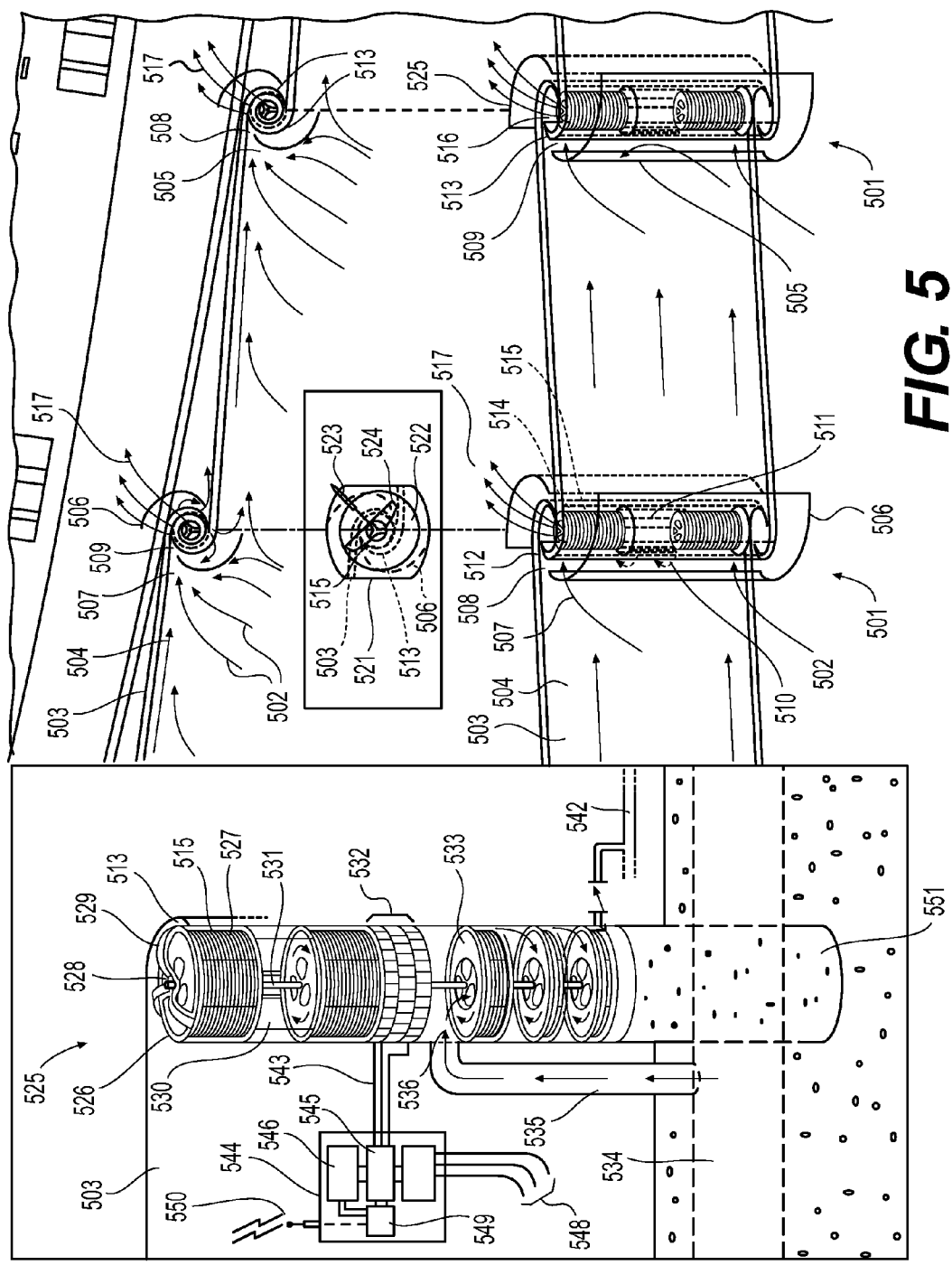
FIG. 5 provides plan and side elevation views of active wind-walls integrating vertical axis disc turbines to provide highway windbreaks meanwhile converting crosswinds into work-producing turbine feed-stream(s).

Referring now to FIG. 5, an application presenting a valid opportunity to decrease pollution levels and greenhouse gas loads is contemplated, wherein, for example, properly staged disc turbines utilizing shaft-torque developed by natural fluid currents discussed may be concurrently applied via co-rotating axially staged disc-compression means in-taking captured industrial and other carbon emissions supplied from ducts 534 transferring same to compression plants, and via direct centrifugal acceleration thereof in combination with appropriately formed dynamic-to-static pressure recovery volute means, may convert atmospheric pressure $CO_2$ emissions bound for deposition into carbon dioxide sequestration vaults into a greatly pre-compressed product with substantially no negative environmental impact as may otherwise be imposed by burning fossil-fuels either directly or indirectly to provide the power required for the same compression gains. The compressed $CO_2$ product may then be provided to further compression and cooling means to liquefy the pre-compressed product, thereby minimizing the load and cost associated with maintaining carbon sequestration means into the future.

Embodiments 501 (shown secured to guard-rails beside a highway) are configured to cause the oncoming wind currents 502 to cooperate with fluid collection device segments (or walls) 503 to direct available wind currents 504 into invention embodiments 501 wherein work extraction or conversion elements are housed. Wind currents 504 are joined by further wind currents 505 which follow the Coanda profile of segmental fluid collection device deflectors 506, and combined with yet other ambient winds 507 driven unto convergence with flows 504 and 505 at venturi throats 508 formed between fluid collection surfaces 503 and 506. Current 509 may induce a portion of discharging fluid stream 510 issuing through openings 511 to join into current 509. The resultant flow-stream directed to pass through the second venturi throat 512 formed by fluid collection surface(s) 503 and complementing involute wall extension(s) 513 provides a fluid flow 514 to disc turbines 515 housed between involute wall extensions 513. Discharge fluids 517 are cleared from discharge outlets 516 through top-mounted fluid extraction device(s) 521 (see plan view inset). Fluid extraction device(s) 521 incorporates a circular hood section 522 and aft wind guide 523 which positions induction outlet section 524 largely into leeward facing orientation. Shaft bearings and support means there-for as well as structural support means for securing fluid collection device walls 503, deflectors 506 and volute wall extension(s) 513 are also provided by 521.

As indicated in the side elevation view, an inner assembly 525 may be provided comprising essential elements including: turbine 515; tangential inlets 527 to communicate working fluid 514 through convergent venturi throat 512; bearings 528 and support means 529 there-for; turbine discharge region 530; shaft 531; electrical generation means 532; multistage compression runner 533, conduits 535 and 542; stabilization fill 551 and other components in a cassette 526 secured to wall extensions 513.

In operation, the turbine rotates as indicated by arrows on the upper disc of above-ground turbines 515 turning multistage compressor 533 comprised of axially separated disc runners of sequentially decreasing disc spacing. Fluid is supplied to the inlet of the first stage of compression from conduit 534 via branch conduit 535 to cassette connection 536. FIG. 5 also shows connection of electrical generation means 532 via electrical conductors 543 to a control box 544 housing a rectifying power conditioner 545, energy storage means 546, electrical load connection means 548, and remote control capability via wireless controller 549 and antenna means 550.

Figure 6:
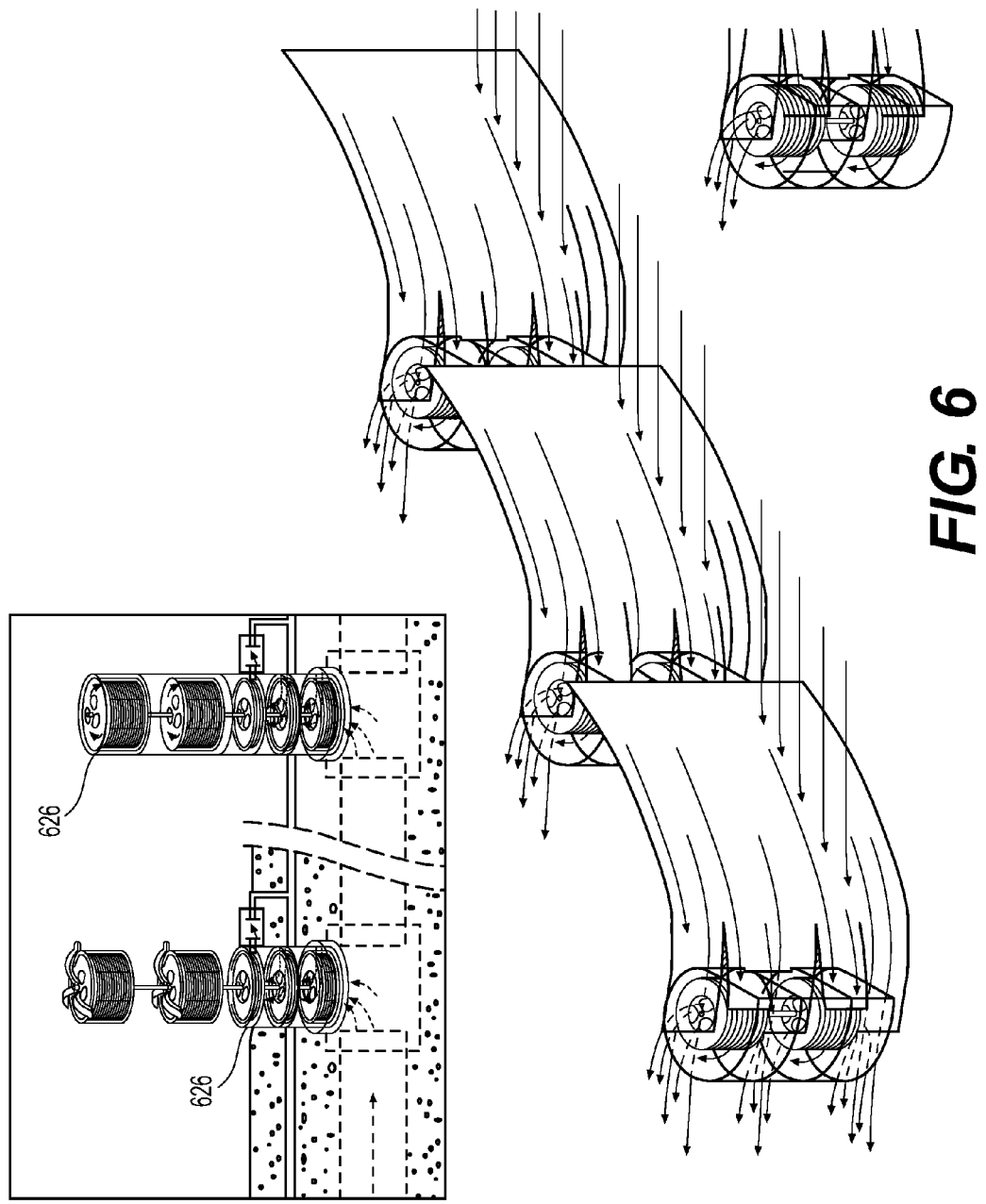
FIG. 6 is a side elevation view of alternately employed vertical axis wind-wall embodiments applicable to fence-line wind energy harvest and integration into building structures further showing $1^{st}$ stage industrial emissions (carbon-dioxide) compression means in conjunction with electrical production.

With reference to FIG. 6, a similar opportunity to that presented in FIG. 5 is presented, wherein a properly staged disc turbines developing shaft-torque from natural fluid currents above ground elevation may be utilized by co-rotating axially staged disc-compression means substantially below ground, taking in captured industrial and other carbon emissions from similar carbon transport ducts, and via direct centrifugal acceleration thereof in combination with appropriately formed dynamic-to-static pressure recovery volute means, may convert the atmospheric pressure $CO_2$ emissions bound for deposition into carbon dioxide sequestration vaults into a greatly pre-compressed product with substantially no negative environmental impact as may otherwise be imposed by burning fossil-fuels either directly or indirectly to provide the power required for the same compression gains. The compressed $CO_2$ product may then be provided to further compression and cooling means to liquefy the pre-compressed product, thereby minimizing the load and cost associated with maintaining carbon sequestration means into the future.

As shown in the inset, mounting of cassette 626 into tees in the carbon dioxide/emissions capture conduit may be implemented to facilitate tie-ins to pre-existing piping networks or otherwise simplify integration of the method.

Figure 7:
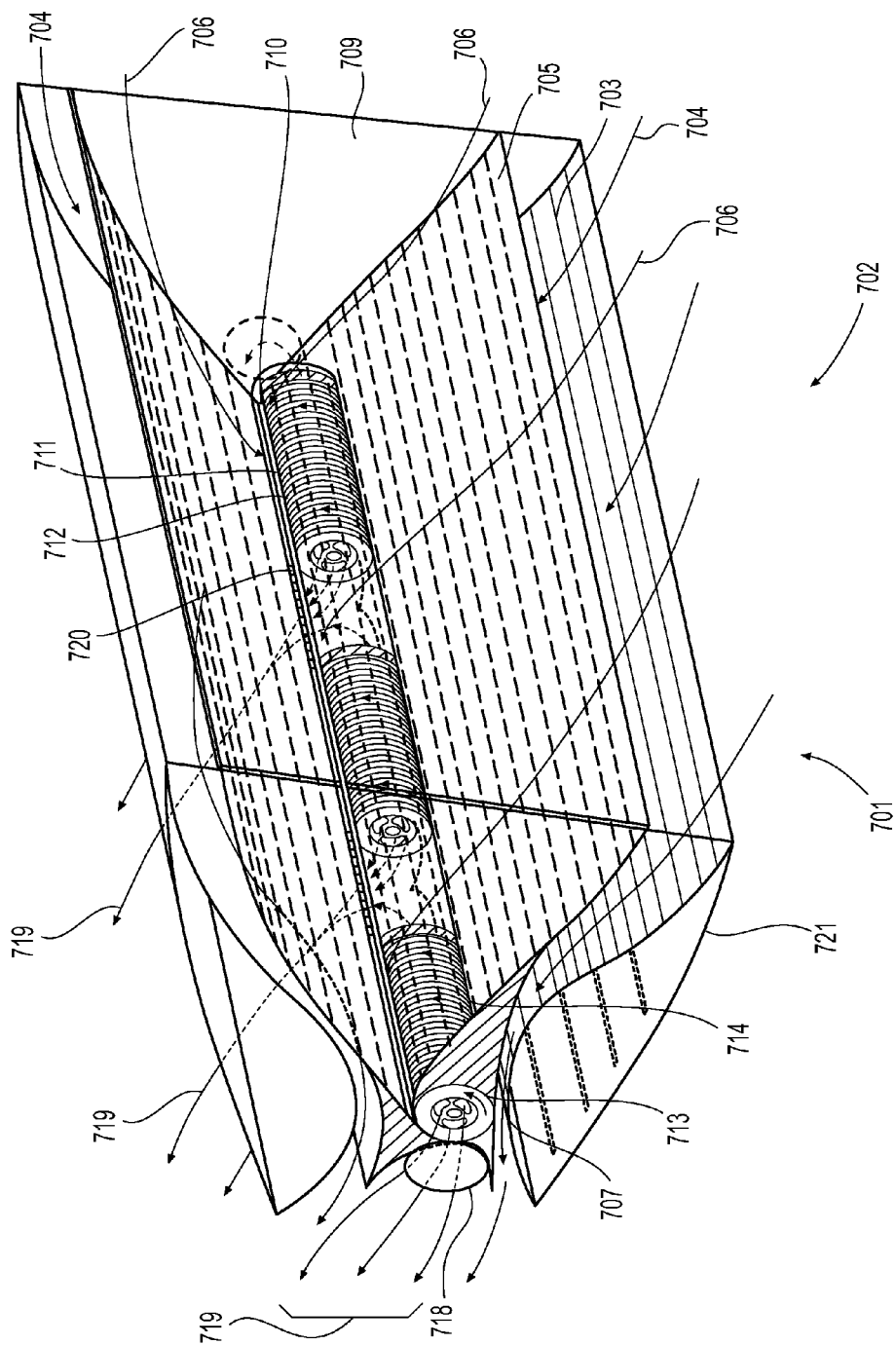
FIG. 7 is a side elevation view of a bi-convergent wind collector invention embodiment utilizing the venturi effect and external shroud flow to induct turbine throughput away rapidly.

FIG. 7 shows an application incorporating an inner (large) fluid collection inlet, an outer venturi effect producing shroud, and further, an outer shroud. The inner shroud collects the working fluid entering the turbine and drives same into turbine. The fluid velocity increases with reduced flow cross-section, to turn turbines discharging into divergent duct; the duct being acted upon by the venturi-induction of the outer shroud; and with the energy of fluid not passing into work generation through turbine, acting to drag turbine exhaust out of turbine, and the energy bypassing and going around outermost shroud also acting in drag on turbine exhaust through slots therein.

As indicated in the figure, embodiment 701 disposed in the path of ambient fluid currents 702 permits fluid flows 706 and 704 to enter into convergent upper and lower fluid collection devices (FCD) 705 and 703, and also permits fluid flow externally around device 721. Choosing flow 706 in FCD 705 first, ambient fluid 702 may be driven between converging upper and lower surfaces of FCD 705 laterally bounded by fluid inlet wall 709 developing a combined EVFES 710 as flow 706 merges toward the smaller end of FCD 705, with said EVFES 710 thus developed either passing via involute fluid inlet(s) 711 unto tangency and entry there-into work extracting disc turbines 712, or alternately passing through 'blow-through slots' 720 comprising openings to produce discharge flows 719.

The disc turbines 712 have isolation end plates 713 secured and having central hole(s) matching disc turbine axial discharge hole(s) pattern. Isolation end plates 713 isolate the fluid flow within the volute and may also be used as mounting surfaces for both the turbine bearings and the divergent discharge duct 718. Upon reaching tangency with disc turbine 712, working fluid 710 enters into spaces between the discs of the runner as similarly indicated by arrow 714 and rotates the disc turbine 712.

Figure 8:
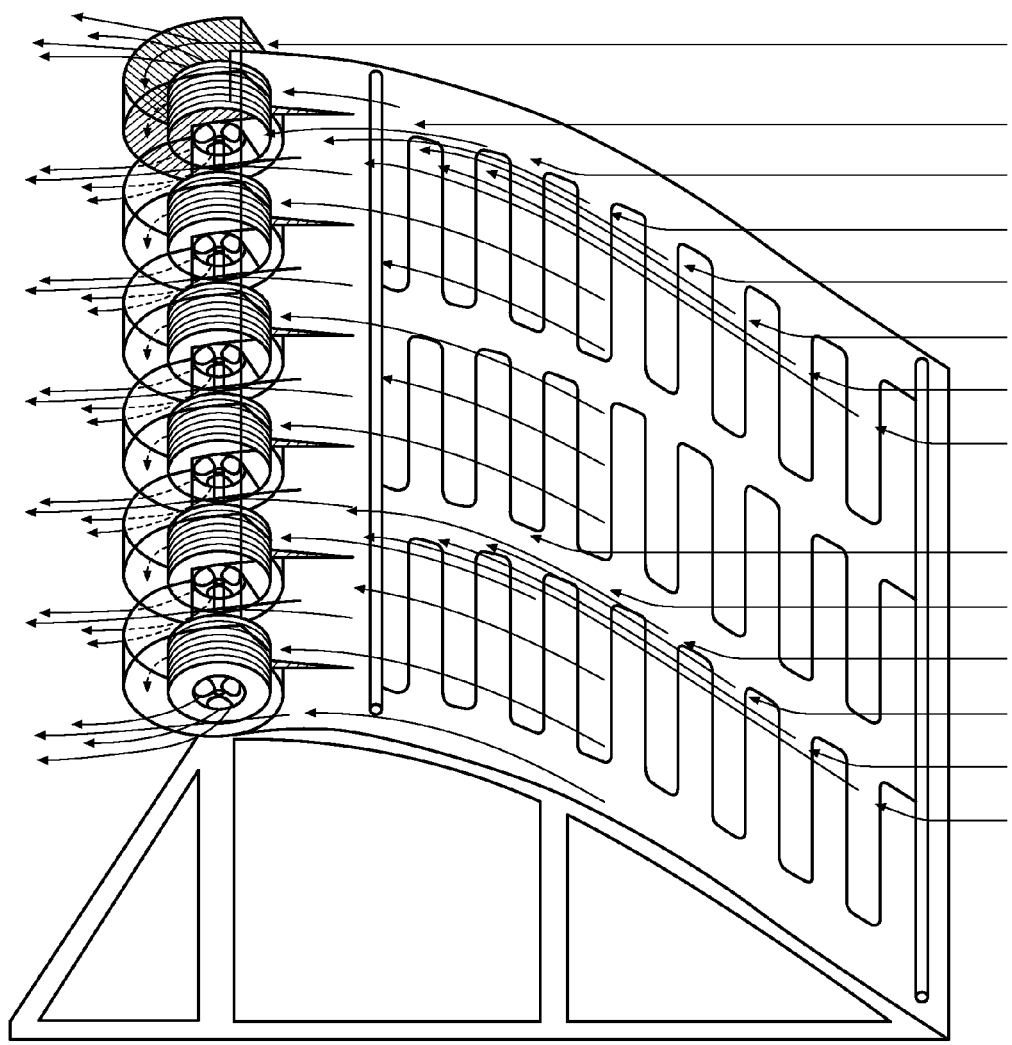
FIG. 8 is a side elevation view of a row of horizontal axis wind turbines (disc turbines) indicated to be co-producing energy alongside solar thermal energy harvest also integrated into the same shell of wind-break, sea-surf or other sort of offshore energy harvesting platform.

With reference now to FIG. 8, a simple ramp form, which may take the form of a windbreak, a greenhouse, or many other common structures of limited service, or combinations of same, may provide clean energy generation via fluid energy extraction built there into, as well as solar thermal energy extraction, as also indicated. As shown in the figure, working fluid accelerates as it is limited by the decreased flow cross section introduced by the inclined 'airfoil' surface in the fluid's path by the ramp like structure, velocity increase driving fluid into top of ramp turbines, while in between turbines high velocity flow is allowed to flow through, adjacent to the exhausts of the turbines, so that fluid drag is imposed at key close proximity for cubing of drag function.

A FCD surface area is indicated in the figure to develop a EVFES flow following a streamlined course unto tangency with a plurality of disc runners located at the top of the ramp.

Figure 9A:
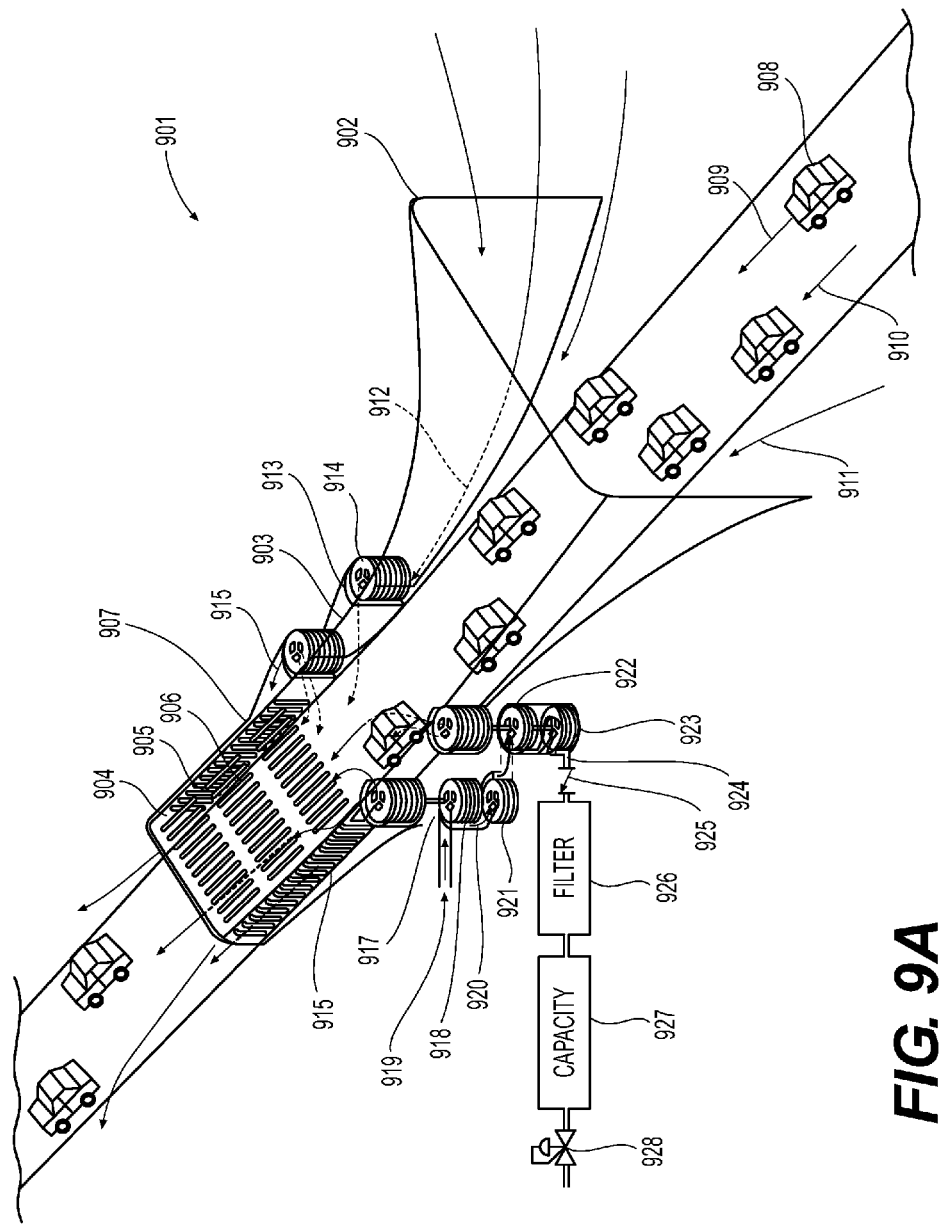
FIG. 9 provide two side elevation views of the invention employed to recover automobile wind-drag energy while concurrently providing carbon-dioxide emissions compression.
Figure 9B:
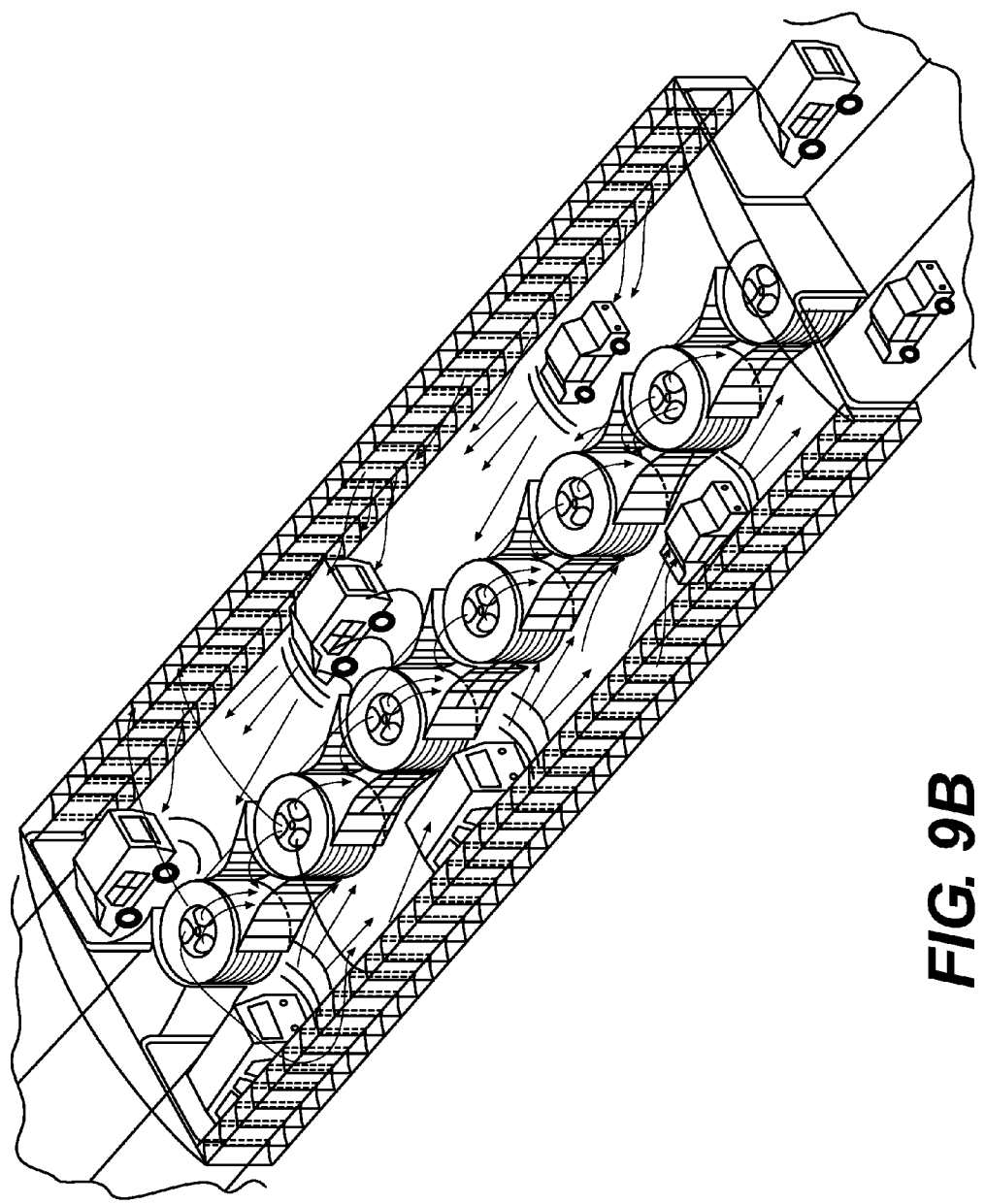

Referring now to FIG. 9, the presently disclosed invention contemplates useful service harvesting a portion of the incredible waste of energy, and concurrently contemplates reducing pollution load and anthropogenic greenhouse gas levels in the atmosphere through application of the invention in automobile wind drag energy recovery. It is well known that upwards of 70% of the energy found in the fuel utilized to force an automobile through the atmosphere at highway speeds is significant, and results in a great waste of fuel and resultant emissions of particulates, and atmospheric carbon dioxide level increase. This waste materializes in parasitic loads induced while inefficient combustion engines push on and through the ground-level atmospheric layer, as well as materializing in fluid drag across, adjacent and behind the automobile, which may be compared (in various forms, and in an exaggerated degree for purposes of discussion) to a brick wall or a parachute on wheels, with a motor trying to force it through the heavy viscous mass of air (mixture) in which we live and which we breathe without recognizing necessarily its effect thereupon the discussion at hand. Yet the fact remains, that a means to recover and convert to useful service this waste energy would benefit us all, and so the figure contemplates. FIG. 9a utilizes shroud form to capture velocity energy at vena contracta of the neck of the shroud, whereas a cover placed around sides and top of FIG. 9b would make better use of the drag effect.

FIG. 9a illustrates an application according to the invention in which a portion of the energy of atmospheric pressure fluid induced by auto-traffic to enter into a flared fluid collection device shroud may be extracted by providing a plurality of egress paths from the throat section of said shroud through disc turbines having discharge outlets acted upon by the automobiles' motion. For purposes of clarity, turbines and their affiliated multi-stage compression elements have only been indicated along the sides of the vena-contracta region 903 of the tunnel commencing at flared entrance. Louvered leeward opening panels lining inside tunnel surfaces permit the inducted air-stream (turbine discharge air) to be brought into proximity with the induction source (automobile-dragged fluids).

In operation, the highway wind drag energy recovery device 901 is disposed about a unidirectional traffic route with the clearance between the traffic and the inside surfaces of tunnel 902 forming a fluid collection device. Flaring of the inlet may allow greater induction flow to be pushed and dragged into tunnel 902 further formed to provide a vena contracta 903 and discharge 904 (exit). Internal to tunnel 902, louvered sidewalls 905 and ceiling 906 surfaces cooperate with non-louvered shells 907 where-into and through which discharged working fluid 915 from work extracting disc turbines 914 may freely pass. Availed of substantially free egress through said louvered surfaces 905 and 906 (forming a fluid extraction device), working fluid discharge 915 from turbines 914 communicates with the flow pushed and dragged through tunnel 902 so as to exact fluidic drag upon discharged working fluid 915, in process of migrating to the tunnel exit 904.

Automobiles 908 pushing air 909 and dragging air 910 along there-with may cause atmospheric pressure fluid currents 911 to enter said fluid collection device permitting convergent fluid flow 912 to be generated upon approach to vena contracta region 903. The moving air-mass 912 may enter into involutes fluid inlets 913 of disc turbines 914 setting the discs into rotation.

As shown in the figure, work extracting disc turbines 914 equipped with co-rotating shaft couplings 917 may be utilized to drive multi-stage disc compression means. First stage disc compression runner 918 ducted to receive low pressure fluid 919 at its axial inlet pressurizes same and thereby provides an elevated pressure feed 920 to second stage compression runner 921. Interconnection of the second stage pressurization volute to the inlet of a third stage compression runner 922 further supplies a pressurized discharge to final stage compression runner 923 to develop a fluid product 924 of enough compression to permit its passage through check valve 925, filter 926, capacity tank 927 and regulator 928.

With reference now to FIG. 9b the invention is applied to the harvest of automobile wind drag (wake) energy. Waves of viscous fluid (indicated in the figure as arcs forward of the leading surfaces of automobiles) moving at the velocity of the automobiles sweep through the surfaces of vertically elongate fluid extraction device features provided along the full lengths of the inner louvered wall of the shell of said drag-tunnel. The fluid extraction device features have leeward facing openings which combine with similar features located between disc turbines, to allow the egress of the disc turbines' discharge there-through.

The illustrated bi-directional drag-tunnel isolates the respective directions of fluid-energizing automotive traffic from each other, except for the cooperating involute fluid inlets that commonly guide the energized fluid unto tangential counter-clockwise convergence and entry into the central disc turbines.

With reference to FIG. 10, a preferred invention embodiment is presented which illustrates some of the possible automation features contemplated for the invention, which may endow the presently disclosed invention with the capacity for remote control by a SCADA (supervisory control and data acquisition) operator who may be one of many monitoring and controlling arrays comprising myriad devices similar to and or similar in function to the one contemplated in the figure, which may lend higher efficiency and controllability features to the invention which may not currently be represented in the prior art, namely: variable cross-sectional area sweep, which may desirously provide greater energy for extraction in working fluid streams supplied to disc turbines of the method by disposing a configurably inclining, and therefore from the fluidic perspective, cross-sectional area variant, airfoil surface into opposition with the approach of oncoming fluid currents which as described by Bernoulli may result in fluid passing both there-over and there-under at increased velocity (per Equation 7); variable pitch adjustment, which may be advantageous to cancel lift effect on device embodiments at run-time, as well as to better align the device to fluid currents approaching from different direction, and intra-device array spacing or offsetting, which may further enhance energy extraction from the intra-device re-direction and passage of fluids. This figure may also be utilized in the underwater environment.

The top half 1019 and the bottom half 1020 are mirrored in functionality and form, as they have equal numbers of work extracting disc turbines and other associated features. Support structures 1012 are linked with FED/FCD 1004 and are operatively associated with the arched positioning features in the curved slot 1013. In operation, the approaching ambient wind currents 1002 are split into upper fluid sheets and lower fluid sheets, free to follow the forward Coanda surface profiles offered by the upper 1005 and lower 1006 surfaces of FCD/FED 1004, creating EVFES streams 1003 and 1003' respectively. EVFES 1003 approaches the first row of disc turbines 1007 located in involute fluid inlets 1008. Low siphon pressure is applied to the turbines' discharge outlets by leeward-facing FED openings 1009 of shrouded section 1019. Turbine discharge entrains as inducted flow-stream 1010 into EVFES flow-streams 1011. Hazard lamps 1016 may be added for safety purposes. Actuators 1017 affixed to mirrored halves 1019, 1020 in combination with controllable hinging action of mirrored halves 1019, 1020 provided by one or more hinge mechanisms 1021, effect relative displacement 1018 of the mirrored halves and thus variable cross-sectional area for fluid collection. As indicated in the inset at right, controlled extension of actuators 1017 alters the inclination of the fluid collection device and thus the degree of interception of the ambient fluid current. The inclination of FCD using the actuators 1017 simultaneously inclines the involute fluid inlet openings whereby EVFES may be driven unto the perimeters of the disc turbines more directly. As shown in the inset at left, FCD 1014 additionally includes volute extensions 1024, which may be controlled to alter the amount of fluid currents that are adequately directed towards the first row and second row of disc turbines 1007, for work extraction.

Figure 11:
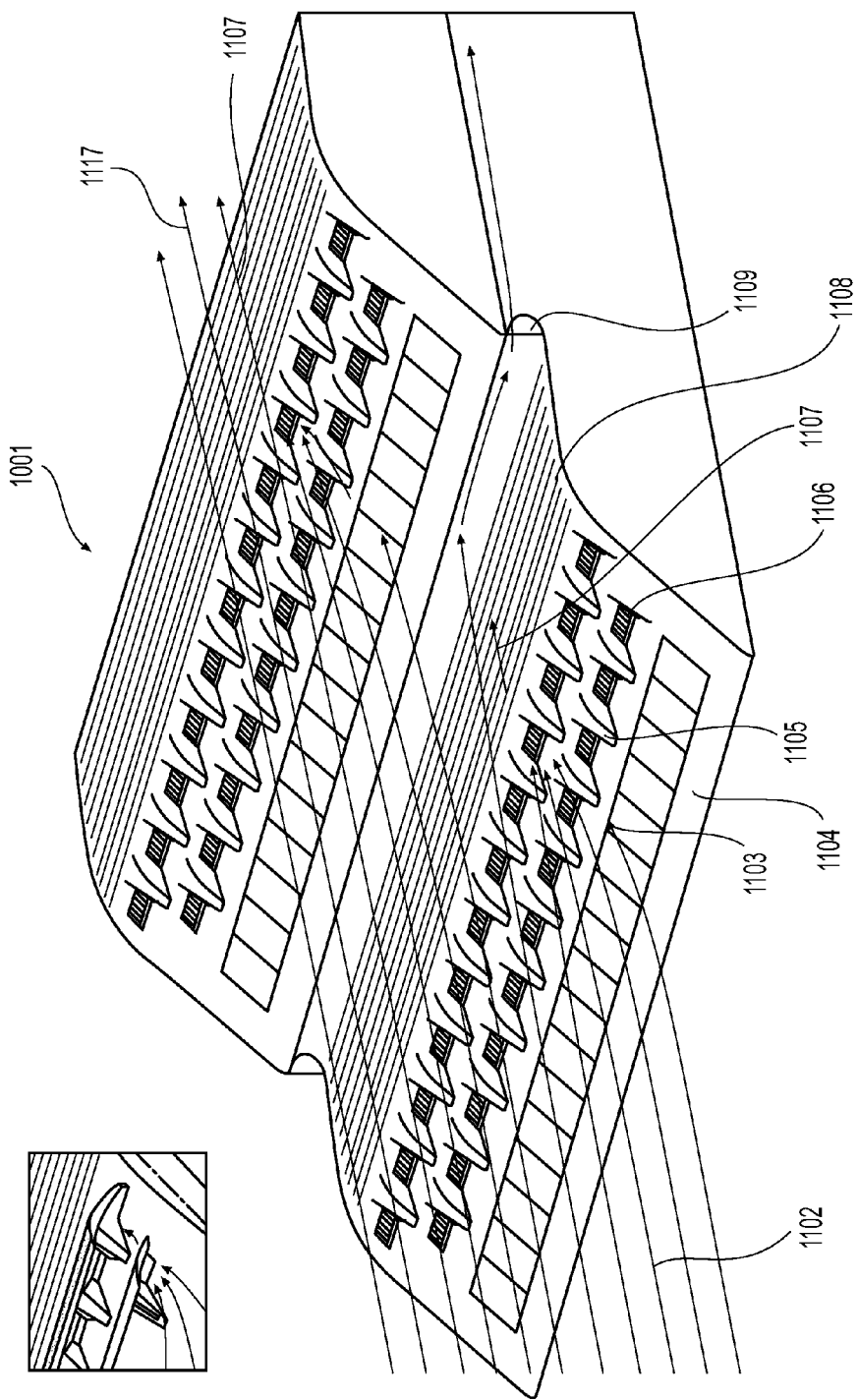
FIG. 11 is a further large cross-sectional area, multi-element horizontal-axis wind energy harvesting application integrating rapid siphoning/induction of turbine discharge integrated as shown for LEED energy sustainability.

Referring now to FIG. 11, an integration of LEED energy integration into buildings wherein the structure of the building already has forces acting on them, and with some modification, the upper rim of conducively sloping buildings may be utilized by the method to provide fluid energy harvest.

The figure illustrates fluid current energy harvest integration by a substantially horizontally lain building appropriately positioned and aligned in the environment so as to intersect ambient fluid currents with fluid collection device surfaces comprising inclined surfaces thereof and providing fluid extraction device elements comprising louvered leeward opening slots to effectively drag upon disc turbine discharge outlets. Pertinently, the same figure rotated counter-clockwise through 120° of arc illustrates the same method's integration into the domain of tall buildings and structures where additional features discussed in respect to FIGS. 5, 6, 8 and 9 may provide further important measures of clean energy generation.

As shown in the figure, embodiment 1101 integrates the invention concept into the shell of a building aligned so as to intersect the mean wind-flow pattern through the region. Ambient wind currents 1102 intersected by the large building face surfaces 1104 though inclining nevertheless represent a very large surface area disposed to the vector of said fluid currents' approach and thereby develop into an EVFES 1103. EVFES 1103, driven substantially along the azimuth of the ambient wind vector unto tangency with work extracting disc turbines 1106 mounted for rotation at the mouth of involute fluid inlet(s), or volute(s), integrated into the shell of said building face 1104 may develop initial rotation of said disc turbine(s). Medians 1105 may serve to direct added working fluid to each involute fluid inlet so as to guide EVFES arriving from alternate azimuths into alignment disc turbines. EVFES not entering turbine(s) 1106 and driven over the roof-top to become fluid extraction device flows inducing exhausted turbine discharge fluids 1107 unto egress through leeward facing induction drag slots 1108 there-upon said upper building surfaces. As indicated in the figure, winds may find varied routes of egress (ie: as at 1109, cross-wise to the flow), or may alternately be inducted into higher elevation flows 1117.

With reference now to FIG. 12, a device embodiment suited to RISEC application, 1201, is disposed in rapidly approaching currents of river water, 1202, at 5° C. and 5 m/s speed and is suitably located at a depth providing continuous immersion. Parted by the nose of the RISEC device's winglet-like upstream shroud, 1203, fluid collection shroud surfaces develop descending flow-stream, 1204, and ascending flow-stream, 1205. Descending flow stream 1204 upon reaching vena-contracta point, 1206, as well as ascending flow-stream, 1205, upon reaching vena-contracta point, 1209, accelerate as potential energy accumulated in the fluid on upstream shroud surfaces is released and converted to kinetic energy increase in energized lower fluid stream, 1208, and upper energized fluid stream, 1210, over shroud contours provided. Joined by fluid collected and also directed unto tangency with an onboard work extraction disc turbine 1215 at advantageous angles of attack, volute entry lips, where-over flows 1208 and 1210 pass, in conjunction with concave surfaces, 1207 and 1216 collect and direct significant added working fluid unto tangency with turbine 1215. It should be noted in considering the figure that disc spacing therein is extremely exaggerated in order to not portray spaced-apart disc members instead of cylinders (which would be the result of accurately spaced disc members portrayed therein).

Lower shroud, 1211, incorporates bearing frames wherein waterproof bearings 1213, comprising solid grease bearings or other advantageous variety known in underwater application, freely turn to allow turbine shaft, 1212, to turn at moderate to high speeds beyond those required of the prior art. Volutes, 1216, guiding working fluid unto tangency with application-optimized disc turbine runners, 1215, by design also provide full admission of large volumes of 'zero-head' fluids in motion to optimally separated discs, 1214, forming side walls of channels, wherein shear-stress and torque are developed between discs of the disc turbine and working fluid spiraling through paths of least resistance toward axial exhaust outlets.

Re-visiting Equations 6 and 9 to determine theoretical torque and power available firstly from one inter-disc channel (both sides of a given 1 m radius disc having a 0.2 m radius axial outlet hole pattern), and secondly a complete disc turbine runner of 100-channel count of identical dimension, and given variables: water temperature=5° C. (further providing μ=1.519×10⁻³ Ns/m² freshwater dynamic viscosity); ambient fluid=10 m/s (Niagara River) an enhanced EVFES velocity=15 m/s (provided through the accelerating effect of invention embodiment fluid collection device); assuming relatively optimized inter-disc spacing allowing disc turbines to reach peripheral speeds equal to that of the supplied working fluid; and further considering that at 15 m/s fluid input velocity developed by the device features may yield an average fluid velocity across complete disc surfaces of 7.5 m/s translating to allowing a 1 m radius disc turbine to therefore achieve a rotational velocity=1.19 rev/s, or 71.6 RPM.•

$$T_{Disc} = \frac{2(3\mu \cdot v_\theta \cdot \pi \cdot r(r_2^2 - r_1^2))}{h} \quad \text{Equation 6}$$

$$T_{Disc} = \frac{2(3 \cdot 1.519 \times 10^{-3} \text{ Ns/m}^2 \cdot 7.5 \text{ m/s} \cdot 3.1415 \cdot 1 \text{ m}((1 \text{ m})^2 - (0.2 \text{ m})^2))}{0.5 \times 10^{-3} \text{ m}}$$

$$T_{Disc} = 412.3 \text{ N·m}$$

$$T_{Total/Turbine\ Runner} = 100 \cdot T_{Disc}$$

$$T_{Total/Turbine\ Runner} = 100 \cdot (412.3 \text{ N·m})$$

$$T_{Total/Turbine\ Runner} = 41\ 230.7 \text{ N·m, or } 30\ 428.3 \text{ ft·lbs}$$

$$\text{Power}_{Turbine} = \frac{\text{Torque} \cdot \text{speed}}{5252} \quad \text{Equation 9}$$

Substituting derived torque and RPM into the power calculation of Equation 9, then, we may calculate the theoretical power of RISEC device disc turbine runners shown in the figure as:

$$\text{Power}_{Turbine} = \frac{30\ 428.3 \text{ ft·lbs} \cdot (71.6) \text{rev/min}}{5252}$$

$$\text{Power}_{Turbine} = 414.8 \text{ HP or } 309.4 \text{ kW (each)}$$

Since there are two runners in this embodiment, therefore, the theoretical power of the embodiment is twice the calculated value above, or 618.9 kW for this true in-stream device, it should be noted that the disc spacing specified of 1 mm (implied by h=0.5 mm) in the above calculation is larger than ideal to allow greater throughput. Although in water applications discs may tend toward greater thickness to safely handle the anticipated greater torques produced, material thickness may still provide a 101 disc runner along a compact axial length.

Referring now to FIG. 13 disclosing an embodiment 1301 of the invention intended for bi-directional TISEC, service, once again inter-disc spacing is not representative herein of true spacing for illustrative purposes, and only flow across the upper shroud surfaces are referred to avoid unnecessary dialog duplicity. As indicated, tidal or oceanic currents 1302 approaching the invention embodiment from right to left, may develop fluid collection device enhanced velocity flows (EVFES) 1303 and 1304 while ascending upper fluid collection device surface 1305. Depending upon their lateral (longitudinal) trajectory along the device, the velocity-enhanced fluid streams reaching velocities possibly many-fold those of the ambient currents re-directed by the forward shroud may either enter into adjustably positioned volutes 1307 as EVFES 1303 or may alternately pass between volutes as EVFES 1304. EVFES fluid sheet 1303 directed to enter into involute fluid inlets 1307 which may comprise housings 1310 having adjustably positioned 6 volute extensions 1307 to guide fluids unto approach with disc turbines 1308. Developing counter-clockwise rotation in the upper level turbines 1327 due to the flow applied thereto, as compared with the lower (underside) turbines 1328 developing rotation in the opposite directional sense, it should be pointed out that this configuration nullifies torque induced lateral forces via counter rotation. As previously discussed, this configuration provides a zero-net hydrodynamic lift effect, which is substantially new in the art as compared to the prior art which strives to increase this effect in one direction or the other to generate greater torque via their methods. Generating shear-stress and torque in response to fluid flow through the substantially optimized flow channel widths provided by the plurality of flow channels provided by the multiple disc rotors employed, significant power is thereby made available to work conversion means (not shown). Fluids discharging from disc turbine runner axial outlets 1309 into cassettes 1310 (see inset) providing rigid mounting for seawater resistant bearings (not shown) have large capacity holes 1311 therein to pass maximum turbine throughput indicated as flow-stream 1312. Flow-stream 1312 having given up significant kinetic energy in developing rotor torque and resultant work conversion, passes through large capacity duct 1313 under flooded suction applied by flow-stream 1304 potential energy release over the produced vena-contracta at the union between forward 1315, and leeward shroud surface 1314 which in developing acceleration of fluid stream 1304, now considered inducting flow-stream 1315 also produces a siphoning effect upon internally discharging fluids 1312. Drawn under siphon, fluid stream 1312 may either continue its downward path toward re-induction through self-actuating gate 1316 and thence through tail section 1317 and finally through aperture 1318 unto re-entrainment into the external flow stream as induction stream 1319, considered combined flow stream 1320 upon joining same, or alternately said turbine discharge throughput flow(s) 1312 may find egress through self-actuating flaps (or apertures 1321 dragged into flow-stream 1315 at acute angle) as inducted fluid stream 1322, at length also joining into combined flow stream 1320.

The TISEC device presented in the figure may in combination with internal support structure (not shown) be strongly and fixedly attached to a high strength rotating bearing sleeve 1323 at the ends of which preferably high radial load saltwater resistant bearings such as solid grease bearings (also not shown) may be rigidly supported to provide rotation and automatic positioning on changing tidal directions. Second inner rigid tube 1324 through which electric, hydraulic and or OTEC heat-extraction fluids may be passed (1325, 1326) in separated spaces may provide connection to respective transmission lines preferably under the sea floor for furtherance to above-sea level coupling stations. Coupling of high-pressure hydraulic lines through a check valve and other safety shut-off valves, for example would allow the charging of a high-pressure reservoir to useful capacity for belayed application through a pressure regulator to a disc-turbine mounted on the shaft of a grid-tied or off-grid electrical generator, for electrical work output. Preferably benign hydraulic fluids discharging from generator mounted disc turbines would then pass to a low-pressure reservoir providing flooded suction to the co-rotating onboard-embodiment disc-compression means in substantially closed loop. In this mode of operation co-rotating hydraulic compression discs would be mounted in isolated, communicating stages on common shafts with the work conversion turbine runners 1307 of rows 1327 and 1328.

Extension of bearing sleeve 1323 beyond the limits of the embodiment sketch may either enable tethering, or alternately attachment to a heavy base and structural support stand 1329 (indicated at lower left) upon which embodiments may safely and restrainedly pivot under maximum currents anticipated. As also indicated in the figure at lower left, this TISEC device embodiment is intended to provide self-alignment to ebb, subscripted A, and tide, subscripted C, flow directions in conjunction with rigid rotating bearing means. Position B indicates the position of rest during no tidal or ebb flow.

Various methods may be proposed to isolate upper turbine row 1327 and lower turbine row 1328 fluid discharge streams to prevent adverse head pressure application to the lower elevation turbine discharges, and as discussed, wherever possible may utilize head pressure from turbine discharges to re-induction path which utilize gravitational acceleration to advantage.

Once again re-visiting Equations 6 and 9 to determine theoretical torque and power available for this TISEC device, firstly from one inter-disc channel (both sides of a given 1 m radius disc having for example a 0.25 m radius axial outlet hole pattern), and secondly complete disc turbine runner(s) of 150-channel count of identical dimension, and given variables: seawater temperature=0° C. (further providing $\mu=1.88\times10^{-3}$ Ns/m$^2$ seawater dynamic viscosity); an enhanced EVFES velocity=15 m/s (provided through the accelerating effect of invention embodiment shrouds from, for example, tidal currents of 5 m/s ambient velocity not uncommon in selected regions); assuming relatively optimized inter-disc spacing allowing disc turbines to reach peripheral speeds equal to that of the supplied EVFES working fluid velocity; and further considering that at 15 m/s fluid input velocity developed by the device features may yield an average fluid velocity across complete disc surfaces of 7.5 m/s translating to allowing a 1 m radius disc turbine to therefore achieve a rotational velocity=1.194 rev/s, or 71.6 RPM:

$$T_{Disc} = \frac{2(3\mu \cdot v_\theta \cdot \pi \cdot r(r_2^2 - r_1^2))}{h} \quad \text{Equation 6}$$

$$T_{Disc} = \frac{2(3 \cdot 1.88 \times 10^{-3} \text{ Ns/m}^2 \cdot 7.5 \text{ m/s} \cdot (3.1415) \cdot 1 \text{ m}((1 \text{ m})^2 - (0.25 \text{ m})^2))}{1 \times 10^{-3} \text{ m}}$$

$$T_{Disc} = 249.2 \text{ N·m}$$

$$T_{Total/Turbine\ Runner} = 150 \cdot T_{Disc}$$

$$T_{Total/Turbine\ Runner} = 150 \cdot (249.2 \text{ N·m})$$

$$T_{Total/Turbine\ Runner} = 37\,375 \text{ N·m, or } 27\,583 \text{ ft·lbs}$$

$$\text{Power}_{Turbine} = \frac{\text{Torque} \cdot \text{speed}}{5252} \qquad \text{Equation 9}$$

Substituting derived torque and RPM into the power calculation of Equation 9, then, we may calculate the theoretical power of RISEC device disc turbine runners shown in the figure as:

$$\text{Power}_{Turbine} = \frac{27\,583 \text{ ft} \cdot \text{lbs} \cdot (71.6) \text{rev/min}}{5252}$$

$$\text{Power}_{Turbine} = 376 \text{ HP or } 280 \text{ kW (each)}$$

Since there are six runners in this embodiment, therefore, the theoretical power of the embodiment specified may be six fold times the calculated value above, or 1.68 MW for this TISEC in-stream device. It should be noted that the disc spacing specified of 2 mm (implied by h=1 mm) in the above calculation is larger than ideal to allow greater throughput and also to accommodate the significantly greater dynamic viscosity of seawater at the frigid temperature specified. Noticeably, FIG. 13 as presented has a significant amount of un-utilized space within its interior which may readily accommodate larger disc turbine sizing and its accompanying volutes (housings, or cassettes 1310).

Further, although theoretical values of possible fluid energies ideally extractable by the method are represented, and are not conditioned by coefficients of performance, even with substantial operating losses this method may still warrant real world investigation as soon as possible to advance clean energy generation and conversion capacity globally.

With reference now to FIG. 14, an alternate cross-sectional profile of the embodiment 1401 in contrast to FIG. 13 is presented, in which ambient fluid streams 1402 separated by nose 1403 and passing over ramp-like surfaces 1407 guide developed EVFES 1406 into fixedly attached and rigidly supported volute housings 1415 on either side. The embodiment 1401 pivoting about the centerline axis of conduit 1404 in cooperation with bearing means 1405, is made rotatable so as to be ever-positioned into opposition with approaching tidal or other fluid currents 1402. Comparatively driving liquid fluid currents directly into volutes and disc turbines contained there-within, this profile while generating turbine rotation in an opposite direction may create some degree of shock near the inlet. Notably however, although presented herein and may function acceptably well, this design may entail shock near the fluid inlet section, and is therefore not as preferred as, FIGS. 10, 12, 13, 15, and 16 for the liquid fluid applications.

EVFES fluid currents 1406 driven into housings 1415 (forming extensions of bifurcating fluid collection device element 1403) have a tangential entry into work extracting disc turbines 1409 and follow spiral paths 1410 between its discs en route to axial discharges 1411 thereof, to generate rotation 1408 thereof. Disc turbines 1409 thereby develop work while keyed 1412 to a central shaft 1413. Circulation zone 1414 provides admission of working fluid into disc turbines 1409, and the divergent discharge outlet 1418 provides egress for working fluid from discharges 1411. Fluid extraction device flows 1421 derived from external ambient fluid currents 1402 are largely forced to navigate around the 'outer' forward surface of volute 1415 through external vena contracta regions. There-after, the FED EVFES 1421 largely follows a Coanda profile comprising the substantially louvered, leewardly stepped and hinged 1425 surfaces 1423 forming a plurality of leeward openings 1424. At the trailing edge of the embodiment, final inducted flow 1426 in combination with flow-stream 1427 (itself a combination of inducting flow-stream 1421 and inducted flows 1422) may largely return the working fluid throughput back to the ambient medium.

With reference now to FIG. 15, a lower flow rate embodiment is presented wherein the volutes are larger than might otherwise exist in a high flow rate model of the same type of design. This is essentially the same theme, with the volutes having vorticity and the turbine outlet flow providing drag on the contained vortices causing the angular momentum reflective tangential velocity increase to provide even greater angular velocity of turbines to better pump the vortices in conjunction with the siphoning outlets provided and acted upon by the greater suction due to the high dynamic viscosity of the water or sea water.

The fluid bifurcating embodiment of FIG. 15, provides less fluid intersection with forward FCD surfaces 1503, 1504 having a moderate angle of attack (ie: small degree of divergence) of its FCD surfaces 1503, 1504 disposed into opposition with approaching fluid currents 1502. The embodiment may employ volutes 1506 which may have larger radii than might otherwise be required in a high flow rate model of the same type of design.

This is essentially the same theme, with volutes 1506 defining the provided vorticity and the turbine outlet flow 1510 communicating drag on the contained vortices causing the angular momentum reflective tangential velocity increase to provide even greater angular velocity of turbines and fluidic pumping of the vortices in conjunction with the siphoning outlets provided and acted upon by the greater suction due to the high dynamic viscosity of the water or sea water.

In operation, EVFES developed by convex FCD surfaces 1503, 1504 enter into volutes 1506 as flow-streams 1508 following either longer paths (as at the outer perimeter of volute 1506) or shorter paths (such as may be followed by fluids released directly across the surface of aperture lip 1507 unto eventual tangency and entry there-into shown disc turbine 1509 inter-disc spaces as working fluid.

Discharged working fluids 1510 may be drawn by and cleared from the device at a number of possible FED egress points in: exterior side panels 1511, aft surface(s) 1512, as well as through the largely open aft induction opening 1513, with all FED egress features designed so as to be leewardly facing, with the working fluid being returned to the ambient fluid mass as flow-stream 1514.

Figure 17:
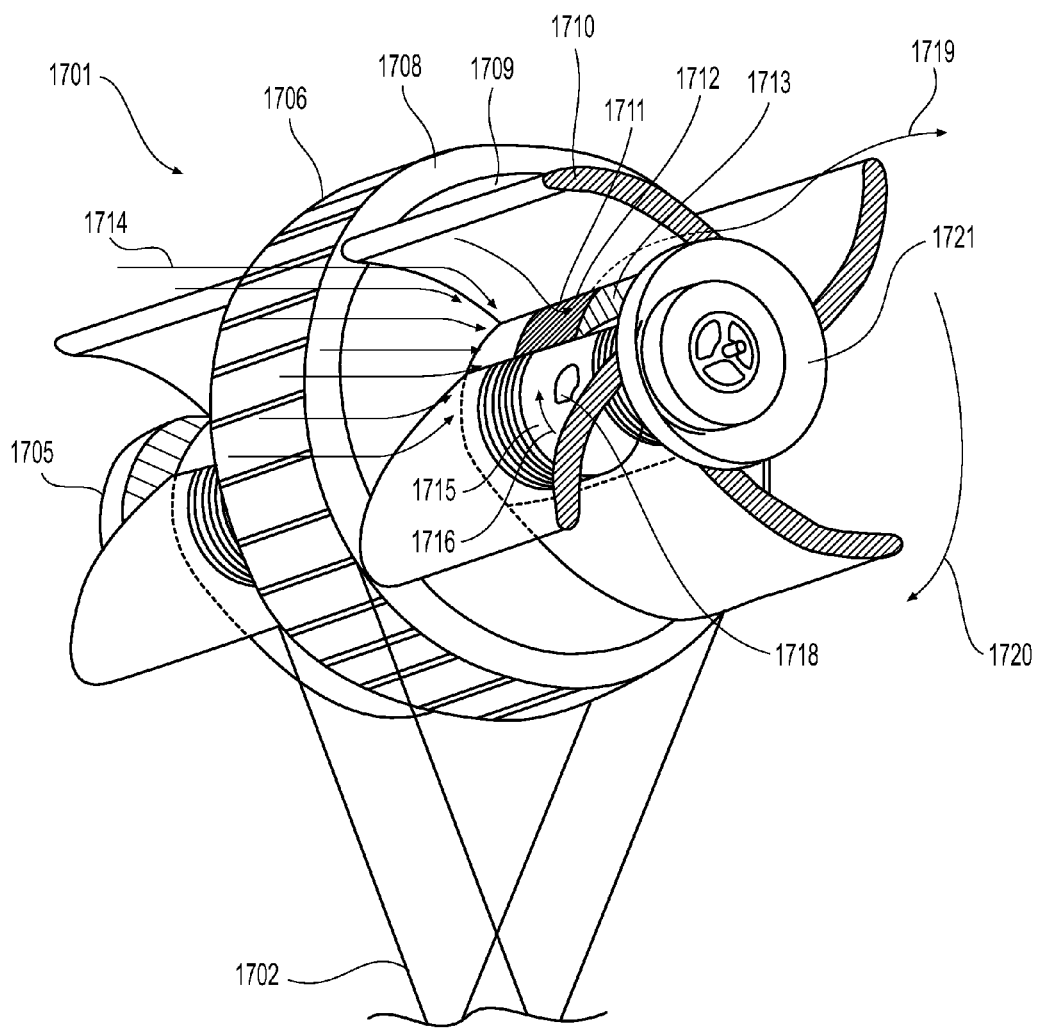
FIG. 17 is a side elevation view of a lighter than air tethered embodiment of the invention employing lighter than air discs.

With reference now to FIG. 17, a lighter-than-atmosphere invention embodiment is presented which may provide power generation for terrestrial ground-stations, planetary colonization power needs, or may also meet on-atmospheric power requirements of planetary studies including meteorological or other remote sensing missions if desired, the latter through a two-part application integration incorporating at least one invention embodiment 1701 of calculated buoyancy in conjunction with another device of different calculated buoyancy (not shown), both being connected via tethering means 1702, 1703. In the latter mode, an invention embodiment 1701 at altitude-X, made lighter than the atmosphere there-surrounding via filling of inflatable components thereof with a lighter density fluid, is thereby disposed in ambient fluids currents there-respective-to. Another buoyant body, for example a similar invention embodiment heavier than 1 (not shown), yet lighter than the atmosphere at altitude-Y may be sized an appropriately calculated and filled so as to by buoyant at the altitude, where a substantially different ambient fluid current speed, compared to altitude-X, may exist. Connection of the two bodies via suitably strong, lightweight and inert tethering means 1702, 1703 causes devices at each end of the tether to be dragged through the fluids at a relative velocity and may thereby allow energy harvest from intra-atmospherics shear referenced by the one or more inventions embodiments. Since winds at opposing ends of the tether may change rapidly, may not always be in same direction, and may therefore subject the tether to extreme forces, provision for swiveling joints and shock absorption along the tether may be requisite. Further, although devices would be buoyant at respective altitudes, tether cable weight would also require compensation, for example, by a lighter-than-atmosphere loaded environmental protection sheath, or a lighter-than-atmosphere balloon attachments at regular intervals, or added buoyancy capacity at altitude-X. Other factors such as sizing, materials, filling medium density, local gravitational constants, densities of ambient atmospheric mediums, on-traverse fill compensation for fluid-loss and other factors would also require consideration in such a scheme.

Notwithstanding these considerations, devices restrained from travelling at local altitude-respective fluid velocity by nature of being tethered to another drag-body at different altitude may enable collection and conversion of a portion of the energy available respective to the velocity differential between the different altitudes. As indicated, use of the Magnus effect may also limit relative horizontal-plane translation, and may, if desired be used to generate further auxiliary power, as may shock absorption and dampening along the tether if desired via suitably lightweight piston based or other electrical generation means including. Also in the latter case of on-planetary atmosphere power generation, energy product storage or direct transfer of power may be provided via beam technology known in the art which may thereby relay power to orbiting spacecraft.

In operation, embodiment 1701 tethered via cable(s) 1702, 1703 to a ground station or to another drag body at another elevation is disposed in the path of wind currents 1714 at altitude. Centrally disposed FED means bounded by annular elements 1706, 1708 and 1709 permits rapid flow through the slot region to align the embodiment into opposition with ambient winds while developing significant EVFES for use as FED induction streams clearing the discharges of the two central turbine outlet flows. At the extremities of the rotor, circular FED flow generators 1705, 1721 provide vertical plane apertures (e.g. indicated by hatched lines interior to 1705).

Approaching ambient fluid currents 1714 may be channeled by the under surface of upper impeller 1710 as well as by the upper surface of lower impeller 1704. The energetic EVFES may blow through open ports 1711 into the centrally disposed open-ported FED and thereby apply off-axis fluid drag to exhaust working fluids from the disc turbines through any of the three alternate open ports 1711. Turbine exhaust 1718 is shown to be inducted by EVFES flow 1712 finding egress through a downstream port 1717 as combined flow 1719. The combined flow 1719 may further contribute to the rotation of the impeller array concurrently developing outer rotation 1720.

Fluid currents not passing into any of the FED induction pathways discussed may be conducted by the FCD surfaces provided by impellers 1704, 1710 through fluid inlet doorways 1713 into vortexing volutes wherein work extracting disc turbines 1715 rotating as indicated 1716 are configured to generate work.

With reference now to FIG. 16, a rectangular venturi array is presented, in which the open center design of forward surfaces leaning outwardly away at leading edges, and other surfaces are sloped to make advantageous use of drag, while attempting to not separate from the surface to achieve maximum pumping action of turbine exhaust vis-à-vis said siphon pumping the contained vortices, the vortices increasing turbine rotation due to their tangential velocity increase toward the vortex line (center of vortex).

The open center design of closed-perimeter array elements has centrally disposed fluid collection devices with forward surfaces inclining outwardly toward leading edges, and sloped trailing fluid extraction device surfaces.

In the embodiment of the figure, an array 1601 of serially staged venturis comprising a plurality of window-like elements 1607, 1608, 1609 is restrained by a pile or other suitable support means 1602, which permits the free rotation of the window-like elements 1607, 1608, 1609 into opposition with approaching fluid currents through the use of swivel type bearing means 1603. The window-like structures are longitudinally separated and secured to support means 1602 by locking nuts 1604 or other attachment hardware. Tethering means 1605 fix the positions of window-like elements 1607, 1608, 1609 to bearing means 1603 via corner fixtures 1606. Fluid interacts with said array 1601 as intra-device channel flows 1616 entering between window-like elements 1607, 1608, 1609 of the array 1601, as the fluids passing as the central venturi flow 1613 through central apertures of said window-like elements 1607, 1608, 1609, and also as fluid currents 1614 guided by FCD surfaces 1610 to enter into fluid inlets 1615 supplying working fluid to work extracting disc turbines 1611. The central venturi flow 1613 accelerated by the serial-staged venturis assists aft FED surfaces having induction openings therein 1612 to augment the extraction of work by disc turbines 1611 with configured fluidic induction of disc turbine throughput as flow-streams 1618 combining leewardly with the fluid streams 1616, 1617 to create a combined flow 1619 which is returned to the ambient medium.

The inside angle of attack of FCD surfaces 1610 in combination with the external surface contours selected for array elements 1607, 1608, 1609 defines inner volumes thereof wherein volute-included disc turbines 1611 are illustrated.

Figure 18:
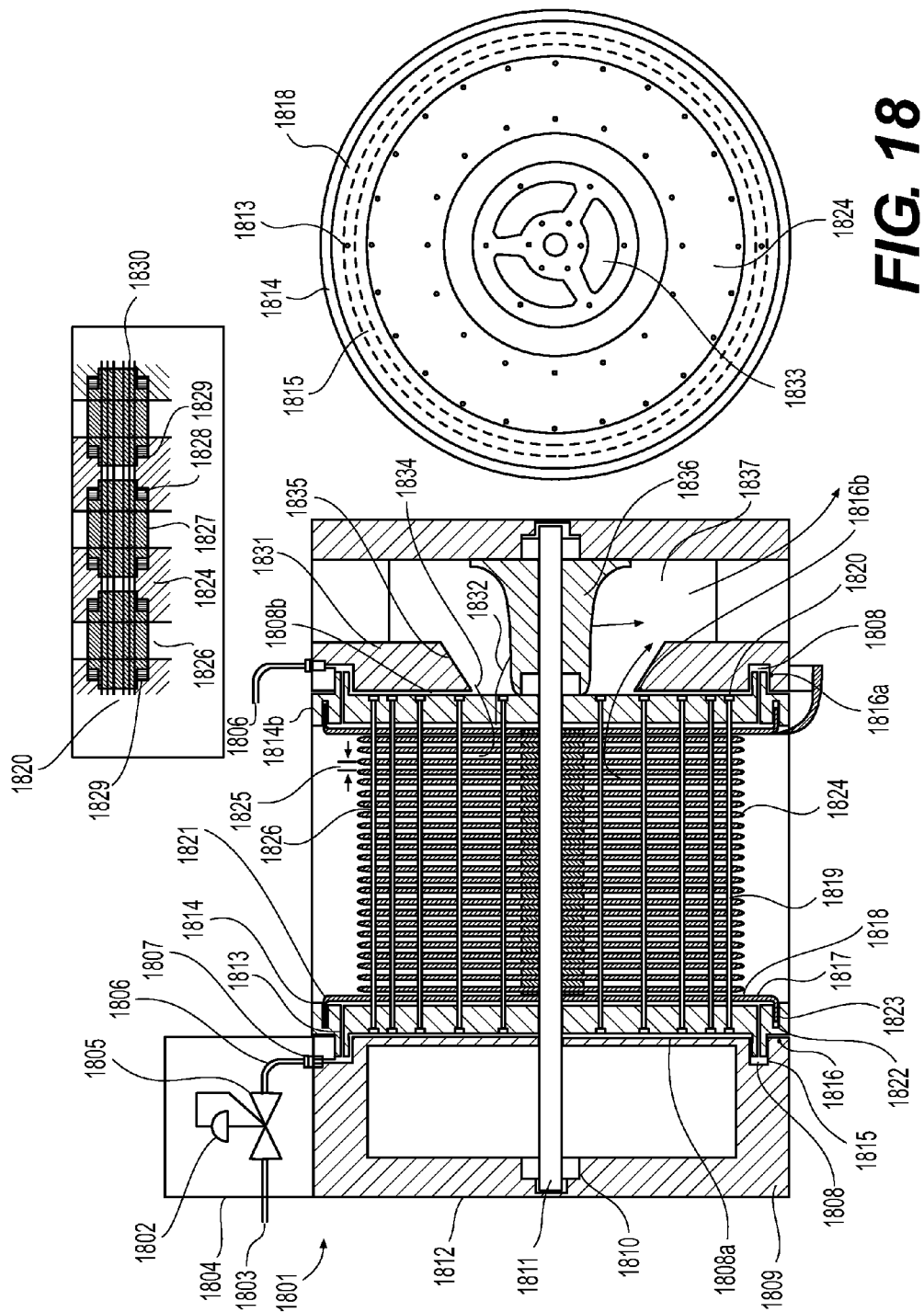
FIG. 18 is a sectional view of a possible adjustable inter-disc spacing mechanism.

With reference now to FIG. 18, a possible mechanism 1801 is specified for varying the inter-disc channel width (disc spacing) at run-time, comprising a 4-20 mA control signal 1802, a source of control fluid 1803 which for purposes of discussion is air, but which may also be another suitable fluid, a housing 1804 providing protection from the elements, which may either be on-board device embodiments, or remote there-from. Located within housing 1804, a pressure regulator 1805 providing fluid pressure regulation based upon control signal 1802 regulates the downstream pressure in line 1806 further conducting control fluid 1803 through connector 1807 into annular cavity 1808 in bearing frame 1809 wherein bearings 1810 may be fixedly set to provide axial alignment of shaft 1811. Work extraction or conversion means, neither shown nor concerning the current discussion may be located within cavity 1812 of bearing frame 1809 which may further be either vented or sealed and purged according to environmental requirement. Channels 1813 in thick end disc 1814 are shown within labyrinth seal 1815 (however may be in any convenient location interior to isolation o-rings 1816) communicate control fluid isolated from the ambient medium (working fluid) by teflon o-rings 1816 into gap 1817 behind pressure plate 1818. In operation, increasing control fluid pressure causes pressure plate 1818 to shuttle to the right along smooth largely snug fitting through-bolts 1819, while being maintained parallel to the axis of rotation vis-à-vis its thickness and trueness of through-holes 1820 machined perpendicularly there-into. Annular extension 1821 of pressure plate 1818 traverses within annular sealing channel 1822, while o-rings 1823 set therein largely prevent the escape of control fluid.

Automatic adjustment of disc 1824 spacing at run-time to achieve an advantageous degree of laminar flow between parallel co-rotating discs requires that a broad range of design inter-disc spacing 1825 be accommodated. Accordingly, the axial lengths of annular extension 1821 of pressure plate 1818, and of annular sealing channel 1822 must be designed with due consideration to the maximum anticipated variation in inter-disc separation 1825 as well as the number of discs in the runner in order to maintain the effective control fluid seal provided by o-rings 1823.

Where a small degree of spacing variance is anticipated, inter-disc spacing means 1826 may simply comprise resilient, compressible, working-fluid resistant material such as Viton or other durable neoprene-like material in the form of first cylinders with central holes therein of an internal diameter closely matching through-bolt 1819 outside diameters, and also second spacing elements taking the form of the 3-point star formation indicated in the right side view FIG. 1818. Where larger inter-disc spacing variance is anticipated, means comprising nesting, spring loaded half cylinders of steel or aluminum construction or another suitable material may be employed. Alternately as indicated in the inset at the top of the figure, smooth outside diameter cylinders, or sleeves 1827, of suitable construction with bored-through channels therein closely matching through bolt 1820 outside diameters may be employed in conjunction with suitably rated corrosion resistant springs 1828 seating upon internal landings 1829 which may or may not be at the maximum hole depth 1830 inward from disc surfaces.

Whereas the automatic positioning means shown at left in the figure does not allow discharge of the working fluid there-through, and for this reason the overall rotor configuration may be most suited to a vertical axis water application potentially utilizing gravity discharge to advantage in the harvest of wave energy, the co-compressive inter-disc spacing means provided at right shows a general arrangement for working fluid discharge. Upon release of working fluid 1832 through axial discharge holes 1833 of thick end disc 1814b further fitted with conical diverging discharge lip 1834, enhanced discharge action (reduced pressure) may be provided at the outlet which concurrently protects o-ring 1816b and contained control fluid from particulate ingression by utilizing the sloping surface of rotation to add dynamic pressure gradient away from the end disc 1833 also concurrently in the direction of discharge over further stationary conic divergent discharge surface 1835 of discharge support frame 1831. Bearing 1810 mounts 1836 may provide rigid shaft 1811 alignment substantially without obstruction of the discharge as shown centrally located in open chute 1837.

It is pertinent to point out that while this inter-disc spacing adjustment method provides a means to optimize the laminar flow condition between co-rotating discs to provide better efficiency in disc-turbine applications especially but not limited to where efficiencies may be lower such as in the case of operation in the generally slower velocity fluid currents provided in nature, it may also add benefit by preventing the loss of energy normally wasted where a significant dynamic viscosity difference may exist between working fluids and proposed control fluids utilized as described herein. Specifically, when annular gap 1808 is loaded with lower dynamic viscosity control fluid 1803, upon increasing regulation pressure, region 1808a between rotating thick end disc 1814 and stationary bearing frame 1809 is concurrently loaded with the lower viscosity fluid, and may result in significantly reduced adversely affecting shear stress development between rotating and stationary system components normally imposing fluidic drag upon disc turbine rotors in operation. While substantially the full end disc surface presented at left may operate with less drag where no turbine discharge is employed, the same principle is also applied at right in the figure, wherein control fluid similarly entering annular channel 1808 also loads a reduced annular area 1808b between o-rings 1816a and 1816b and may thereby also provide drag reduction on the discharge side of disc turbines.

For successful automatic run-time control or manual adjustment of inter-disc spacing, the spring 1828 ratings should be greater than the minimum control pressure for regulation, and must allow the required maximum deviation in inter-disc spacing while under compression. Further, the minimum control fluid pressure required to produce maximum inter-disc spacing (representative of lowest speed of operation in water or highest speed of operation in air, under constant temperatures) will vary widely in different applications necessitating assessment of variables prior to proposed commissioning, however this pressure may be generally stated as that pressure contained in annular regions 1808, 1808a, 1808b which maintains positive differential pressure with respect to the externally applied total pressure, while providing at least a minimum amount of spring compression. Similarly, the minimum inter-disc spacing (respecting higher speeds of operation in water, and lower speeds of operation in air for largely constant operational temperatures) may require widely differing maximum control fluid pressures depending upon the application.

Applications of disc turbine technology, as in other prime mover uses, would benefit from means to achieve fine through large degrees of torque control, and whereas the Tesla disc technology provides the capability to utilize this benefit in diverse fields including measurement instruments (3) and gearless hydrostatic transmissions this benefit including those involving higher speeds and temperatures, these may have necessarily been comprised of higher temperatures find under at speed for important reasons of dynamic balance, stability, safety and efficiency, must be rigidly bolted together to provide a solid body for rotation. However, low temperature operation and significantly lower operational speeds in ambient fluid operation present a largely safe opportunity to effect the automated disc-spacing function without significantly affecting dynamic balance or stability of the inherently symmetric disc turbine. Moreover, the impact of providing significantly better derived torque at lower speeds with the automatic adjustment of disc spacing in conjunction as disclosed herein, possibly yielding myriad inconspicuous applications may also provide the most advantageous benefit during significant wind speed changes, when the rate of tidal current velocity is changing, or alternately when wave action may provide short-term consistent, however over time, varying amounts of overtopping-derived momentum energy further applied to disc turbines, which as indicated in Equation 2 may significantly affect proper disc spacing of such machines.

REFERENCES CITED

U.S. Patent Documents (1) Tesla, Nikola, U.S. Pat. No. 1,061,206 *Turbine*, patented May 6, 1913
(2) Tesla, Nikola, U.S. Pat. No. 1,061,142 *Fluid Propulsion*, patented May 6, 1913

(3) Tesla, Nikola, U.S. Pat. No. 1,209,359 *Speed Indicator*, patented Dec. 19, 1916
(4) Effenberger, Udo E., U.S. Pat. No. 4,402,647 *Viscosity Impeller*, patented Sep. 6, 1983
(5) Davis, Barry V., et al, U.S. Patent Application 20050285407 *Hydro Turbine Generator*, filed Dec. 29, 2005
(6) Thrupp, E. C., U.S. Pat. No. 699,636 *Turbine*, patented May 6, 1902
(7) Conrad, et al., U.S. Pat. No. 6,135,708 *Prandtl Layer Turbine*, patented Oct. 24, 2000
(8) Belinsky, Sidney Irving, U.S. Patent Application 20020197148 *Installation for Harvesting Ocean Currents CIHOC)*, filed Dec. 26, 2002
(9) Finney, U.S. Pat. No. 5,464,320, *Super Venturi Power Source*, patented Nov. 7, 1995
(10) Segota, Darko, et al., U.S. Pat. No. 7,278,825 *Method and System for Regulating Flow Over an Airfoil or a Hydrofoil*, patented Oct. 9, 2007
(11) Bosley, Kenneth Randall, U.S. Pat. No. 7,279,803 *Ocean Current Power Generator*, patented Oct. 9, 2007
(12) Borgesen, Are, U.S. Patent Application Publication 20070095061 *Tidal Power Station Device*, filed May 3, 2007, PCT/N004/00367, filed Jun. 8, 2006
(13) Dial, Daniel Christopher, U.S. Pat. No. 7,341,424 *Turbines and Methods of Generating Power*, patented Mar. 11, 2008

Canadian Patent Documents

(14) Stanton, Keith Leslie, Canadian Patent Number 2,330,700 *Wind Funnel*, patented Jan. 15, 2001
(15) Couture, Marc Joseph, Canadian Patent Number 2,306,491 *Multiple-Sail Wind Enemy Concentrator*, patented Apr. 28, 2001
(16) Ferguson, Frederick D., Canadian Patent Application Number 2,607,103 *Systems and Methods for Tethered Turbines*, PCT filing date Oct. 7, 2005
(17) Nica, Horia, Canadian Patent Application Number 2,498,635 *Vertical Axis Wind Turbine With Modified Tesla Disks*, filed Feb. 28, 2005

British Patent Documents

(18) Tesla, Nikola, British Patent Number 9098/21, *Improved Process of and Apparatus for Production of High Vacua*, patented May 4, 1922

Other Publications

(19) Hayes, J. A. "Tesla's Engine A New Dimension for Power", Tesla Engine Builders Association, Milwaukee, Wis. 1994
(20) Hasinger et al. "Investigations of a Shear-Force Pump", *Journal of Engineering for Power*, Trans, ASME, Series A, vol. 85, July 1963, pp. 201-206
(21) Tahill, William "Theoretical Analysis of a Disk Turbine (1)", Tesla Engine Builders Association: TEBA News Issue #15, 1998
(22) Tahill, William "Theoretical Analysis of a Disk Turbine (2)", Tesla Engine Builders Association: TEBA News Issue #16, 1999
(23) Breitner, Mark C. and Karl Pohlhausen, "Laminar Flow Between Two Parallel Rotating Disks", *Aeronautical Research Laboratory, Wright-Patterson AFB*, March, 1962
(24) Rice, Warren, "An Analytical and Experimental Investigation of Multiple-Disk Turbines", *Journal of Engineering for Power*, January, 1965
(25) Rice, Warren, "Tesla Turbomachinery", *Conference Proceedings of the IV International Tesla Symposium*, Sep. 22-25, 1991, Serbian Academy of Sciences and Arts, Belgrade, Yugoslavia
(26) Johansson Thomas B., et al., "Renewable Energy: Sources for Fuel and Electricity" *Island Press*, Revised Printing 1993, ISBN 1559631384 p. 130
(27) E. Muljadi, C. P. Butterfield, Yih-Huei Wan, "Axial Flux, Modular, Permanent-Magnet Generator with a Toroidal Winding for Wind Turbine Applications", *National Wind Technology Center. National Renewable Energy Laboratory, U.S. Department of Energy*, contract No. DE-AC36-83CH1 0093, task number WE803020, July 1998
(28) Hayes, Jeffrey, A., Tesla Engine Builders Association, Membership Manual, Milwaukee, Wis. Copyright 1993, 94, 97, 99, 2000, NT1rev5: Case Studies: p. 40: White, Russ, and Germain, Alex, *"Disc Pump Saves $57,000/yr in High Viscosity Waste Service"*,
(29) Rice, Warren, "An Analytical and Experimental Investigation of Multiple-Disk Pumps and Compressors", *Journal of Engineering for Power*, July, 1963
(30) Matsch, Lee, and Rice, Warren, "Potential Flow Between Two Parallel Circular Disks With Partial Admission", *Journal of Applied Mechanics*, March, 1967
(31) Adams, R., & Rice, Warren, "Experimental Investigation of the Flow Between Corotating Disks", *Journal of Applied Mechanics*, September, 1970
(32) Pater, L. L., Crowther, E., and Rice, Warren, "Flow Regime Definition for Flow Between Corotating Disks", *Journal of Fluids Engineering*, March, 1974
(33) Valentin, Ingo, "Valentin Technology Champions the HydroStatic Drive", Tesla Engine Builders Association: TEBA News Issue #7, Spring 1996

What is claimed is:

1. A fluid energy conversion system comprising:
a) one or more Tesla-type disc turbines each comprising a shaft and one or more operatively associated disc runners, each of said disc runners comprising: two or more parallel discs, each axially separated by a space, wherein the space between each of said discs is adjustable, said discs configured to extract energy to drive said shaft, from working fluid passing through one or more discharge openings between all of said discs, and wherein at least one of said discs is inflatable;
b) one or more fluid inlets configured to guide said working fluid to said disc turbines parallel to said discs and co-tangential to a periphery thereof; and
c) one or more fluid outlets configured to release said working fluid discharged from said disc runners through discharge openings of discs at either or both ends of said disc runners.

2. The fluid energy conversion system of claim 1, further comprising a fluid collection device comprising one or more fluid collection surfaces, said fluid collection surfaces configured to intersect an incoming current of said working fluid at an angle and to enhance the velocity thereof, and further configured to substantially guide said working fluid into said fluid inlets.

3. The fluid energy conversion system of claim 1, wherein said discs are axially spaced apart by resilient spacing elements.

4. The fluid energy system of claim 1, wherein the spacing between said discs is adjusted using manual control, automatic control or a combination thereof.

5. The fluid energy conversion system according to claim 1, wherein said fluid outlets are formed by one or more isolation plates mounted parallel and adjacent to one or more ends of said disc runners, said isolation plates comprising holes operatively associated with the discharge openings of the discs to discharge working fluid therefrom.

6. The fluid energy conversion system according to claim 1, wherein said disc runners are arranged in rows offset in longitudinal or transverse direction.

7. The fluid energy conversion system of claim 1, wherein said system is configured to be buoyant at an elevation via filling of inflatable components thereof with a pressurized control fluid of density lesser than density of atmosphere at said elevation.

8. The fluid energy conversion system of claim 1, further comprising a control system utilizing electrical, pneumatic or hydraulic actuating means for controlling one or more of disc spacing; effective cross-sectional area of fluid collection device; and/or horizontal or vertical offsets for arrays of disc runners.

9. The fluid energy conversion system of claim 7, wherein said system is configured for creating sufficient energy for activating said electrical, pneumatic or hydraulic actuating means.

10. The fluid energy conversion system of claim 1 wherein the disc runner is configured for automatic control of the spacing between axially separated discs, for application in disc turbines, compressors, and pumps, said disc runner comprising: two or more adjustably positioned discs; and a control system configured for dynamic control of the spacing between said discs.

11. A method for converting the energy of fluids in motion into other forms of energy using the system of claim 1.

* * * * *